United States Patent
Ben Nun et al.

(10) Patent No.: US 12,104,823 B2
(45) Date of Patent: Oct. 1, 2024

(54) THERMAL STORAGE SYSTEM CONTAINERS EXTERNAL FEATURES AND MODULARITY

(71) Applicant: Nostromo Ltd., Even-Yehuda (IL)

(72) Inventors: Yaron Ben Nun, Even-Yehuda (IL); Eyal Ziv, Tel-Aviv (IL)

(73) Assignee: Nostromo Ltd., Even-Yehuda (IL)

( * ) Notice: Subject to any disclaimer, the term of this patent is extended or adjusted under 35 U.S.C. 154(b) by 444 days.

(21) Appl. No.: 17/598,419

(22) PCT Filed: Mar. 27, 2020

(86) PCT No.: PCT/IL2020/050374
§ 371 (c)(1),
(2) Date: Sep. 27, 2021

(87) PCT Pub. No.: WO2020/194316
PCT Pub. Date: Oct. 1, 2020

(65) Prior Publication Data
US 2022/0178560 A1   Jun. 9, 2022

Related U.S. Application Data

(60) Provisional application No. 62/824,541, filed on Mar. 27, 2019, provisional application No. 62/824,914, (Continued)

(51) Int. Cl.
*F24F 5/00* (2006.01)
*F28D 20/00* (2006.01)
*F28D 20/02* (2006.01)

(52) U.S. Cl.
CPC .......... *F24F 5/0021* (2013.01); *F28D 20/021* (2013.01); *F28D 20/026* (2013.01);
(Continued)

(58) Field of Classification Search
CPC .... F24F 5/0021; F28D 20/021; F28D 20/026; F28D 2020/0069; F28D 2020/0082
(Continued)

(56) References Cited

U.S. PATENT DOCUMENTS 3,251,192 A    5/1966  Rich, Jr. et al.
3,381,113 A *  4/1968  Jacques ................. F24H 7/0433
                                                        501/141

(Continued)

FOREIGN PATENT DOCUMENTS

AU   2015203406   7/2015
CA   2638235      2/2010
(Continued)

OTHER PUBLICATIONS

Notification of Office Action and Search Report Dated Aug. 3, 2022 From the State Intellectual Property Office of the People's Republic of China Re. Application No. 201980076420.9 with its Summary in English. (16 Pages).

(Continued)

*Primary Examiner* — Jon T. Schermerhorn, Jr.

(57) ABSTRACT

A thermal-storage container used in a thermal-storage system to exchange heat by fluid flow though phase-changing material disposed inside the thermal-storage container, including a thermal-storage container housing, a fluid inlet and a fluid outlet, and one or more capsules containing the phase-change material, wherein the housing is shaped as an elongate container, a ratio of length to width of the housing is between 2 and 20. Related apparatus and methods are also described.

15 Claims, 47 Drawing Sheets

Related U.S. Application Data filed on Mar. 27, 2019, provisional application No. 62/824,575, filed on Mar. 27, 2019.

(52) U.S. Cl.
  CPC ............... *F28D 2020/0069* (2013.01); *F28D 2020/0082* (2013.01)

(58) Field of Classification Search
  USPC .......................................................... 165/10
  See application file for complete search history.

(56) References Cited

U.S. PATENT DOCUMENTS

| | | | |
|---|---|---|---|
| 3,858,805 A | 1/1975 | Shen et al. | |
| 4,203,489 A * | 5/1980 | Swiadek | F28D 20/0034 126/400 |
| 4,205,656 A | 6/1980 | Scarlata | |
| 4,259,401 A | 3/1981 | Chahroudi et al. | |
| 4,262,653 A | 4/1981 | Holland | |
| 4,344,414 A | 8/1982 | Balch | |
| 4,347,892 A | 9/1982 | Clyne et al. | |
| 4,442,826 A | 4/1984 | Pleasants | |
| 4,462,390 A | 7/1984 | Holdridge et al. | |
| 4,471,834 A | 9/1984 | Schlote | |
| 4,495,937 A | 1/1985 | Fisher | |
| 4,532,917 A | 8/1985 | Taff et al. | |
| 4,612,912 A | 9/1986 | Lampe | |
| 4,656,836 A | 4/1987 | Gilbertson | |
| 4,757,690 A | 7/1988 | Hollowczenko et al. | |
| 4,827,735 A | 5/1989 | Foley | |
| 4,924,935 A | 5/1990 | Van Winckel | |
| 5,036,904 A * | 8/1991 | Kanda | F28D 20/021 165/104.11 |
| 5,059,228 A | 10/1991 | Cheng | |
| 5,072,596 A | 12/1991 | Gilbertson et al. | |
| 5,090,207 A | 2/1992 | Gilbertson et al. | |
| 5,143,148 A * | 9/1992 | Merryfull | F28D 20/02 165/145 |
| 5,441,097 A * | 8/1995 | Kanda | F28D 20/02 165/104.11 |
| 5,678,626 A | 10/1997 | Gilles | |
| 7,159,643 B2 * | 1/2007 | Kudo | F28D 20/021 165/10 |
| 7,856,843 B2 | 12/2010 | Enis et al. | |
| 7,905,110 B2 | 3/2011 | Reich et al. | |
| 9,568,235 B2 | 2/2017 | Dobbs | |
| 10,591,224 B2 | 3/2020 | Bergan et al. | |
| 2002/0000306 A1 | 1/2002 | Bradley | |
| 2004/0194908 A1 | 10/2004 | Tomohide | |
| 2005/0040152 A1 | 2/2005 | Koschenz et al. | |
| 2007/0006586 A1 | 1/2007 | Hoffman et al. | |
| 2008/0219651 A1 | 9/2008 | Nayef | |
| 2009/0090109 A1 | 4/2009 | Mills et al. | |
| 2009/0211726 A1 | 8/2009 | Bank et al. | |
| 2011/0049298 A1 | 3/2011 | Chung | |
| 2011/0286724 A1 * | 11/2011 | Goodman | F28D 20/0056 165/104.31 |
| 2013/0134780 A1 | 5/2013 | Parsonnet | |
| 2014/0000835 A1 | 1/2014 | Niknafs et al. | |
| 2014/0102662 A1 | 4/2014 | Grama et al. | |
| 2014/0214231 A1 | 7/2014 | Parsonnet et al. | |
| 2014/0284021 A1 | 9/2014 | Laurberg et al. | |
| 2015/0027662 A1 | 1/2015 | Schmitz | |
| 2015/0053367 A1 | 2/2015 | Parkinson et al. | |
| 2015/0060008 A1 | 3/2015 | Wirz et al. | |
| 2015/0121945 A1 | 5/2015 | Kamoshida et al. | |
| 2015/0246484 A1 | 9/2015 | Hirschberg | |
| 2016/0076821 A1 | 3/2016 | Kopko | |
| 2016/0123680 A1 | 5/2016 | Lee et al. | |
| 2016/0195320 A1 | 7/2016 | Konovalov | |
| 2017/0045304 A1 | 2/2017 | Booska | |
| 2017/0119028 A1 | 5/2017 | Kobayashi et al. | |
| 2018/0003445 A1 | 1/2018 | Bergan et al. | |
| 2019/0072338 A1 | 3/2019 | Wirz et al. | |
| 2020/0284527 A1 | 9/2020 | Ben Nun et al. | |
| 2021/0396406 A1 | 12/2021 | Ben Nun et al. | |
| 2022/0187028 A1 | 6/2022 | Ben Nun et al. | |

FOREIGN PATENT DOCUMENTS

| | | |
|---|---|---|
| CN | 101586853 | 11/2009 |
| CN | 201662262 | 12/2010 |
| CN | 102257344 | 11/2011 |
| CN | 202835911 | 3/2013 |
| CN | 104457020 | 3/2015 |
| CN | 104797405 | 7/2015 |
| CN | 105283722 | 1/2016 |
| CN | 207703058 | 8/2018 |
| DE | 19907975 | 9/2007 |
| DE | 102016006476 | 11/2017 |
| EP | 0012757 | 7/1980 |
| FR | 2658596 | 8/1991 |
| FR | 3038376 | 6/2015 |
| FR | 3074280 | 5/2019 |
| GB | 2489011 | 9/2012 |
| GB | 2489811 | 10/2012 |
| JP | 61-265493 | 11/1986 |
| JP | 63-273787 | 11/1988 |
| JP | 2013-228186 | 11/2013 |
| JP | 2016-029333 | 3/2016 |
| KR | 10-2018-0101780 | 9/2018 |
| NL | 2016194 | 5/2017 |
| WO | WO 2006/136860 | 12/2006 |
| WO | WO 2009/105643 | 8/2009 |
| WO | WO 2014/091216 | 6/2014 |
| WO | WO 2016/099289 | 6/2016 |
| WO | WO 2016/195485 | 12/2016 |
| WO | WO 2017/001558 | 1/2017 |
| WO | WO 2017/151606 | 9/2017 |
| WO | WO 2017/151612 | 9/2017 |
| WO | WO 2019/058170 | 3/2019 |
| WO | WO 2020/065649 | 4/2020 |
| WO | WO 2020/194315 | 10/2020 |
| WO | WO 2020/194316 | 10/2020 |
| WO | WO 2021/076741 | 4/2021 |

OTHER PUBLICATIONS

Communication Pursuant to Article 94(3) EPC Dated Jan. 29, 2021 From the European Patent Office Re. Application No. 18783085.6. (4 Pages).
International Preliminary Report on Patentability Dated Oct. 7, 2021 From the International Bureau of WIPO Re. Application No. PCT/IL2020/050374. (8 Pages).
International Preliminary Report on Patentability Dated Apr. 8, 2021 From the International Bureau of WIPO Re. Application No. PCT/IL2019/051059. (9 Pages).
International Preliminary Report on Patentability Dated Apr. 9, 2020 From the International Bureau of WIPO Re. Application No. PCT/IB2018/001091. (9 Pages).
International Search Report and the Written Opinion Dated Jan. 15, 2020 From the International Searching Authority Re. Application No. PCT/IL2019/ 051059. (13 Pages).
International Search Report and the Written Opinion Dated Jul. 15, 2020 From the International Searching Authority Re. Application No. PCT/IL2020/050374. (11 Pages).
International Search Report and the Written Opinion Dated Jun. 30, 2020 From the International Searching Authority Re. Application No. PCT/IL2020/050373. (11 Pages).
International Search Report and the Written Opinion Dated Nov. 30, 2018 From the International Searching Authority Re. Application No. PCT/IB2018/001091. (16 Pages).
Notification of Office Action Dated Mar. 5, 2021 From the State Intellectual Property Office of the People's Republic of China Re. Application No. 201880075534.7. (10 Pages).
Notification of Office Action Dated Sep. 10, 2021 From the State Intellectual Property Office of the People's Republic of China Re. Application No. 201880075534.7. (11 Pages).

(56) References Cited

OTHER PUBLICATIONS

Translation Dated Oct. 13, 2021 of Notification of Office Action Dated Sep. 10, 2021 From the State Intellectual Property Office of the People's Republic of China Re. Application No. 201880075534.7. (11 Pages).
Translation Dated Mar. 29, 2021 of Notification of Office Action Dated Mar. 5, 2021 From the State Intellectual Property Office of the People's Republic of China Re. Application No. 201880075534.7. (11 Pages).
Soares et al. "Review of Passive PCM Latent Heat Thermal Energy Storage Systems Towards Buildings' Energy Efficiency", Energy and Buildings, 59: 82-103, Apr. 2013.
Supplementary European Search Report and the European Search Opinion Dated Dec. 20, 2022 From the European Patent Office Re. Application No. 20779162.5 (7 pages).
Restriction Official Action Dated Nov. 30, 2021 from US Patent and Trademark Office Re. U.S. Appl. No. 16/650,509. (9 pages).
Notification of Office Action and Search Report Dated Jun. 7, 2023 From the State Intellectual Property Office of the People's Republic of China Re. Application No. 202080033939.1. (10 Pages).
Official Action Dated Jun. 20, 2023 from the US Patent and Trademark Office Re. U.S. Appl. No. 17/890,295. (9 pages).
Summary of Notification of Office Action and Search Report Dated Jun. 7, 2023 From the State Intellectual Property Office of the People's Republic of China Re. Application No. 202080033939.1. (4 Pages).
Summons to Attend Oral Proceedings Pursuant to Rule 115(1) EPC Dated May 4, 2023 From the European Patent Office Re. Application No. 18783085.6. (4 Pages).
Communication Pursuant to Article 94(3) EPC Dated Mar. 7, 2022 From the European Patent Office Re. Application No. 18783085.6. (3 Pages).
English Translation Dated Apr. 24, 2022 of Notification of Office Action Dated Mar. 24, 2022 From the State Intellectual Property Office of the People's Republic of China Re. Application No. 201880075534.7. (10 Pages).
Notice of Allowance Dated Mar. 1, 2022 from US Patent and Trademark Office Re. U.S. Appl. No. 16/650,509. (24 pages).
Notification of Office Action Dated Mar. 24, 2022 From the State Intellectual Property Office of the People's Republic of China Re. Application No. 201880075534.7. (11 Pages).
Decision of Rejection Dated Aug. 31, 2022 From the China National Intellectual Property Administration Re. Application No. 201880075534.7 and Its Summary in English. (15 Pages).
European Search Report and the European Search Opinion Dated Sep. 15, 2023 From the European Patent Office Re. Application No. 23186248.3 (7 Pages).
Notification of Office Action and Search Report Dated Feb. 28, 2024 From the State Intellectual Property Office of the People's Republic of China Re. Application No. 202080033939.1 and Its Machine Translation into English. (10 Pages).
Office Action Dated Nov. 13, 2023 From the Israel Patent Office Re. Application No. 286712. (8 Pages).
International Preliminary Report on Patentability Dated Oct. 7, 2021 From the International Bureau of WIPO Re. Application No. PCT/IL2020/050373. (7 Pages).
Notification of Office Action and Search Report Dated Aug. 3, 2022 From the State Intellectual Property Office of the People's Republic of China Re. Application No. 201980076420.9. (13 Pages).
Office Action Dated Aug. 11, 2022 From the Israel Patent Office Re. Application No. 273611. (7 Pages).
Supplementary European Search Report and the European Search Opinion Dated Jun. 17, 2022 From the European Patent Office Re. Application No. 19865303.2. (8 Pages).
Decision on Rejection Dated Jun. 4, 2024 From the State Intellectual Property Office of the People's Republic of China Re. Application No. 202080033939.1 and Its Summary Into English. (11 Pages).
Machine Translation Dated Jun. 17, 2024 of Decision on Rejection Dated Jun. 4, 2024 From the State Intellectual Property Office of the People's Republic of China Re. Application No. 202080033939.1. (9 Pages).

* cited by examiner

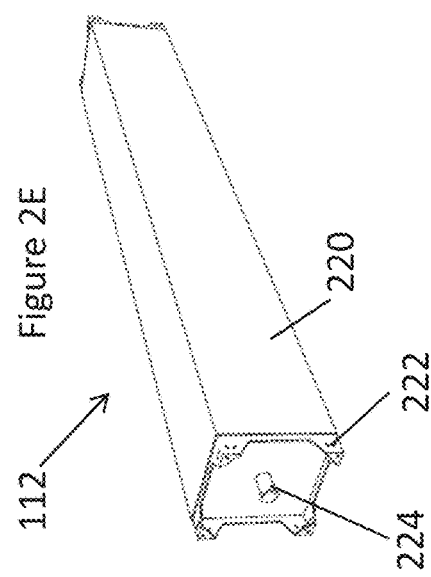
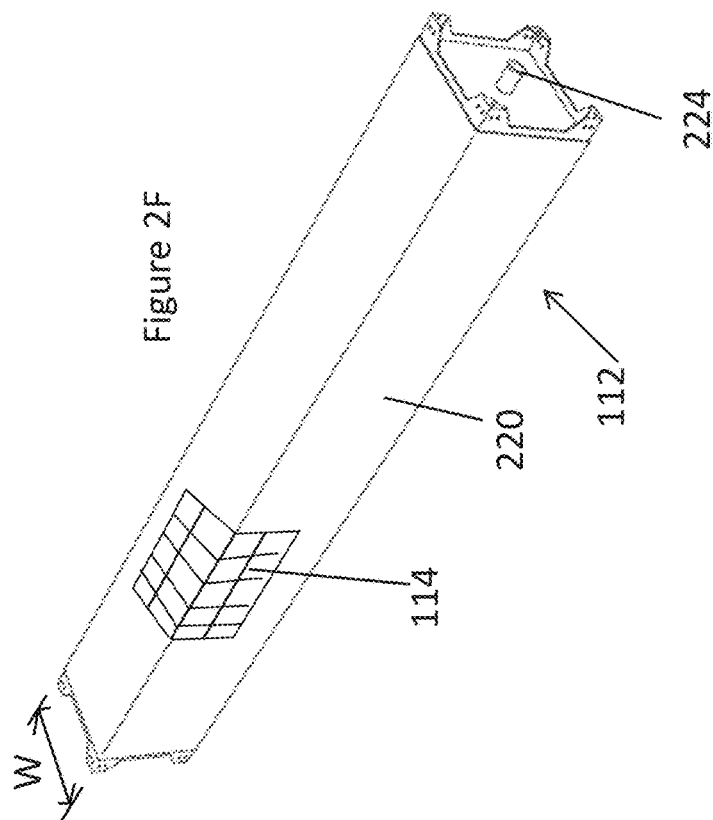
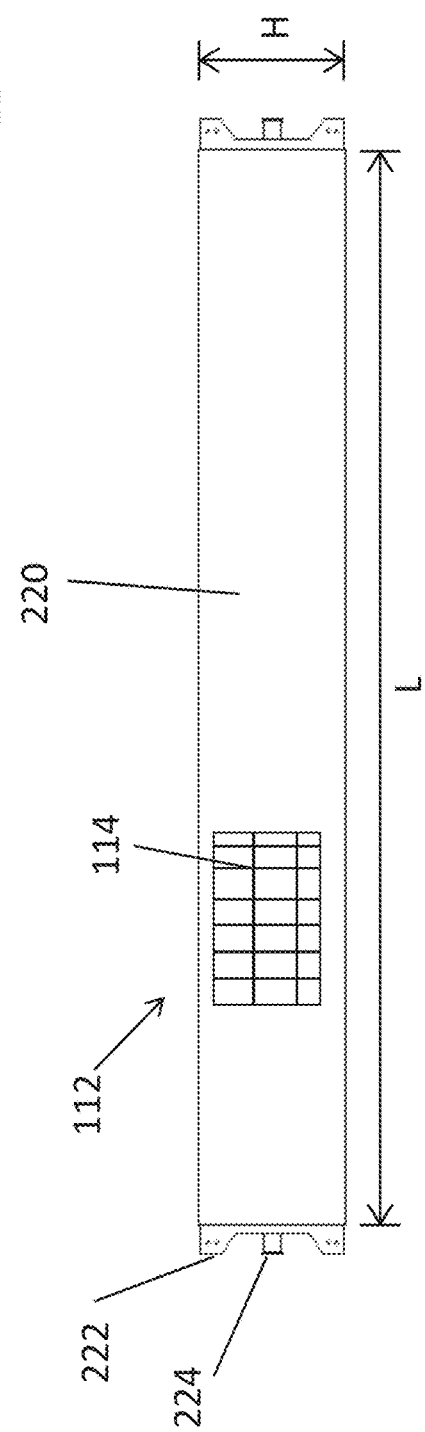

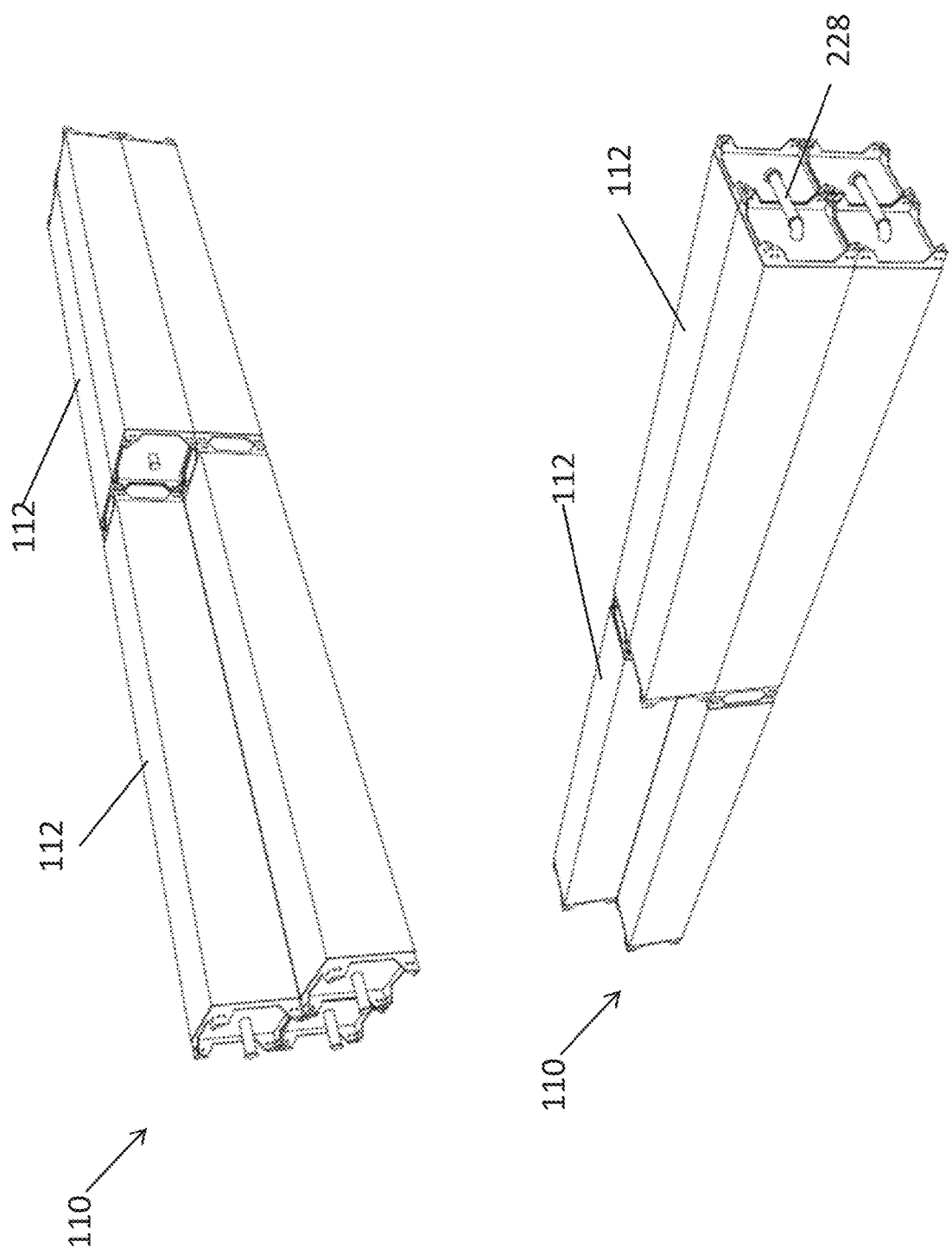

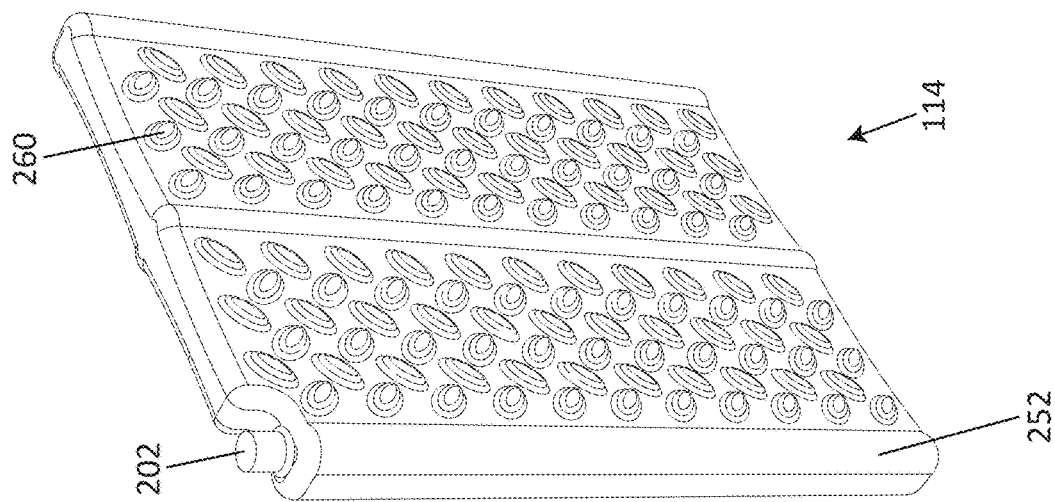
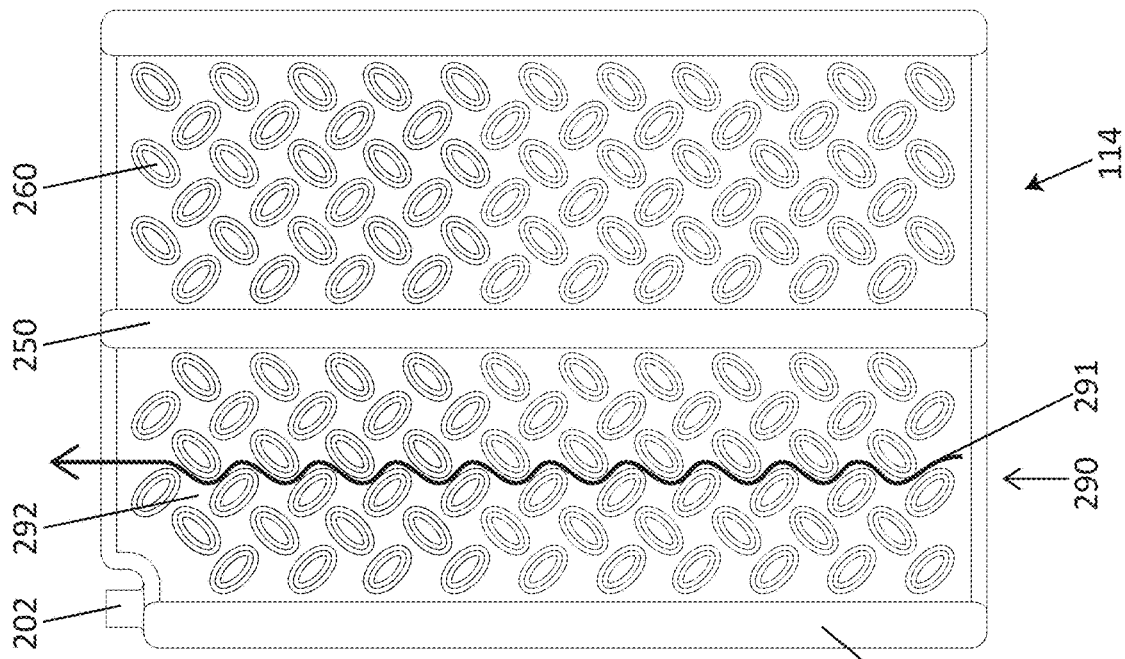
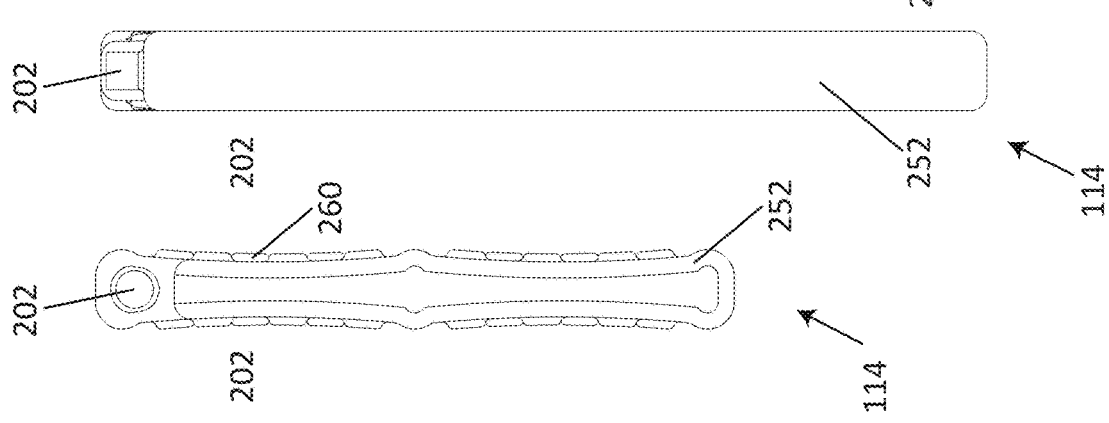

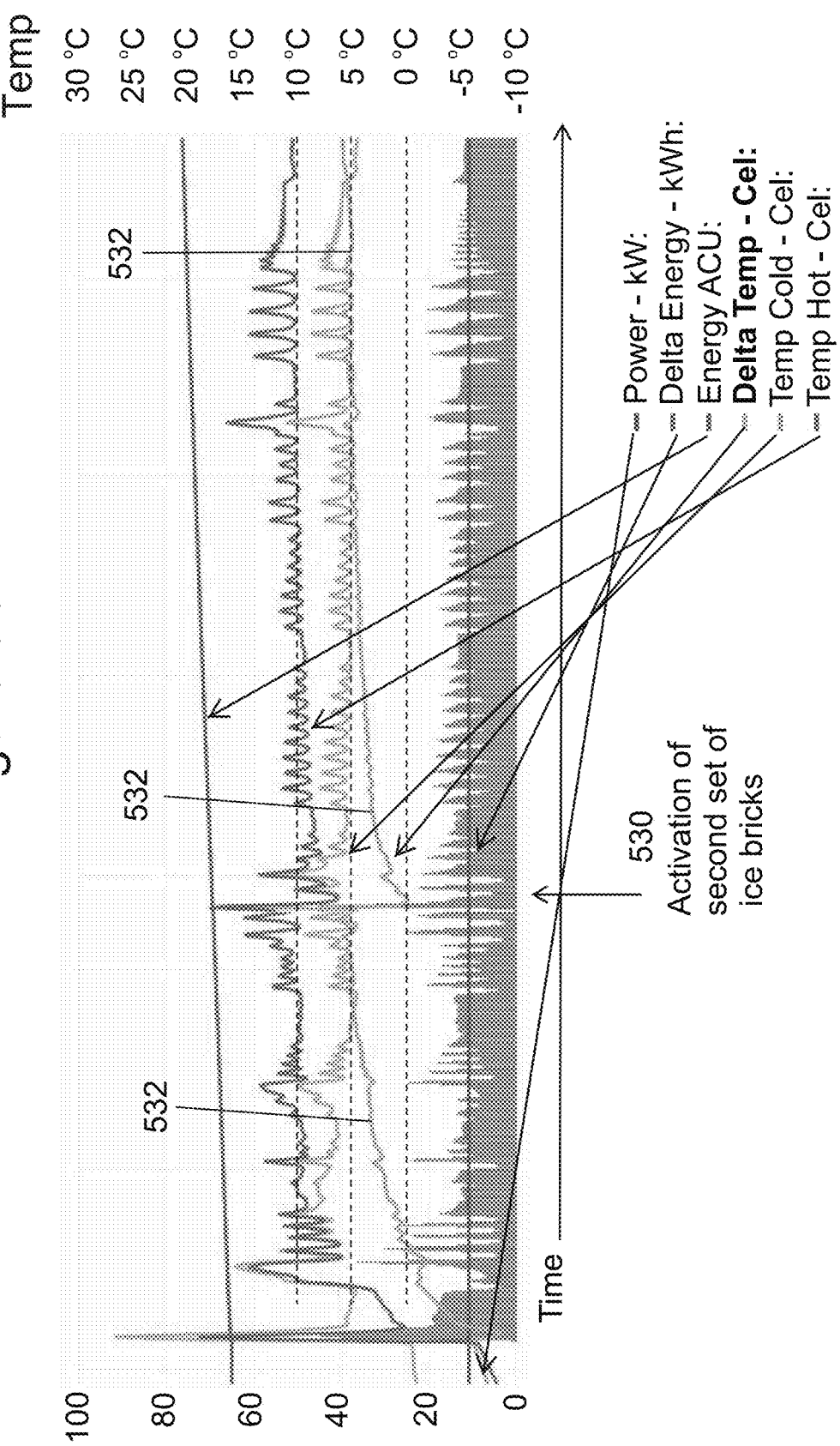

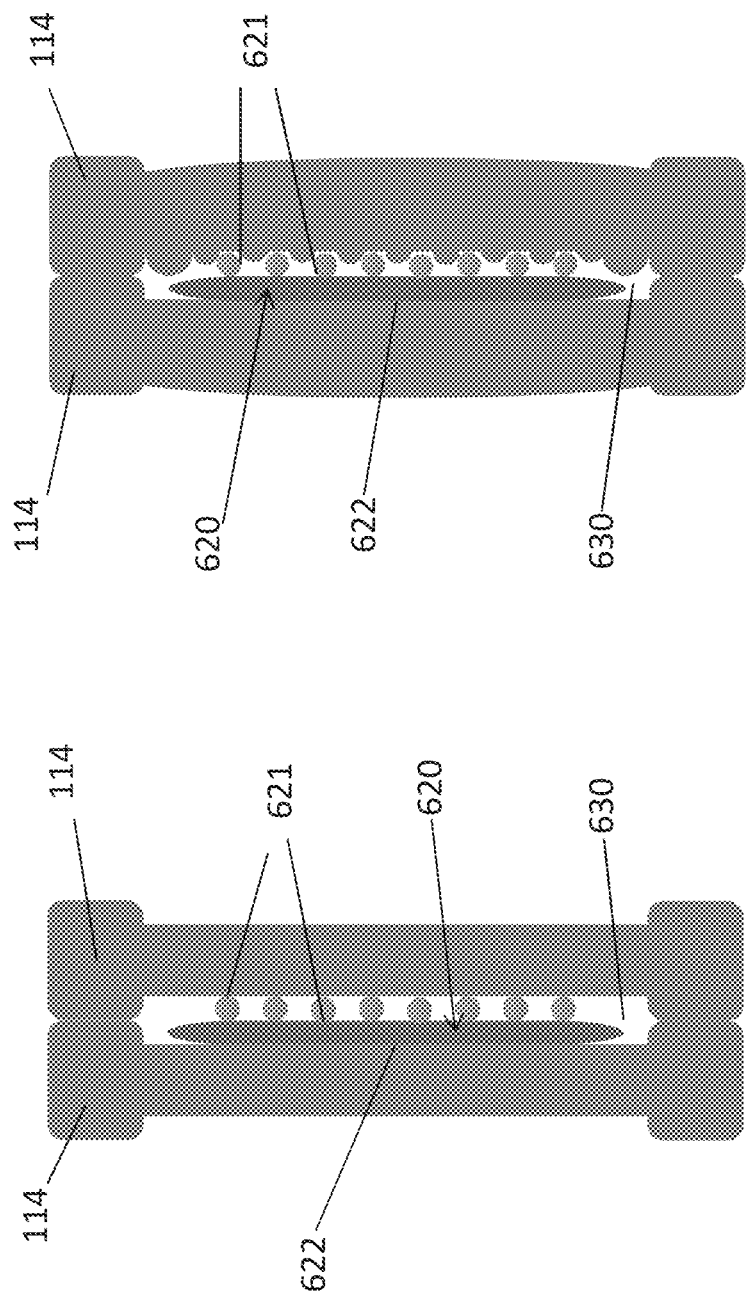

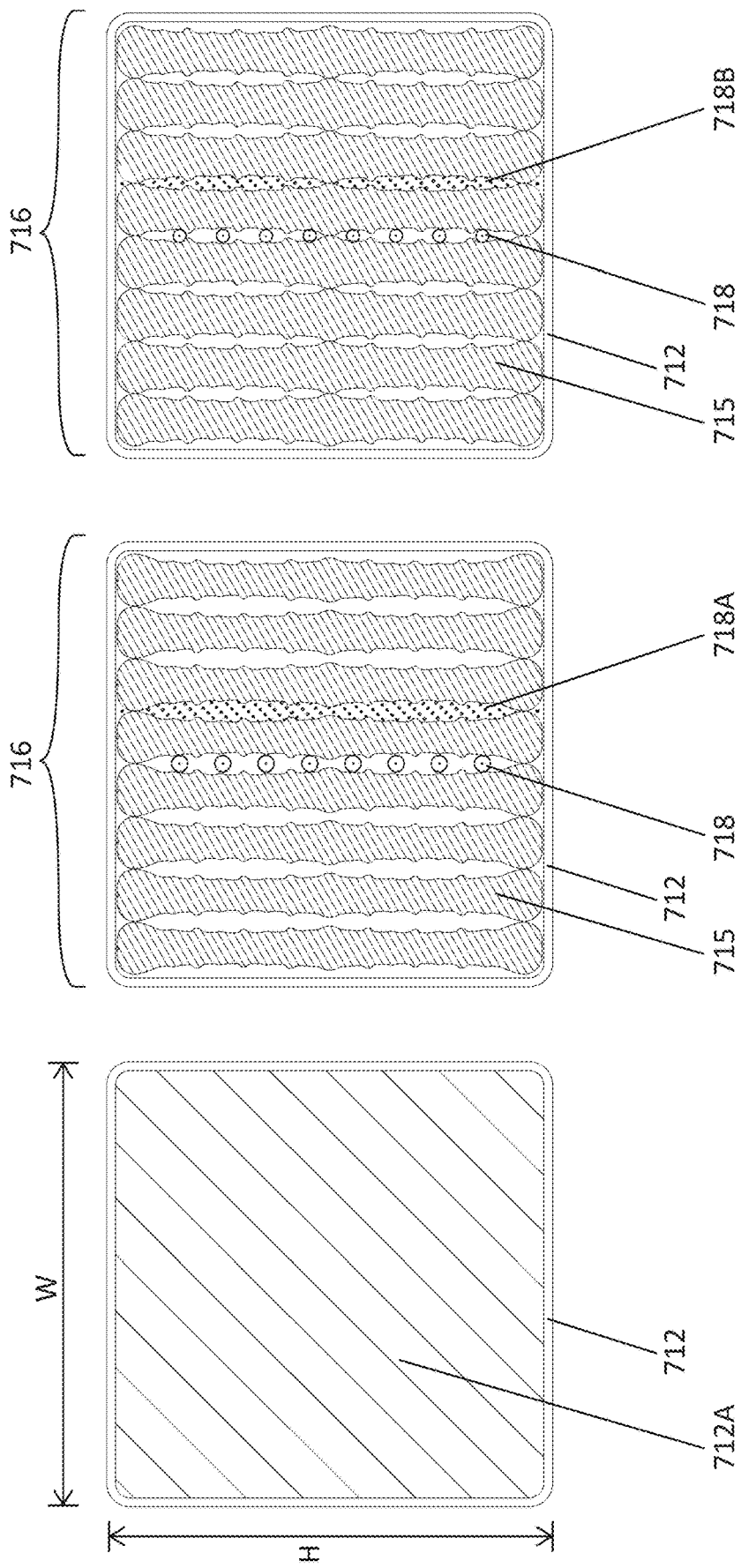

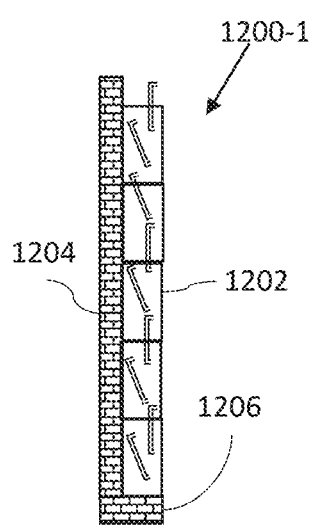
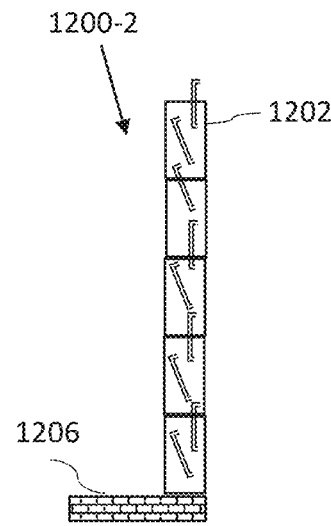
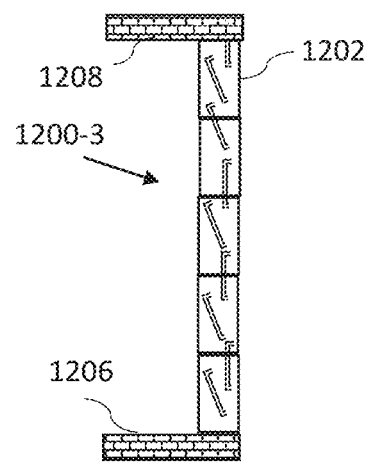
Figure 12A        Figure 12B        Figure 12C
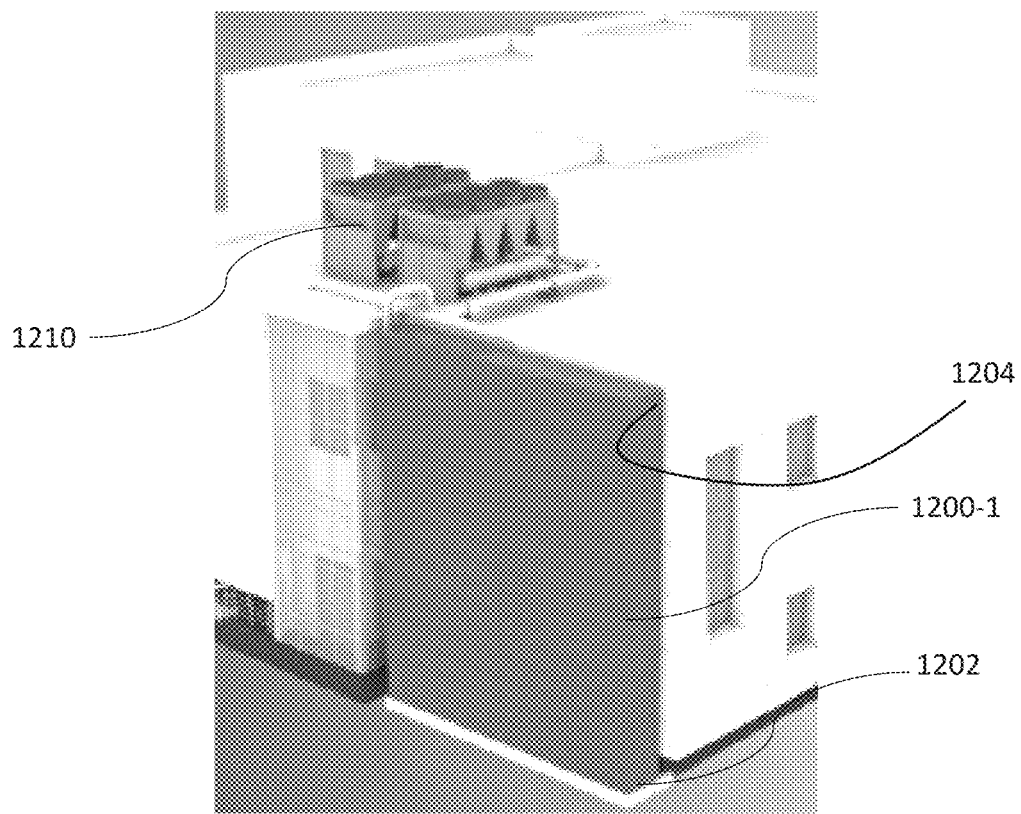
Figure 12D

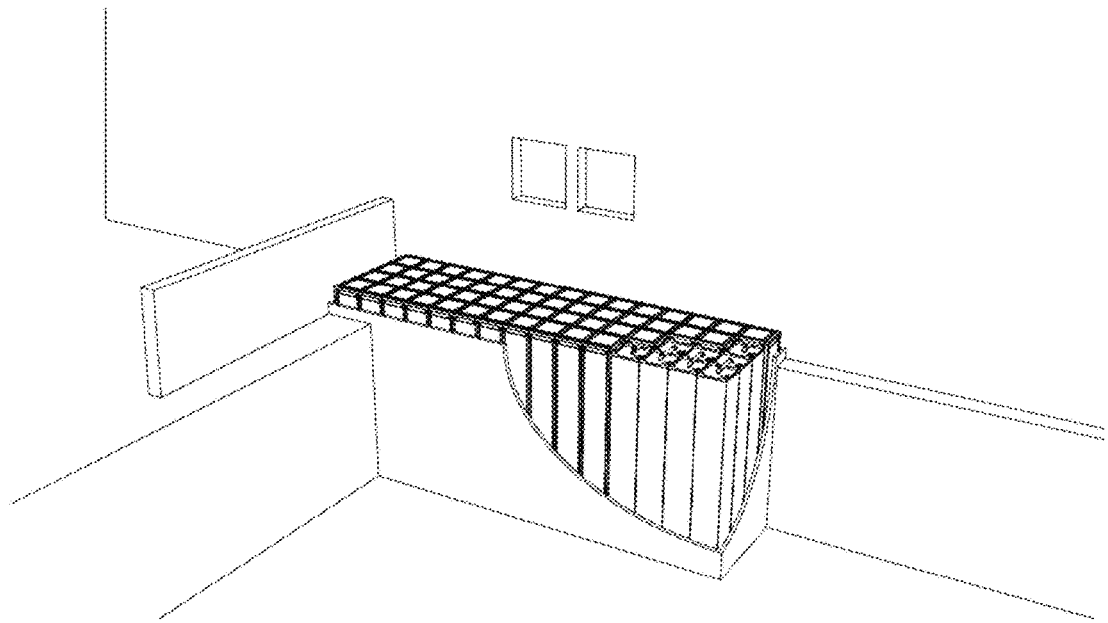

Figure 20H

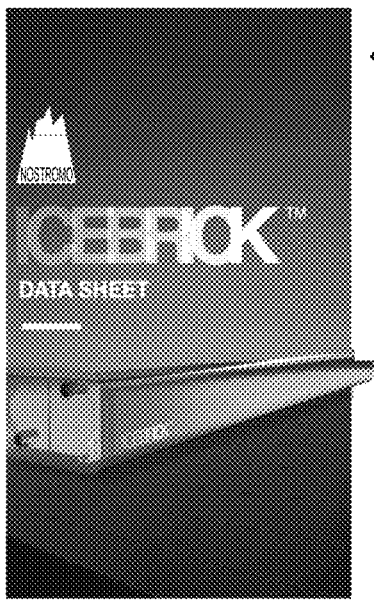

Dimensions
50x25x400cm
(19.68 X 9.84 X 196.8 in.)

Total Capacity
~10.15 Ton-Hrs.

Net-Usable Capacity
for a single cell 85%

Net-Usable Capacity
for a chained cell 95%

Solution Operating
Discharge Temp.
~0-5°C (32-41°F)

Nominal solution flow rate
2500 l/hr

Pressure drop
7 psi (0.5 bar)

At 10°C inlet and 5°C
max outlet
Stable cooling power rate
as discharged
3-4 Ton Shipping Weight
700 kg (1540 lb)

Weight, Filled
750 kg (1650 lb)

Floor Loading
350kg/m$^2$, (70 lb/sq.ft.)

Volume Of Water/Ice
336 kg

Inlet/Outlet Connecting
tubes diameter 1.5. in

Solution
25% Ethylene/
Propylene Glycol | 75% water

Figure 21

THERMAL STORAGE SYSTEM CONTAINERS EXTERNAL FEATURES AND MODULARITY

RELATED APPLICATION/S

This application is a National Phase of PCT Patent Application No. PCT/IL2020/050374 having International filing date of Mar. 27, 2020, which claims the benefit of priority under 35 USC § 119(e) of U.S. Provisional Patent Application No. 62/824,575 filed on Mar. 27, 2019, which is related to International Patent Application No. PCT/IB2018/001091 filed on Sep. 25, 2018, which claims the benefit of priority under 35 USC § 119(e) of U.S. Provisional Patent Application Nos. 62/685,147 filed on Jun. 14, 2018, and 62/562,562, filed on Sep. 25, 2017.

PCT Patent Application No. PCT/IL2020/050374 also claims the benefit of priority under 35 USC § 119(e) of U.S. Provisional Patent Application Nos. 62/824,914 and 62/824,541 both filed on Mar. 27, 2019.

The contents of the above applications are all incorporated by reference as if fully set forth herein in their entirety.

FIELD AND BACKGROUND OF THE INVENTION

The present invention, in some embodiments thereof, relates to thermal-containers and, more particularly, but not exclusively, to exchanging heat by fluid flow adjacent phase-changing material in thermal-storage containers of thermal storage systems.

Many studies of energy consumption in the developed world have pointed to peak energy (electricity) consumption occurring during less than 400-300 hours annually (5% of the time). A substantial amount of this peak energy demand may be attributed to structural cooling systems such as chillers, air conditioning or space heating systems relying on heat pumps. There is therefore a growing need to provide efficient and cost effective cooling systems that can counterbalance the grid's fluctuation.

One response to this need has been the development of thermal energy storage systems, especially ice storage systems that store cold or hot energy by running grid electricity consuming chillers or heat pumps during off-peak hours and then discharging the stored energy during peak or other hours. Some disadvantages of some current systems are their incompatibility with a commercial building, lack of modularity, and their significant footprint—often requiring the usage of expensive real estate assets of a building in order to provide sufficient thermal energy storage; as a result, this method of storing energy is almost totally absent from the commercial sector (office buildings, shopping malls, hotels, hospitals and so on), which is a great contributor to the peak demand phenomena.

The most common type of such a conventional system for storing thermal energy is known as an "ice-on-coil" storage system. These systems comprise a tank filled with water/ice as a phase change medium (PCM) for storing heat, especially by utilizing the phase change of liquid water into ice. These systems further comprise a coil that is placed inside the tank in the water in order to exchange heat with the water/ice. While charging this type of system, ice is built up around the coil in order to form a massive block. These systems suffer from a significant loss of efficiency, since the freezing of the water starts regularly at or on the coil, and frozen water is quite a good thermal insulator. Hence, a layer of ice on the coil increases its thickness when the tank is cooled to below around zero degrees Celsius with the coil in order to store latent heat energy. Consequently, an increasing insulation layer makes it increasingly difficult to freeze the whole volume of the storage tank. This is known as the "ice-build-up" problem. Conventional systems thus have to use very low temperatures for cooling the coil, which is inefficient. Furthermore, working at too low temperatures hurts the chiller's COP (coefficient of performance).

Furthermore, a different type of conventional thermal energy storage systems is known as "encapsulated ice" storage systems, wherein a plurality of containers that contain water as PCM for storing energy is placed inside a tank. A further medium, for example a water-glycol mixture, for exchanging heat with the water/ice inside the containers is pumped through the tank on demand. However, until now this type of a thermal energy storage system also lacks efficiency and reliability.

One of the inefficiencies of some current systems, especially of "encapsulated ice" and "ice on coil" systems that use water/ice, is slow or inconsistent ice nucleation that results in inefficient thermal energy storage and discharge. The inconsistent ice nucleation and generation is generally caused by super-cooled water that is not freezing at the desired temperature.

A still further limitation of some current systems is a limited ratio between storage fluid (water) volume and total system volume and/or the limited contact between the storage fluid (water) and the heat transfer fluid (such as glycol) either due to the growing water barrier between the two inside the capsules as the discharge cycle advances, to a low packing factor of the storage fluid containers, or poor design of the storage fluid containers such that they do not expose a great enough surface area to the heat transfer fluid or block the flow of the heat transfer fluid, thus greatly reducing the efficiency of the thermal storage. A further limitation in some systems is the inefficient discharge process that does not result in melting of all of the ice stored in the system. Furthermore, conventional systems provide an insufficient and especially dropping discharge rate, which is not sufficient to support load demands. In other words, conventional ice storage systems have usually the problem of an unstable and a degrading discharge behavior/discharge curve.

A further problem of some thermal energy storage systems that use water/ice as energy storage medium is that they suffer from a degradation of system performance over their lifetime, for example due to material fatigue or changes of the flow properties of the system. Especially with current "encapsulated ice systems", the repeated expansion and contraction of the volume of water while freezing can create such problems. One further problem with some conventional thermal energy storage systems that use water as PCM is a power rate drop in the second half of the discharge cycle. This phenomenon is caused by the melted water within capsules that act as barrier to the thermal heat exchange/conduction, wherein this thermal barrier gets constantly larger as the ice melts.

The disclosures of all references mentioned above and throughout the present specification, as well as the disclosures of all references mentioned in those references, are hereby incorporated herein by reference.

SUMMARY OF THE INVENTION

According to an aspect of some embodiments of the present disclosure there is provided a thermal-storage container used in a thermal-storage system to exchange heat by fluid flow though phase-changing material disposed inside the thermal-storage container, including a thermal-storage container housing, a fluid inlet and a fluid outlet, and one or more capsules containing the phase-change material, wherein the housing is shaped as an elongate container, and a ratio of length to width of the housing is between 2 and 20.

According to some embodiments of the disclosure, a width of the housing is in a range between 20 centimeters and 70 centimeters.

According to some embodiments of the disclosure, during operation, walls of the thermal-storage container are rigid enough to support the weight of at least one more container.

According to some embodiments of the disclosure, the housing has a rectangular cross section perpendicular to a long axis of the elongate housing.

According to an aspect of some embodiments of the present disclosure there is provided a thermal storage system including two or more thermal-storage containers according to any one of claims 1-4 stacked one on top of another.

According to some embodiments of the disclosure, the thermal storage system is located along a wall.

According to some embodiments of the disclosure, the thermal storage system is located as a separating wall.

According to some embodiments of the disclosure, the thermal storage system having a width in a range between 20 centimeters and 70 centimeters.

According to some embodiments of the disclosure, the thermal storage system having an energy storage capacity above 15 TRH (Ton Refrigeration Hours).

According to some embodiments of the disclosure, having a width substantially equal to a width of one of the containers, and wherein a ratio between a height and a width of the system is greater than 1.

According to some embodiments of the disclosure, wherein the system is placed abutting a wall.

According to some embodiments of the disclosure, a height of the system is not greater than a height of the wall.

According to some embodiments of the disclosure, further including a support for supporting a weight of a portion of a building.

According to some embodiments of the disclosure, a weight ratio between a weight of the container during operation, when filled with at least 90% heat-exchanging fluid, and the area of a bottom surface of the container is in a range between 50 to 800 Kg/m2.

According to some embodiments of the disclosure, including at least one thermal storage container, wherein the containers are placed abutting a wall.

According to an aspect of some embodiments of the present disclosure there is provided a method of providing a thermal storage system on a rooftop, including providing a thermal-storage container, and placing the thermal-storage container abutting a wall.

According to some embodiments of the disclosure, a height of the thermal-storage container is not greater than a height of the wall.

According to an aspect of some embodiments of the present disclosure there is provided a method of retrofitting a thermal storage system into an existing space in a building, including providing a thermal-storage container, and placing the thermal-storage container in an existing space in a building.

According to an aspect of some embodiments of the present disclosure there is provided a method of building a thermal storage system into walls of a building, including providing a thermal-storage container, and building the thermal storage container into a wall of a building.

According to an aspect of some embodiments of the present disclosure there is provided a method of building a thermal storage system into a structure, including providing a thermal-storage container, and building the thermal storage container into the structure.

According to an aspect of some embodiments of the present disclosure there is provided a method of providing a thermal storage system while saving floor space, including providing a plurality of thermal-storage containers, and stacking the thermal-storage containers on top of each other.

According to some embodiments of the disclosure, further including placing the stack of containers abutting a wall.

According to some embodiments of the present invention, there is a thermal system, comprising: two or more fluidly and mechanically coupled energy-storage containers, configured to exchange heat within an internal volume of the containers by heat-exchanging fluid flowing with phase-changing material inside the container, and comprising: a front wall, a back wall, longitudinal walls extending between the front wall and the back wall, and one or more outside connection surfaces defined by at least one of the front wall, back wall, and the longitudinal walls; and the internal volume is defined as the volume encompassed between the longitudinal walls, the front wall, and the back wall. Wherein the two or more containers are mechanically coupled at one or more of the connection surfaces of each container to define a containers arrangement.

Optionally, during operation, the longitudinal walls are rigid and support the weight of the containers.

Optionally, the weight of the mechanically coupled containers is distributed along the containers arrangement and supports its own weight when connected at two opposite ends of the containers arrangement supports.

Optionally, the containers arrangement is installed on a construction surface, and comprises one or more contact surfaces, defined by the contact area of one or more of the energy-storage containers with the construction surface; and wherein, the maximal pressure applied by the contact surface on the construction surface, during operation is lower than 350 Kg per sq meter.

Optionally, the containers arrangement is vertical, having N containers laid one on top each other, where N>1, and a width approximately equal to the width of one of the N containers, and the ratio between the height and the width of the containers arrangement is approximately N or more.

Optionally, the containers arrangement is horizontal, having M containers laid one next to each other, where M>1, and a width defined as the sum of the width of the M containers, and the ratio between the height and the width of the containers arrangement is approximately 1/M. In some embodiments the width of the container arrangement may optionally be the sum of the width of the M plus some space between the containers, and the ration may be less than 1/M.

Optionally, the heat-exchanging fluid and the phase-changing fluid fill at least 90% of the internal volume.

Optionally, the heat-exchanging fluid and the phase-changing fluid fill at least 65% of an internal volume of the energy-storage container.

Optionally, the cross-section of the energy-storage containers, taken in perpendicular to flow direction, comprise at least two straight edges.

Optionally, the straight edges define at least a portion of the outside connection surfaces.

Optionally, the cross section is a polygon.

According to some embodiments of the present invention, there is a building having thermal storage system that include energy-storage containers, configured to exchange heat within an internal volume of the containers by heat-exchanging fluid flowing through the containers and phase-changing fluid within the container, comprising:

a construction surface, which is a structural portion of the building;

two or more modular energy-storage containers installed on the construction surface, fluidly and mechanically coupled to each other, and comprising: a front wall, a back wall, longitudinal walls extending between the front wall and the back wall, and one or more outside connection surfaces defined by at least one of the front wall, back wall, and the longitudinal walls; and the internal volume is defined as the volume encompassed between the longitudinal walls, the front wall, and the back wall. The two or more containers are mechanically coupled at one or more of the connection surfaces of each container to define a containers arrangement.

Optionally, the construction surface has a weight limit of up to 800 Kg/m$^2$, and the pressure applied by the containers arrangement on the construction surface is lower than the weight limit.

Optionally, the pressure applied by the containers arrangement on the construction surface is less than 80% of the weight limit during operation.

Optionally, the containers arrangement provides an external support for supporting the weight of a construction surface of the building.

According to some embodiments of the present invention, there is a method of storing thermal energy in energy-storage containers, comprising:

selecting construction surface to have an area having:
size that fits two or more energy-storage containers;
weight capacity for holding two or more energy-storage containers arranging two or more energy-storage containers on the construction surface by abutting two or more outside surfaces of the containers.

According to some embodiments of the present invention a thermal energy storage array comprises a plurality of ice bricks wherein each of said ice bricks comprises a plurality of capsules; wherein said ice bricks are interconnected for fluid communication of a first fluid flowing through said ice bricks and wherein said ice bricks are configured in a modular structural arrangement comprising one or more of: said bricks are stacked on top of one another; said bricks are laid end to end; or said bricks are laid next to one another.

Optionally, the array further comprises insulation panels surrounding the outer surface of said modular structural arrangement of said bricks. On one hand, these insulation panels are provided for surrounding the outside surfaces of the module. On the other hand, insulation panels are avoided for non-external surfaces. The insulation panels are designed to be attached over one or more bricks according to a planned modular arrangement of bricks. This results in a homogenous ice-brick structure, an easy installation, which is also easy to disassemble. This configuration saves on the total insulation needed as only the outer surface of the complete array needs to be insulated and not every surface of every brick.

Optionally, said capsules comprise a second fluid. Optionally, said second fluid comprises water. Optionally, the array further comprises a fluid distribution system. Optionally, said first fluid has a lower freezing point than said second fluid. Optionally, said second fluid comprises an ice nucleation agent. Optionally, said ice nucleation agent is quartz. Optionally, said brick comprises between 65% and 85% of said second fluid contained inside said capsules. Optionally, the array further comprises a TES chiller for cooling said first fluid.

Optionally, the condensation part of said TES chiller is cooled by a third fluid which also cools the load in the structure serviced by said array. Optionally, the array further comprises an air compressor. Optionally, said capsule comprises a filling nozzle placed on an upper corner of said capsule to enable filling of said capsule to a maximum with said second fluid. Optionally, said capsule comprise one or more of narrow-side spacers and broad-side spacers and wherein said spacers create a gap between said capsules when these are packed together inside said brick. Optionally, said capsule surface comprises protrusions adapted to increase the turbulent flow of said first fluid around said capsules. Optionally, said brick is rectangular. Optionally, said brick has a size of 50×50×400 cm. Optionally, said brick has a size of 25×25×400 cm. Optionally, said brick has a volume of 750-1200 L. Optionally, said brick has an energy storage capacity of 15-23 TRH. Optionally, said capsule comprises a cyclohexane shape. Optionally, said cyclohexane shaped capsules are placed inside said brick to freely settle inside brick.

Optionally, said brick is adapted to be positioned underground. Optionally, said brick is cylindrical and comprises a pipe comprising a spiral metal reinforcement than runs along the outside of said brick to enable placement of said brick underground. Optionally, said capsules are arranged in a fixed position inside said brick. Optionally, said bricks further comprise a plurality of spacers inserted between said capsules, wherein said spacers ensure fluid flow of said first fluid through said brick and said spacers maximize turbulent flow when the gap between said capsules increases due to said second fluid melting.

According to some embodiments of the present invention a method for discharging a thermal energy storage (TES) system for cooling of a load comprises: providing a TES system wherein said TES system comprises an array of ice bricks, a controller, and a fluid distribution system and wherein said array is divided by said fluid distribution system into a plurality of subsets of ice bricks; wherein said controller is a computing device; activating by said controller of a first subset of said plurality of subsets such that a first fluid flows through said first subset for cooling of said load; monitoring by said controller of the temperature of said first fluid; when the temperature of said first fluid exceeds a threshold, activating by said controller of a further subset of said plurality of subsets such that a first fluid flows through said further subset for cooling of said load, wherein said further subset is a subset that has not been activated during the active discharging process; and repeating the previous two steps.

Optionally, said further subsets are activated in addition to said first subset such that said first fluid flows through all activated subsets. Optionally, the method further comprises: determining by said controller whether all of said plurality of said subsets have been activated and when all of said plurality of said subsets have been activated, terminating by said controller of said discharging. Optionally, said fluid distribution system comprises at least one pump and at least one flow control mechanism and wherein said activating a subset comprises activating said at least one pump and said at least one flow control mechanism such that said first fluid flows through said subset. Optionally, said ice bricks each comprise a container comprising capsules and comprising inlet and outlet piping for enabling fluid communication of said first fluid within said array. Optionally, said capsules comprise a second fluid that has a temperature lower than that of said first fluid prior to discharging and wherein said capsules cool said first fluid as said first fluid flows through said ice brick.

According to some embodiments of the present invention a thermal energy storage unit is provided comprising: a tube having at least one inlet and at least one outlet for a first fluid; a plurality of capsules having a second fluid therein, wherein the plurality of capsules is arranged inside the tube; wherein the first fluid is a heat transfer fluid for exchanging heat with the second fluid; the second fluid is a phase-change medium; wherein the average length of an actual flow path of the first fluid from inlet to outlet is larger than a length of the tube.

According to some embodiments of the present invention a thermal energy storage unit is provided comprising: a tube having at least one inlet and at least one outlet for a first fluid; a plurality of plate-shaped capsules having a second fluid therein, wherein the plurality of capsules is stacked inside the tube or wherein the plurality of capsules is arranged inside the tube to form a plurality of stacks of capsules; wherein the first fluid is a heat transfer fluid for exchanging heat with the second fluid; the second fluid is a phase-change medium; wherein a plurality of defined narrow or shallow flow paths for the first fluid is provided between the capsules.

Optionally, said thermal energy storage unit has capsules that are adapted such that the flow path is provided in a meander pattern in at least a part of the flow path.

Optionally, said thermal energy storage unit is configured such that the tube is rectangular; and a ratio of the length of the tube to its width is in a range of about 4 to 50; and/or a ratio of a width of the tube to its height is in a range of about 0.5 to 2.

Optionally, said thermal energy storage unit is configured such that the shape of the tube is rectangular; and a ratio of the length of the tube to its width is in a range from 12 to 20, optionally, about 16; and/or a ratio of a width of the tube to its height is about 1.

Optionally, said thermal energy storage unit is configured such that a total volume of the second fluid of the plurality of capsules is 50% to 90%, optionally, 65% to 85%, of the total volume of the tube. This has proven to be to optimal or near to optimal ratio of the volumes of second fluid to the total volume of the tube. On one hand, there has to be sufficient space for the first fluid in order to be able to exchange heat with the fluid, and on the other hand there should be as much available capacity for storing heat as possible.

Optionally, said thermal energy storage unit is configured such that the thermal energy storage is provided such that: a) the inlet and the outlet are provided at the same end of the tube; and that b) a flow of the first fluid from the inlet to the outlet over each capsule is essentially bi-directional. For example, a rubber sealing element which is placed approximately at the middle of the capsule can act as a flow divider for the flow of the first fluid inside the tube. Hence, two generally bi-directional flows of the first fluid can pass by the capsule which can have different temperatures. Consequently, the capsule is affected by two different flows of the first fluid and heated or cooled with two different temperatures such that a temperature gradient is provided inside the capsule. This temperature gradient results in an advantageous circulation of the second fluid (water) inside the capsule, which provides a heat transport effect in the interior of the capsule and which additional acts against the buildup of an isolative barrier of melted water inside the capsule.

Optionally, said thermal energy storage unit is configured such that he broad-sides of the box or plate shaped capsules are concave (shaped). Such capsules having concave walls provide a certain flexibility of the walls at least at the center. Hence, the wall of the capsule can flex in order to allow an increase of the volume of the second fluid in its phase change without getting damaged. Moreover, the concave shape of the broad-sides provides narrow-shaped and defined flow paths between capsules that are stacked side by side. Due to the concave shape of the broad-sides of the walls of the capsules, a flow channel for the first fluid is created between neighboring capsules of a stack that is narrow (or shallow). Consequently, the surface-to-volume ratio of this channel as compared to a cylindrical channel is improved, and the surface of the first fluid touching the broad-side of the capsule is increased. Hence, by providing corresponding (narrow) shapes of the flow channel (and the flow path) for the first fluid and the capsules, the heat exchange through the contact surface between capsule and first fluid is improved, wherein this is additionally a space-saving solution. In other words, by providing flat capsules with corresponding flat flow channels between, the heat exchange rate between the capsule and the first fluid can be significantly improved.

Optionally, said thermal energy storage unit is configured such that at least one surface of the capsules comprises protrusions adapted to create or increase a turbulence of the flow of the first fluid through the tube. This potentially increases the efficiency of the system.

Optionally, said thermal energy storage unit is configured such that each capsule of the plurality of capsules is of the same type, or each capsule of the plurality of capsules has the same volume for the second fluid. This potentially lowers manufacturing costs and makes it easier to create stacks of capsules with defined flow paths.

Optionally, said thermal energy storage unit further comprises rigid spacers placed between the capsules. Accordingly, rigid, e.g. grid-type, spacers made from metal or plastic are placed between the capsules' flat walls, wherein the grid may have many shapes: rectangular, rhombus or square holes grid-welded or chain-lock type. The spacers are optionally sized in such a manner that there is sufficient free space for the capsule wall to expand into, the free space should be greater than 15% of capsule volume but less than 30% of the hypothetical free flow area between the capsules without the spacers. A metal grid could be made of stainless steel rods with a diameter of approximately 2.8 mm, which are welded in square mash configuration sized 310×140 mm with 8 longitudinal rods and 6 transversal rods.

Optionally, said thermal energy storage unit further comprises flexible spacers placed between the capsules, wherein the flexible spacers comprise flaps. These flexible flaps potentially provide a flexible flow control that adjusts itself according to the charging status of the capsules.

Optionally, said thermal energy storage unit is configured such that the capsules are generally box or plate shaped; and the spacers are sized such that a free flow area between the broad-sides of two capsules is in a range of 15% to 30% of the free flow area between the capsules without the spacers.

Optionally, said thermal energy storage unit is configured such that at least one capsule comprises a nucleating agent, optionally, quartz. Consequently, the cooling temperature for the capsule can potentially be higher as compared to conventional ice storage systems.

Optionally, said thermal energy storage unit is configured such that the capsules comprise heat transfer strips, which are optionally, arranged such that they conduct heat to the interior of the capsule. A problem with some conventional capsules containing water is that the heat transfer coefficient of water is very low. Hence, the heat transfer from the very interior of the capsule to its outside is blocked by the water/ice located closer to the wall. Using heat transfer strips potentially solves this problem since they provide an efficient heat transfer also to the interior of the capsule.

Optionally, said thermal energy storage unit is configured such that the heat transfer strips are made of aluminum. This material provides a good heat transfer rate. Alternatively, the heat transfer strips can be made of another material with a good thermal conductivity, for example stainless steel. Optionally, said thermal energy storage unit is configured such that the heat transfer strips are made of a material that has a thermal conductivity k of more than 10 W/(m*K) under standard conditions. Optionally, the thermal conductivity k of the strips is larger than 75 W/(m*K) under standard conditions. This potentially further improves the ice generation process inside the capsule.

Optionally, said thermal energy storage unit is configured such that the heat transfer strips have a thickness of 0.4 to 4 mm, a length of 35 to 350 mm and a width of 5 to 10 mm. These dimensions potentially provide a good heat transfer rate to the interior of the capsule. Furthermore, these strips can be easily placed inside a capsule through a small opening.

Optionally, said thermal energy storage unit is configured such that the capsules are generally box or plate-shaped; and the capsules comprise a single filling port at a corner of the capsule. This shape has a high surface-to-volume ratio. This potentially improves the heat exchange rate between first and second fluid.

Optionally, said thermal energy storage unit is configured such that the capsules are generally box or plate shaped; and the capsules comprise ridges such that the capsules are arranged to be spaced to each other. The ridges enable the creation of free spaces for a defined flow path of the first fluid between the capsules.

Since the capsules have flat or not in generally flat broad-sides, narrow (or shallow) spaces between two stacked capsules are created. Consequently an improved and defined flow path for the first fluid is created that enables a high heat exchange rate.

Optionally, said thermal energy storage unit is configured such that the outer shape of the tube is prismatic; and a length of the prismatic tube is four times greater that its maximum diameter.

Optionally, said thermal energy storage unit is configured such that the capsules have a base body and protrusions, the protrusions protruding from the base body; the base body is generally a sphere with a first radius; the protrusions have generally the shape of semi-spheres with a second radius; the second radius is at least 50% smaller than the first radius. This preferred embodiment relates to the cyclohexane-shaped capsules, which are discussed later.

Optionally, said thermal energy storage unit is configured such that the protrusions are evenly distributed on the surface of the base body.

Optionally, said thermal energy storage unit is configured such that the capsule has 12 protrusions, and hence is cyclohexane shaped.

According to some embodiments of the present invention, a thermal energy storage system is provided, the system comprising a plurality of thermal energy storage units as mentioned above, the system characterized in that the thermal energy storage units are part of a structural arrangement of a building; wherein the structural arrangement is a wall, a floor or a roof, or a combination of a wall, a floor or a roof.

According to some embodiments of the present invention, a thermal energy storage system is provided, the system comprising a plurality of thermal energy storage units as mentioned above, the system characterized in that a ratio of a combined length of the plurality of tubes to a flow-cut-area is in a range of about 40 to 200, optionally, of about 60 and 150; wherein the flow-cut-area is defined as cross sectional free flow area for the first fluid in the tube per capsule.

Optionally, said thermal energy storage system is configured such that the number of tubes is 3 to 5, optionally, 4.

Optionally, said thermal energy storage system is configured such that the combined length of the plurality of tubes is from 10 to 20 meters, optionally, 16 meters. This did prove to create the optimal heat exchange rate for the system.

According to some embodiments of the present invention, a capsule for a thermal energy storage system or thermal energy storage unit as explained above is provided, wherein the capsule contains an ice nucleation agent, which optionally, comprises quartz.

According to some embodiments of the present invention, a capsule for a thermal energy storage system or thermal energy storage unit as explained above is provided, wherein the capsule contains at least one heat conducting element, Optionally, a metal stripe.

The technical effects of the above mentioned embodiments are explained below in more detail. One of the key performance criteria of thermal storage systems is the average discharge rate relative to the stored capacity which can be maintained through the whole discharge effective period within the required temperature limits. A typical system holding a certain capacity should be able to discharge as much as possible of its stored capacity during, for example, a 4 hour period and maintain a final exit temperature of the first fluid lower than or equal to 5 degrees Celsius.

As a result of the requirements described above the effective heat transfer rate of a given capsule should be as high as possible. In detail, the heat transfer rate of a capsule is governed by:

1. Areas of transfer of the heat, comprising:
    i. active transfer areas of the ice material (e.g., chunk) inside the capsule 715 (the heat transfer starts with the entire internal surface area of the capsule envelope and decreases while the ice material starts to melt and vice versa during ice formation)
    ii. internal areas of the capsule envelope (i.e., the ice/water heat transfer area to the material of the capsule)
    iii. external areas of the capsule's envelope (i.e., the outer heat transfer area to the first fluid)
2. Heat transfer coefficients (HTC), comprising:
    i. the second fluid, i.e., ice to water (melting) or water to ice (freezing).
    ii. further effects of water inside the capsule (i.e., the heat conduction from the inside of the capsule through the water itself)
    iii. the second fluid to the capsule material (the so-called film HTC; i.e., border effects that are e.g. dependent the circulation of the second fluid inside the capsule)
    iv. the capsule material itself, e.g., a polymer (i.e., the heat conduction of the capsule's material itself)
    v. capsule material to first fluid (i.e., border effects that are e.g. dependent on the velocity and turbulence of the first fluid flowing outside the capsule)
3. Temperature differential, comprising:
    i. total temperature differential between the interior of the capsule and the first fluid
    ii. individual differentials per stages 2i to 2v.

Several variables can be considered to be approximately constant: 1ii, 1iii, 2i, 2ii, 2iii, 2iv, 3i. The rest of the variables change during the process of discharging. In detail:

1i The ice material (chunk) surface area significantly decreases during the discharging process. The rate of decreasing is not necessarily in a linear relationship with the percentage of melted ice.

2v The heat transfer coefficient of the capsule material to the second fluid 120 is highly dependent on the flow characteristic of the second fluid 120. The fact that the space of the flow path keeps on growing due to the melting of ice (the capsules contract to their "as filled by water size") results in a decline of the HTF velocity and the plastic to HTF surface HTC declines with it (not necessarily in linear proportion to the percentage of melted ice, depending on the flow Reynolds number)

The above mentioned embodiments consider several of the above mentioned items 1 to 3. For example, plate or box-shaped capsules provide an increased capsule area relative to its volume. By reducing thickness of the capsules' material by using a rigid polymer, the HTC through the capsules envelope is improved. Providing metal transfer strips inside the capsule improves the ice to water HTC and water HTC. Causing internal circulation of the second fluid inside the capsule by exposing each capsule to bi-directional passes of the first fluid at different temperatures results in an advantageous exchange of volume of the second fluid inside the capsule, which improves the internal HTC of the capsule, since the conduction of heat is facilitated by the circulation. Providing a turbulent flow profile for the flow paths of the first fluid by adding protrusions on the capsule's surface results in a more efficient heat transfer between the capsule's envelope and the first fluid, since again the heat conduction is facilitated by the transport of the first fluid itself. In contrast, a purely laminar flow profile would negatively influence the heat transfer rate, since the velocity of the first fluid at the border of the capsule tends to zero (this is due to a border phenomenon) and hence in the case of a purely laminar flow no or just a small heat transport is provided by the movement of the first fluid itself. Using metal or other materials for spacers or a grid between the capsules results in a turbulent flow profile and defined flow paths. Using variable/flexible spacers which maintain tight flow paths between the spacer and the capsule also increases the heat transfer rate.

To summarize the above, some of the presented embodiments and aspects of the invention potentially enable water to become a usable capacitor for energy in a safe, clean, efficient and affordable fashion.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

The term "ice brick" can be understood as a thermal energy storage unit that is especially adapted to enclosing a heat transfer fluid (i.e., the first fluid) and a plurality of capsules containing the PCM (i.e. the second fluid).

The term "tube" can be understood as an elongated hollow body that has a length that is at least two times, preferable 6 times, larger than its diameter. The cross-section of said tube can be circular-, oval-, square-, rectangular- or polygonal-shaped. Optionally, the cross-section of said tube is rectangular-shaped and essentially constant over its entire length.

The term "capsule" can be understood as an enclosed volume for permanently storing a PCM, such as water or a mixture of water. Additionally, several further components or ingredients can be stored inside this enclosed volume.

The term "heat" refers to thermal energy that can be stored and exchanged.

The efficiency or effectiveness of a heat exchanger is the ratio of the rate of the actual heat transfer in the heat exchanger to the maximum possible heat transfer rate.

A cross-section shows a sectional view in a width direction of the tube.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "controller", "computing device", a "computer", or "mobile device", it should be noted that optionally any device featuring a data processor and the ability to execute one or more instructions may be described as a computer, including but not limited to any type of personal computer (PC), PLC (programmable logic controller), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such as controlling thermal energy storage, might be expected to use completely different methods, e.g., making use of expert knowledge and/or the pattern recognition capabilities of the human brain, which would be vastly more efficient than manually going through the steps of the methods described herein.

The term ton of refrigeration (TR), also called a refrigeration ton (RT), is a unit of power used in some countries (especially in North America) to describe heat-extraction capacity of refrigeration and air conditioning equipment. The TR is defined as a rate of heat transfer that results in freezing or melting of 1 short ton, 2,000 lb or 907 kg, of pure ice at 0° C. in 24 hours.

A refrigeration ton is approximately equivalent to 12,000 BTU/h or 3.5 kW.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5C shows experimental data from operation of a TES system according to at least some embodiments of the present invention;

FIGS. 6A-6G show spacers for use in an ice brick according to at least some embodiments of the present invention;

FIGS. 7A to 7D show a thermal energy storage unit and cross-sectional views of a thermal energy storage unit including the tube and capsules;

FIGS. 12A to 12D are simplified illustrations of side views and a perspective view of vertical arrangements, according to some embodiments of the invention;

FIGS. 20A to 20H are simplified schematic illustrations of a thermal-storage containers, according to some embodiments of the invention; and FIG. 21 is an example of a data-sheet of a thermal-storage container, according to some embodiments of the invention.

DESCRIPTION OF SPECIFIC EMBODIMENTS OF THE INVENTION

Figure 1A:
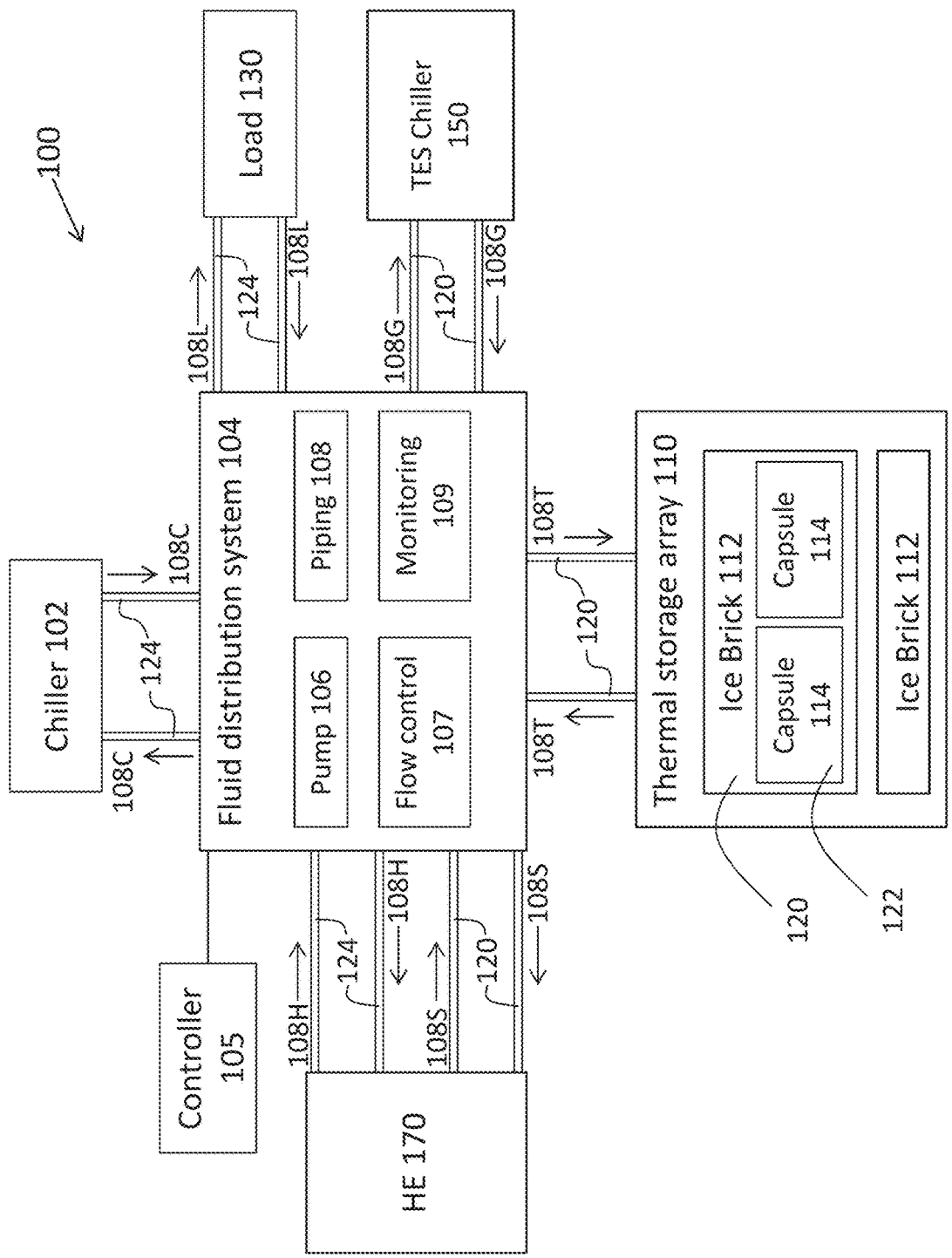
FIGS. 1A-1E are schematic diagrams of a thermal energy storage system according to at least some embodiments of the present invention.

The present invention, in some embodiments thereof, relates to energy-storage containers in thermal systems and, more particularly, but not exclusively, to modularity of energy-storage containers in thermal storage systems.

Overview

An aspect of some embodiments of the present invention relates to a thermal system having modular energy-storage containers, and at least part of the containers are coupled into one or more arrangements of containers.

According to some embodiments of the invention, heat is exchanged within the internal volume of the energy-storage containers by heat-exchanging fluid flowing through the energy-storage containers and phase-changing fluid within the container.

According to some embodiments, the containers support the load of an external structure as well as the load of their internal structure during operation, while filled with heat-exchanging fluid. In some embodiments, the energy-storage containers support their own weight, while supported at one end of the container and the other end is free of support. In some embodiments, containers support their own weight, while supported at two opposite ends of the container.

According to some embodiments of the invention, the energy-storage containers are configured for installation on a construction surface having geometrical limits and weight limits due to the external load it can support. According to some embodiments, the containers are shaped to fit the geometry of the construction surface. In some embodiments, the arrangement is shaped to fit the geometry of the construction surface. In some embodiments, the containers have a bottom surface facing the construction surfaces. In some embodiments, the arrangement is shaped to fit both geometrical and load constraints of the construction surface. According to some embodiments, a load ratio between the weight of the energy-storage container during operation (when filled with heat-exchanging fluid in addition to its weight) and the area of the bottom surface is defined according to the load limits of the construction surface holding the containers.

According to some embodiments, two or more energy-storage containers have two or more interface walls and coupling of the containers into an arrangement is by abutting outside surfaces of the two or more interface walls. In some embodiments, interface walls are shaped for abutting interface wall of other containers. In some embodiments, the arrangement of containers is a structural component. In some embodiments, the arrangement of containers is a structural component of a building. In some embodiments, the arrangement of containers is a structural component of a vessel.

According to some embodiments, two or more energy-storage containers are arranged vertically by abutting the containers. In some embodiments, the vertical arrangement is concentrated on areas identified to have enough support capability for holding external load. One example is positioning one or more containers vertically along the edge of a roof, where the roof is most resilient for holding external load.

According to some embodiments of the invention, the containers are shaped to lay longitudinally abutting one to another horizontally, engaging in one or more of straight connection surfaces. In some embodiments, the straight containers are shaped to lay longitudinally one on another vertically, engaging in one or more straight connection surfaces.

According to some embodiments, the containers are curved at the general flow direction. In some embodiments, the containers have one or more curved connection surfaces. In some embodiments, the curved connection surfaces of one container is shaped to match the curved connection surfaces of another container, to lay the containers one next to another horizontally, engaging in one or more connection surfaces. In some embodiments, the curved connection surfaces of one container are shaped to match the curved connection surfaces of another container, to lay the containers one on another vertically. In some embodiments, laying the curved containers vertically follows the geometry of a curved base wall on which the containers are installed. In some embodiments, the containers have curved connection surfaces for laying the containers juxtaposed a curved construction on which the containers are installed.

An aspect of some embodiments of the present invention relates to a building having thermal storage system that include energy-storage containers, configured to act as structural components for themselves, and to act as structural components of the building.

According to some embodiments, the containers are configured to exchange heat between heat-exchanging fluid flowing through the containers and phase-changing material within the container, and structural components for themselves is defined as having at least 68% of their inner volume filled with phase-changing material and/or heat-exchanging fluid.

According to some embodiments, the containers have two or more interface walls, which have an inside surface exposed to fluid flowing through the containers and phase-changing fluid within the container. The interface walls have geometry shaped to be modularly arranged on top of a floor of the building. In some embodiments, two or more containers are coupled into containers arrangement. In some embodiments, coupling is by abutting an outside surface of an interface wall to an outside surface of an interface wall of another container.

According to some embodiments of the invention, the modular arrangement is long and shallow. In some embodiments, the containers have high ratio of length to height. In some embodiments, the modular arrangement has high ratio between width and height. A potential advantage of spreading the containers longitudinally is spreading of the weight along a longer area and reduce pressure on installation surface. A potential advantage of spreading the containers horizontally is spreading of weight along a wider area to reduce the pressure on installation surfaces.

According to some embodiments, the energy-storage containers can be arranged vertically. In some embodiments of the invention, the modular arrangement is long and narrow with high ratio between the length of the arrangement to its width.

An aspect of some embodiments of the present invention relates to a thermal system having containers support structure, and energy-storage containers disposed within the support structure.

According to some embodiments, the support structure includes a plurality of compartments for accommodating the containers. According to some embodiments, the support structure is configured to support the internal structure of the containers. In some embodiments, the support structure reduces external pressure on containers disposed within support structure. In some embodiments, the support structure is configured to support an external structure.

According to some embodiments, each of the compartments of the support structure have two or more longitudinal walls, and two or more containers are accommodated within the compartments and extend between two or more longitudinal walls of the compartment.

According to some embodiments, containers are removable of the support structure and the arrangement after installation. In some embodiments, one container is removable out of a compartment, without removing other containers. In some embodiments, containers are removable after discharging heat-exchanging fluid out of the container. In some embodiments, containers are removable after discharging phase-changing material out of the container.

According to some embodiments, the support structure is installed vertically. In some embodiments, a container is removable sideway out of installed support structure.

According to some embodiments, the support structure is installed horizontally. In some embodiments, a container is removable in an upper direction out of installed support structure. In some embodiments, a container is removable down out of installed support structure. In some embodiments, removable container allows removing out of a wall. In some embodiments, removable container allows removing out of an underground installation (e.g. underground wall, parking floor, etc).

According to some embodiments, the thermal-storage containers, are configured to exchange heat between heat-exchanging fluid flowing through the containers and phase-changing material by capsules disposed inside the ice-bricks and containing the phase-changing material. According to some embodiments, the thermal-storage containers, are configured to exchange heat between heat-exchanging fluid flowing through the containers and cooled phase-changing material by using ice-on-coil system disposed inside the container.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Thermal-containers, and exchanging heat by fluid flow adjacent phase-changing material in thermal-storage containers of thermal storage systems are described herein. In addition, it is pointed out that additional descriptions can be found in International Patent Application Number PCT/IB2018/001091.

Layouts of Energy-Storage Containers

Figure 10A:
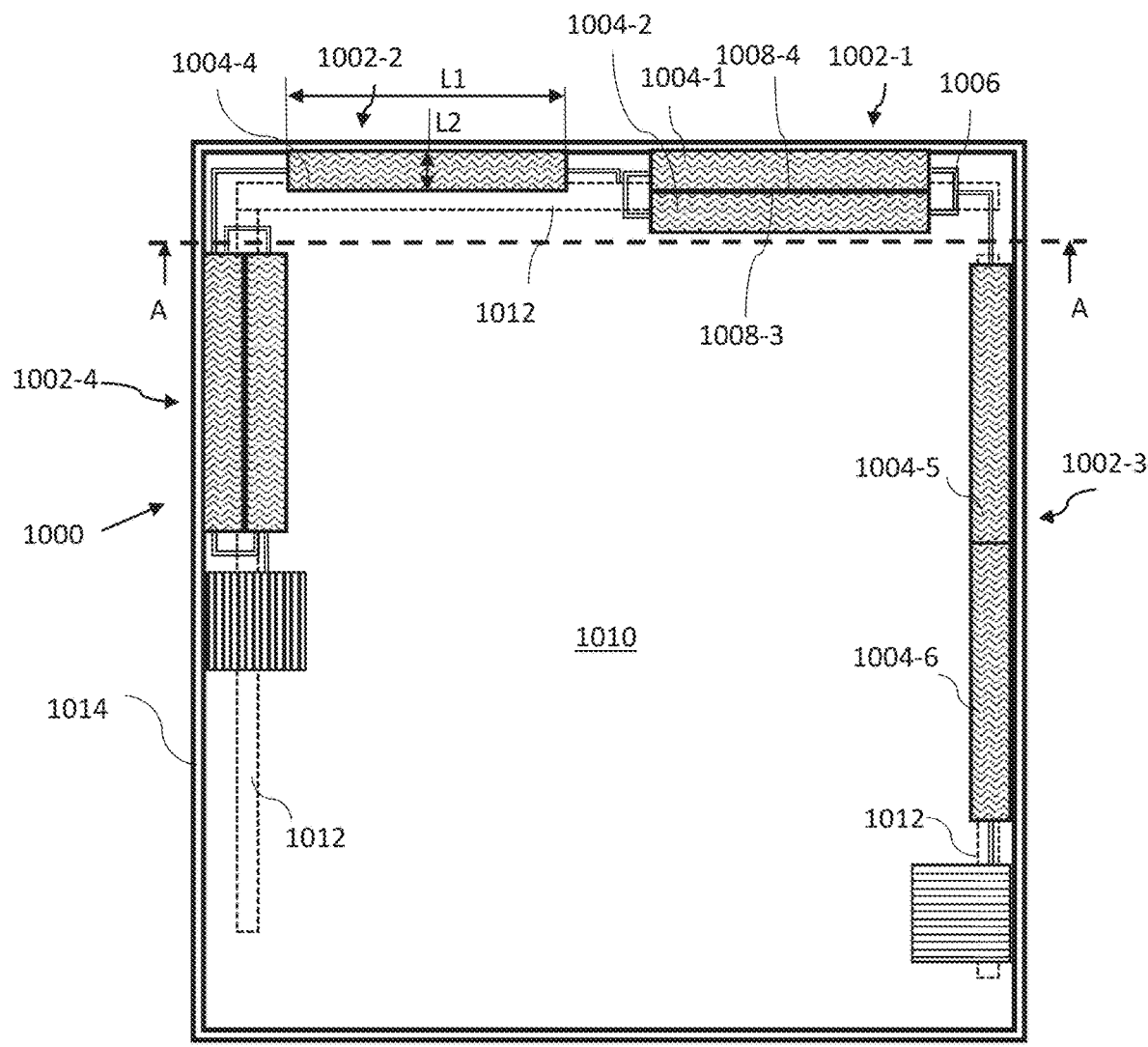
FIGS. 10A and 10B are simplified illustrations of a top view and a side section view A-A of a thermal system, according to some embodiments of the invention.
Figure 10B:
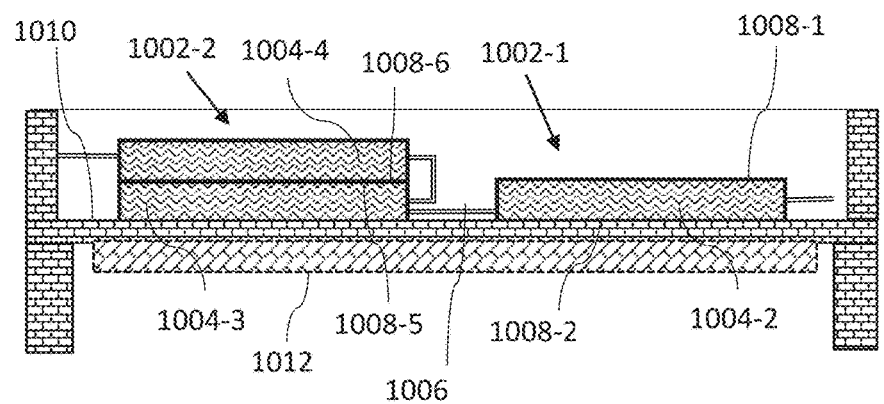

FIGS. 10A and 10B are simplified illustrations of a top view and a side section view A-A of a thermal system, according to some embodiments of the invention.

FIGS. 10A and 10B show an example of a thermal system 1000. This example of thermal system 1000 shows examples of modular arrangements 1002 (e.g. 1002-1 to 1002-4) of energy-storage containers 1004. Exchanging of thermal energy in thermal system 1000 is by flowing heat-exchanging fluid through containers 1004, which are fluidly connected by one or more pipes 1006. Thermal system 1000 cools the heat-exchanging fluid, by flowing the fluid on phase-changing fluid accommodated within containers 1004 as described elsewhere herein.

According to some embodiments, energy-storage containers 1004 are configured for installation on a construction surface 1010 having geometrical limits and weight limits due to the external pressure surface 1010 can support. In some embodiments, construction surface 1010 includes reinforced zones 1012 which have increased resilience to external forces. As shown in FIG. 10A, in some embodiments, installation location is selected to be on reinforced zones 1012. In some embodiments, installation location is at least partially on a reinforcement zone 1014 which is at a rim of a construction. In some embodiments, installation location is adjacent to a reinforcement zone 1014.

According to some embodiments, the shape and size of containers 1004 fit the geometry of construction surface 1010 or reinforced zones 1012. In some embodiments, as shown in FIG. 10B, container 1004-2 has a bottom surface 1008-2 facing construction surface 1010. In some embodiments, containers 1004 are longitudinal having a longitudinal bottom surface 1008-2. In some embodiments, surface 1008-2 is flat. A potential advantage of flat surface 1008-2 is spreading of container 1004-2 weight and the weight of the modular arrangement to reduce the pressure applied on construction surface 1010.

According to some embodiments, a plurality of containers 1004 are fluidly connected in a modular arrangement 1002. In some embodiments, the shape and size of arrangements 1002 fit the geometry of construction surface 1010 or reinforced zones 1012.

The example of modular arrangement 1002-3 shows containers 1004-5 and 1004-6 fluidly connected in a serial connection, wherein container 1004-5 is connected downstream container 1004-6. The serial fluid connection is by fluidly connecting a heat-exchanging fluid outlet of a first container 1004-5 connected to a heat-exchanging fluid inlet of a second container 1004-6. In some embodiments, serial arrangement 1002-3 is for extending an overall flow path of fluid on phase-changing material inside each of containers 1004-5/6. A potential advantage of a serial connection is improving system performance (e.g. higher and more stable power rate and depth of discharge). Another potential advantage of a serial connection is using some containers as fluid pipes to save piping work.

The example of modular arrangement 1002-1 shows containers 1004-1 and 1004-2 fluidly connected in parallel to upstream and downstream containers 1004-4/1004-5. A potential advantage of a parallel fluid connection is increasing the total capacity of the system. Another potential advantage of a parallel fluid connection is having redundant subsets of fluid flow.

In some embodiments, every two containers are connected in series and then, all the other couples in parallel. If needed a late discharge to support very high power rare we connect a new and fresh group after few hours.

Another potential advantage of redundancy based on parallel connection is in case of mechanical failure or need to remove a component the failed portion of the system can be isolated by valves or other means and the rest of the system the redundancy components can keep on working. In some embodiments, redundancy is used to backup critical systems, e.g. hospitals sensitive food or other storage or processing.

When there are weight constraints and/or footprint constraints, modular arrangements 1002 are optionally shaped and/or produced in accordance to these constraints.

As shown in FIGS. 10A-10B, energy-storage containers 1004 have two or more interface walls 1008 (e.g. 1008-1, 1008-2, 1008-3 in 1004-2) by which containers 1004 in arrangement 1002 are laid abutting each other (e.g. 1004-1 abutting 1004-2). The outside surfaces of walls 1008 have geometry (connection surface) configured to match the outside surfaces of one container (e.g. 1004-1) the outside surfaces of another container (e.g. 1004-2), so they can abut at walls 1008. Note, that even if containers are curved, they can abut and be welded to each other.

According to some embodiments, the container is laid next to the other with a gap between the interface walls 1008. In some embodiments, a gap reduces the average pressure on the construction surface. In some embodiments, the gap smaller than 50 cm. In some embodiments, the gap smaller than 30 cm. In some embodiments, the gap smaller than 10 cm.

Horizontal Arrangement

Modular arrangement 1002-3 is an example of a long and shallow arrangement, having high ratio of length to height. In some embodiments, modular arrangement 1002-1 is wide having high ratio between width and height. A potential advantage of spreading containers 1004-5/6 longitudinally is spreading of the weight along a longer area and reduce pressure on installation surface 1012. An elongated arrangement can potentially reduce the area used by the containers. In can potentially better match elongated supported areas. Supporting an elongated arrangement is potentially by connecting to smaller support zones. A potential advantage of spreading containers 1004-1/2 laterally is spreading of weight along a wider area to reduce the pressure on installation surfaces 1010.

FIG. 10A shows an example of a lateral arrangement 1002-1 of two or more energy-storage containers 1004-1 and 1004-2 by abutting connection surface 1008-4 of container 1004-1 with and connection surface 1008-3 of container 1004-2. In some embodiments, connection surface 1008-4 is the surface defining the length of the container 1004-2.

According to some embodiments, horizontal arrangement 1002-1/2 is constructed on reinforced area 1012 identified to have enough support for holding the load applied by at least horizontal arrangement 1002-1 during operation.

Figure 10C:
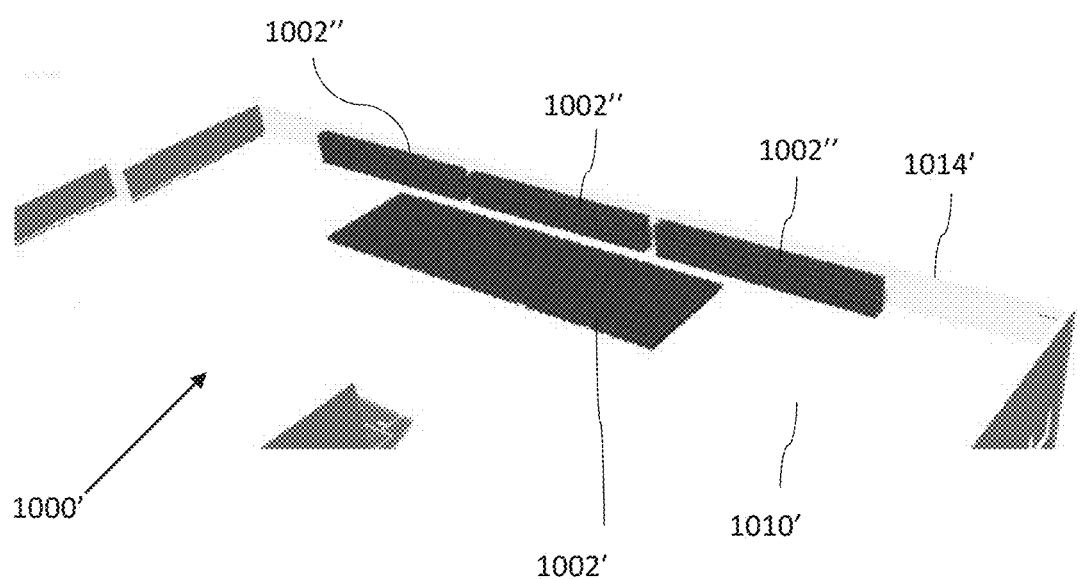
FIG. 10C is a simplified illustration of a perspective view of containers arrangements installed on a roof of a building, according to some embodiments of the invention.

FIG. 10C is a simplified illustration of a perspective view of containers arrangements installed on a roof of a building, according to some embodiments of the invention.

FIGS. 10A and 10C show examples of containers arrangements on roof 1000/1000'. In these examples roof 1000/1000' is resilient for holding external load along its rim 1014/1014'. In some embodiments, at least some of containers 1004 (e.g. 1004-5/6) are arranged horizontally, on the resilient areas along rim 1014/1014', which can hold the containers. In other examples, there could be other locations which are most resilient for external load. In some embodiments, a longitudinal arrangement 1002-3/1002" allows arrangement on a narrower supporting area than when arranging containers in a lateral arrangement (e.g. 1002-1/1002').

Figure 11A:
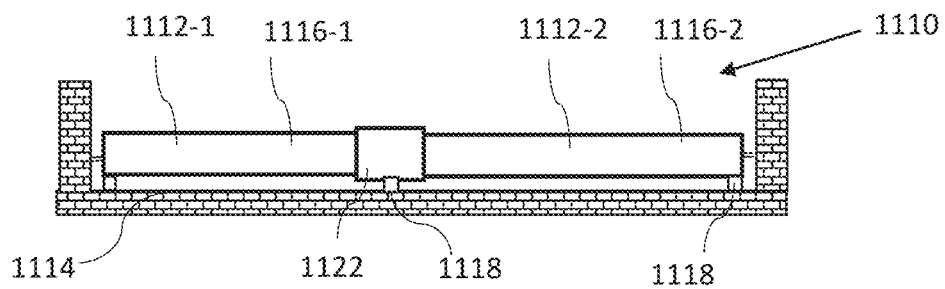
FIGS. 11A and 11B are simplified side views of horizontal arrangements of energy-storage containers, according to some embodiments of the invention.
Figure 11B:
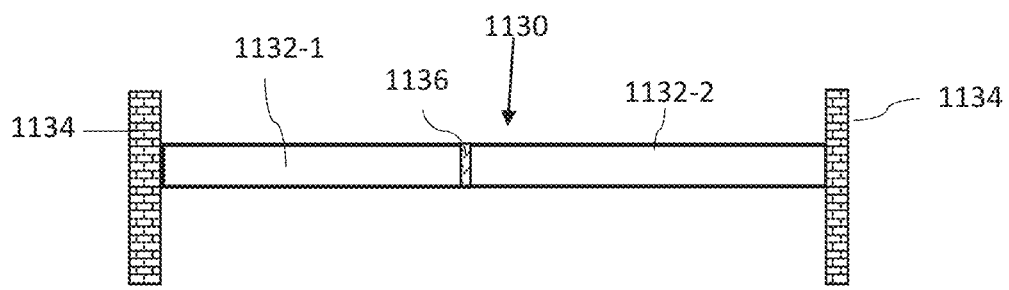

Turning to FIGS. 11A and 11B, which are simplified side views of horizontal arrangements of energy-storage containers, according to some embodiments of the invention.

According to some embodiments, constructing of containers arrangement 1110 is by coupling rigid thermal storage containers 1112. In some embodiments, container 1112 is built of housing 1116, accommodating the flow of heat-exchanging fluid. In some embodiments, housing 1116 is configured to support the weight of arrangement 1110 when the fluid flows through housing 1116 during operation. In some embodiments, the thermal storage containers are bendable. In some embodiments, supporting the weight of the containers arrangement is supported by a support structure, other than the containers.

According to some embodiments, containers arrangement 1110 is installed by laying arrangement 1110 on installation surface 1114. In some embodiments, the weight applied by containers 1112 on installation surface 1114 is directed through arrangement 1110 to zones, having load capacity that holds such weight. In some embodiments, arrangement 1110 has one or more supports 1118 that hold arrangement 1110 on surface 1114 at surface zones having load capacity that to hold such weight.

According to some embodiments, surface 1114 is horizontal. In some embodiments, installation surface 1114 is inclined. In some embodiments, an inclined arrangement is parallel to an inclined installation surface. In some embodiments, an inclined arrangement is supported by coupling the arrangement to underlying construction elements. In some embodiments, underlying support elements extend vertically to reduce inclination. In some embodiments, containers are leveled when installing containers on an inclined surface. In some embodiments, an inclined arrangement includes coupling two or more containers laid in different angles to horizontal surface (for example, V shaped, A shaped, or in steps).

In some embodiments, surface 1114 is a roof. In some embodiments, surface 1114 is a floor. In some embodiments, surface 1114 is a raised floor (e.g. a deck). In some embodiments, surface 1114 is a ground. In some embodiments, surface 1114 is underground. In some embodiments, surface 1114 is solid. In some embodiments, surface 1114 is deformable.

According to some embodiments as in FIG. 11A, mechanically coupling of containers 1112 is by a connector 1122. In some embodiments, connector 1122 has one or more ports for passing fluid pipes between containers 1112-1/2. In some embodiments as in FIG. 11B, connecting is by weldment 1136.

FIG. 11B shows another example of two containers 1132-1/2 mechanically coupled in longitudinal arrangement 1130. Arrangement 1130 defines a long beam installed by connecting to vertical walls 1134. Containers 1132 self support at least 50% of their weight between vertical walls 1134, and it is possible to lay the beam like arrangement 1130 on a horizontal surface with reduced load capability. In some embodiments, beam like arrangement 1130 is a self-support beam, which does not require a bottom surface support at all. In some embodiments, a beam like arrangement 1130 form a ceiling. In some embodiments, a beam like arrangement 1130 is reinforcing a ceiling. In some embodiments, a beam like arrangement 1130 is embedded within a ceiling. In some embodiments, a beam like arrangement 1130 is used to install the thermal system over surface, which do not have enough strength for supporting containers 1132 during operation. In some embodiments, a beam like arrangement 1130 are coupled to standard construction components (e.g. of building). In some embodiments a beam like arrangement 1130 substitute standard construction components.

In some embodiments, a longitudinal arrangement of containers is supported by a combination of connecting to a vertical wall and connecting to a horizontal surface.

Figure 11C:
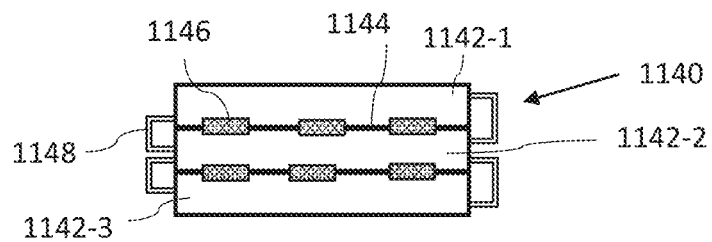
FIGS. 11C and 11D are top views of horizontal arrangements of energy-storage containers, according to some embodiments of the invention.
Figure 11D:
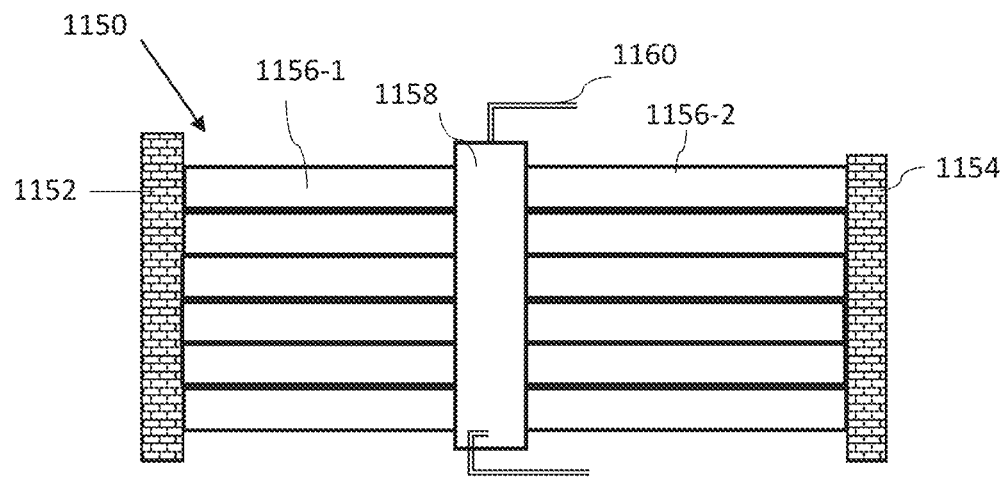

Turning to FIGS. 11C and 11D, which are top views of horizontal arrangements of energy-storage containers, according to some embodiments of the invention.

Figure 3:
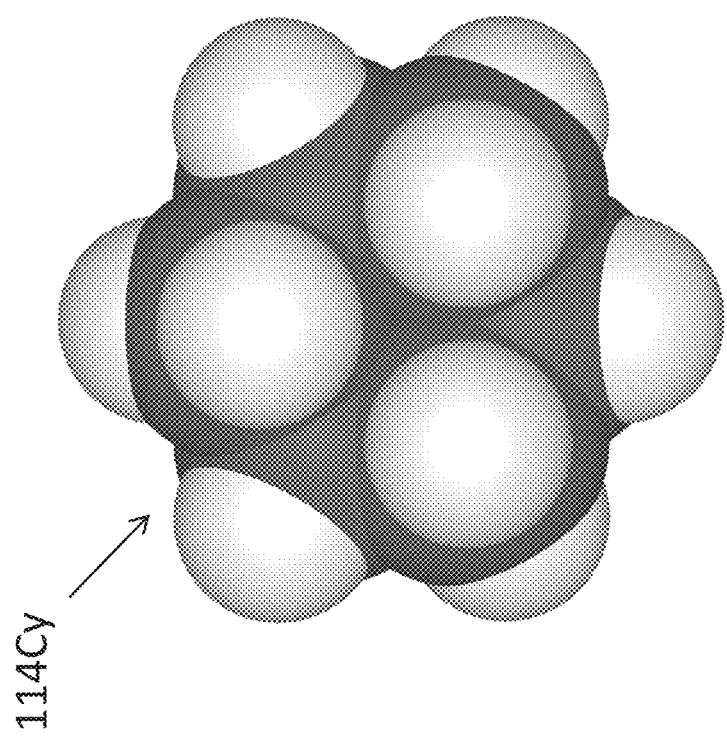
FIG. 3 shows an ice capsule according to at least some embodiments of the present invention.

In FIG. 11C, 3 containers 1142 are mechanically coupled horizontally in a wide arrangement 1140, laid next to each other at their longer walls 1144. In some embodiments, one or more of connections 1146 between containers 1142 is by weldment between walls 1144. In some embodiments, one or more of connections 1146 between containers 1142 is by weldment of a connector. In some embodiments, mechanically coupling of containers 1142 is by bolting, gluing, metal or nonmetal bands, strips, interlocking device, or other mechanical coupling methods, which do not require welding According to some embodiments, wide arrangement 1140 is installed on a surface (as in FIG. 11A). As shown in FIG. 11D, according to some embodiments, installing containers 1156 is in a wide arrangement 1150 by connecting a plurality of containers 1156 to vertical supports 1152. In some embodiments, arrangement 1130 is at least a portion of a ceiling. In some embodiments, arrangement 1150 is rigid and is reinforcing a ceiling. In some embodiments, arrangement 1150 is a platform that supports other components of the thermal system over a ceiling area which is not strong enough and/or reduce system footprint. In some embodiments arrangement 1150 is a floor. In some embodiments, arrangement 1150 is a roof. In some embodiments, arrangement 1150 acts as a raised floor (e.g. a deck). In some embodiments, arrangement 1150 is a platform that holds one or more human. In some embodiments, arrangement 1150 is a platform that holds one or more vehicles. In some embodiments, arrangement 1150 is a platform that holds equipment, such as solar collectors, chillers, compressors.

In some embodiments, horizontal arrangements 1100, 1130, 1150 self-support their weight. In some embodiments, horizontal arrangements 1100, 1130, 1150 carry a load (self+external load) of up to 1000 Kg per container. In some embodiments, horizontal arrangements 1100, 1130, 1150 carry load (self+external load) of up to 800 Kg per container. In some embodiments, horizontal arrangements 1100, 1130, 1150 carry load (self+external load) of up to 500 Kg per container. In some embodiments, a container can support more than 20 times its own operational weight if the load is evenly spread on its contact surface~14,000 kg.

According to some embodiments, mechanically coupling of containers 1156 is by a connector 1158. In some embodiments, connector 1158 has one or more ports for passing one or more pipes 1160 therethrough. In some embodiments, mechanically coupling of containers 1156 is by welding, bolting, and/or other mechanical methods. In some embodiments, containers include coupling elements, such as eyes for inserting connectors, or interlocking elements.

In some embodiments, installation is a combination of installation on a horizontal surface and connecting to vertical supports.

Vertical Arrangements

FIG. 10B shows an example of two or more energy-storage containers 1004-3 and 1004-4 are arranged in a vertical arrangement 1002-2 by coupling connection surface 1008-5 of container 1004-3 to connection surface 1008-6 of container 1004-4. In some embodiments, connection surfaces are coupled abutting each other. In some embodiments, vertical arrangement 1002-2 is concentrated on a reinforced area 1012 identified to have enough support for holding the external pressure (load) applied by at least vertical arrangement 1002-2 during operation. As shown in FIGS. 10A and 10B, at least some of containers 1004 are arranged vertically along the edge of a roof 1010, where roof 1010 is most resilient for holding external pressure.

Turning to FIGS. 12A to 12D, which are simplified side views and perspective view of vertical arrangements, according to some embodiments of the invention.

As shown in FIGS. 12A and 12D, vertical arrangement 1200-1 of containers 1202, can be installed leaning against a vertical wall 1204.

According to some embodiments, vertical wall 1204 supports arrangement 1200. In some embodiments, wall 1204 is an outer wall of a constructions (e.g. building), and arrangement 1200 is internal. A potential advantage of an internal arrangement 1200 is that the containers are environmentally protected. Another potential advantage of an internal arrangement 1200 is reduced insulation work.

According to some embodiments, as shown in FIG. 12D, arrangement 1200 is installed outside a construction and is disposed next to an outer side of wall 1204. A potential advantage of an external arrangement 1200 is that does not occupy internal space. Another potential advantage of an external arrangement 1200 is that it can be installed from outside a building, without affecting or interrupting internal activities. potential advantage of an external arrangement 1200 is that maintenance of the thermal system can be done outside. As shown in FIG. 12D, building accommodates other components 1210 of the thermal system, such as chillers outside the building, e.g. on the roof of the building.

As shown in FIG. 12B, vertical arrangement 1200-2 of containers 1202, can be installed without having a supporting wall. According to some embodiments, vertical arrangement 1200-2 is rigid to self-support its vertical construction. In some embodiments, containers 1202 are rigid and provide the support required by vertical arrangement 1200-2. In some embodiments, vertical arrangement 1200 constructs a wall of a building and substitutes wall construction blocks.

As shown in FIG. 12C, in some embodiments, vertical arrangement 1200-3 can carry weight and support portions 1208 of a construction. In some embodiments, vertical arrangement 1200-3 support a ceiling 1208.

According to some embodiments, vertical wall 1204 supports arrangement 1200. In some embodiments, wall 1204 is an outer wall of a constructions (e.g. building), and arrangement 1200 leans at an internal side of wall 1204.

Figure 13:
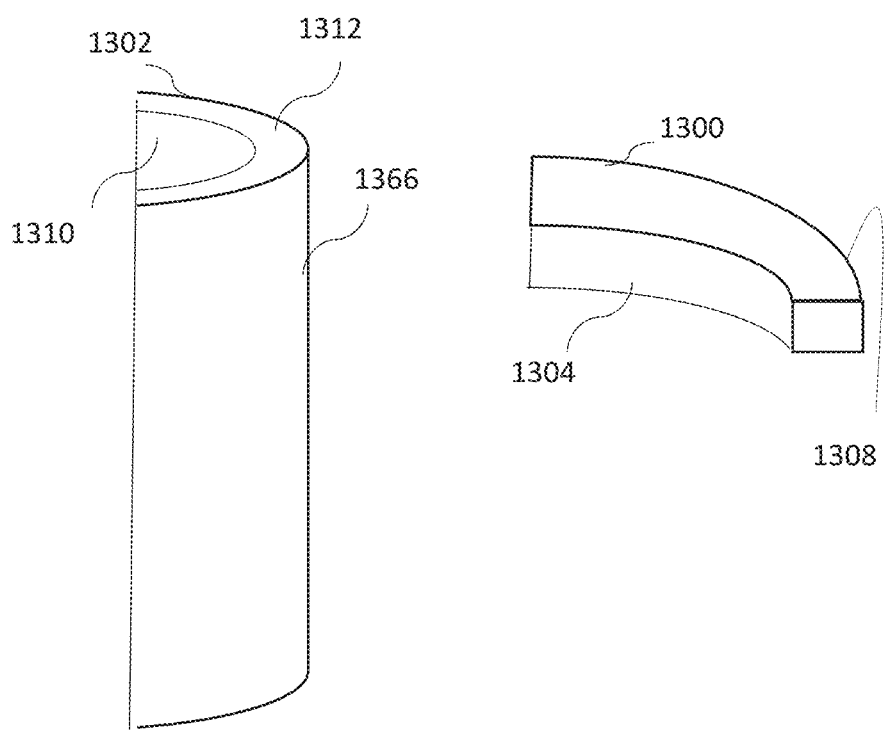
FIG. 13 is a simplified illustration of perspective views of a vertical wall and an energy-storage container, according to some embodiments of the invention.

Turning to FIG. 13, which is a simplified illustration of perspective views of a vertical wall and an energy-storage container, according to some embodiments of the invention.

According to some embodiments, container 1300 is curved. In some embodiments, container 1300 is curved to fit geometrical requirements at the installation area. In some embodiments container 1300 is curved to produce flow parameters for fluid flowing within container 1300.

According to some embodiments, a wall 1302 of a construction is curved, and a curved vertical arrangement of energy-storage containers 1300 is installed adjacent to curved wall 1302.

According to some embodiments, installation is adjacent an outer side of wall 1302 and inner surface 1304 of container 1300 is shaped to match outer surface 1306 of wall 1302. In some embodiments, installation is adjacent an inner side of wall 1302 and outer surface 1308 of container 1300 is shaped to match the inner surface 1310 of wall 1302.

According to some embodiments, curved vertical arrangement is installed on an upper surface 1312 of wall 1302 and the curvature of container 1300 is defined according to curvature of surface 1312. In some embodiments, the curvature of container 1300 is defined according to architectural requirements.

Cross Sectional Shapes of Containers

Figure 14A:
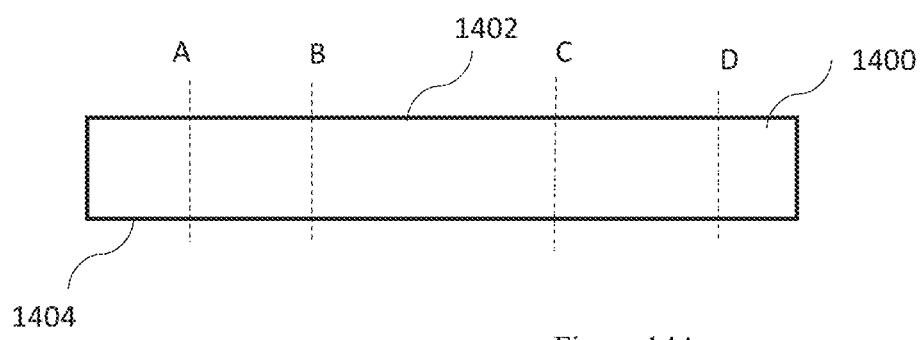
FIGS. 14A to 14C are simplified illustrations of a side view and cross sectional views of energy-storage containers, according to some embodiments of the invention.
Figure 14B:
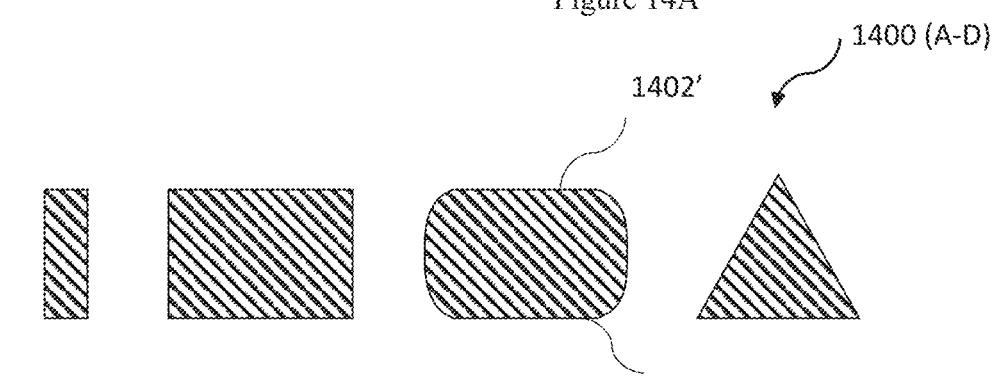
Figure 14C:
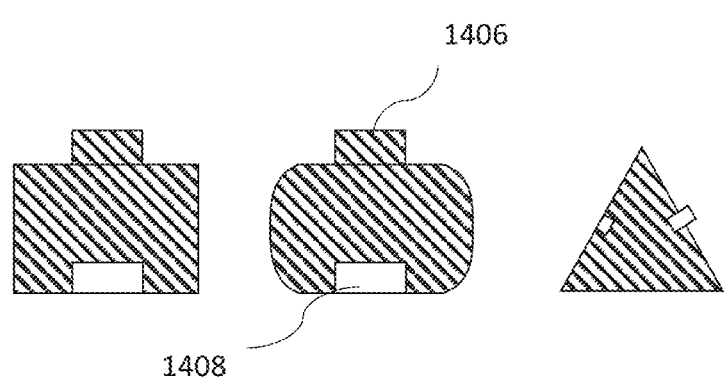

Turning to FIGS. 14A to 14C, which are simplified illustrations of a side view and cross sectional views of energy-storage containers, according to some embodiments of the invention.

The shape and size of the cross section of the energy-storage containers are optionally defined according to mechanical requirements (internal or external), flow requirements, and/or thermodynamic requirements. According to some embodiments, the cross-sections are defined to have modular containers.

According to some embodiments, the cross section is uniform along the length of the container. In some embodiments, the cross section has uniform shape with varying dimensions along the length of the container.

As shown in FIG. 14A, container 1400, can have one or more cross sections (A-D) at different sections along its body. According to some embodiments, the cross-section of the containers defines the enclosing walls of container 1400. In some embodiments, the edges of the cross section construct contact surfaces 1402/4 as described elsewhere herein.

As shown in FIG. 14A, cross section 1400 of the containers can be polygonal. In some embodiments, the cross section includes one or more curved edges. According to some embodiments, the cross sections have two or more straight edges. In some embodiments, straight edges 1402'/1404' construct a flat butting contact surfaces 1402/1404 as described elsewhere herein.

As shown in FIG. 14B, a cross section of a container can include one or more protruding portions 1406. In some embodiments, a cross section of a container can include one or more extruding portions 1408. In some embodiments, protruding portions 1406 and extrude portions 1408 define coupling zones for laying containers abutting each other by matching protruding portions 1406 with extrude portions 1406.

Longitudinal Shapes of Containers

Figure 15A:
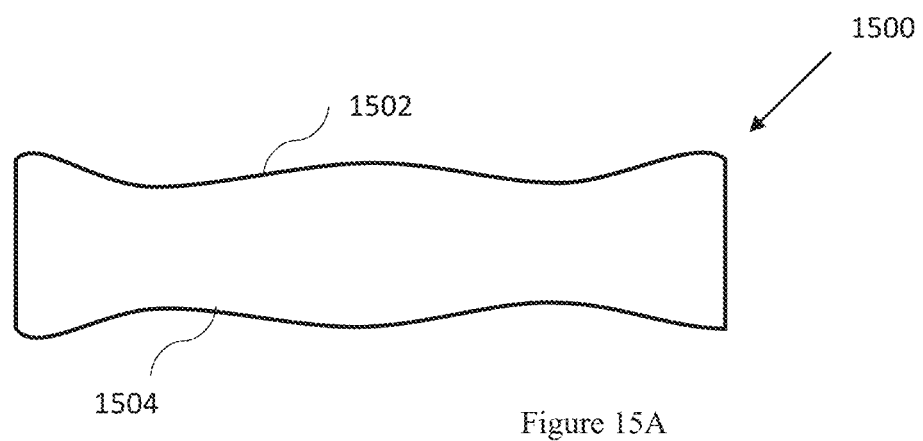
FIGS. 15A to 15B are simplified illustrations of a top view and a side view of energy-storage containers, according to some embodiments of the invention.
Figure 15B:
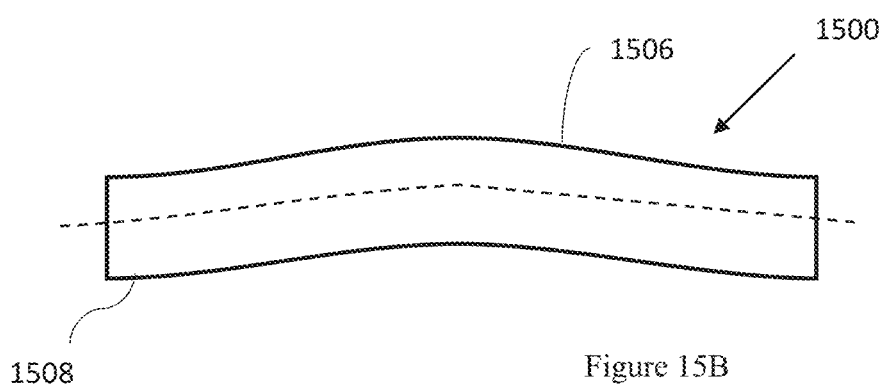

Turning to FIGS. 15A to 15B, which are simplified illustrations of a top view and a side view of energy-storage containers, according to some embodiments of the invention.

According to some embodiments, the cross section is uniform along the length of the container. In some embodiment, the cross section has uniform shape with varying dimensions along the length of the container.

As shown in FIG. 15A, which is a top view of container 1500, in some embodiment, the cross section has varying dimensions along the length of the container. In some embodiments, the distance between the walls 1502/4 varies along the length of the container. In some embodiments one or more walls 1502/4 have undulating shape. In some embodiments undulating shape is used to control the fluid flow profile inside the container. In some embodiments, one or more walls 1502/4 have sinusoidal shape. In some embodiments, the distance between walls has a constant gradient along the length of container 1500.

As shown in FIG. 15B, container 1500, has upper wall 1506 and bottom wall 1508. In some embodiments, one or more of walls 1506/8 are curved in vertical direction.

According to some embodiments, the distance between upper wall 1506 and bottom wall 1508 varies along the length of container 1500.

According to some embodiments, the shape of walls 1502 to 1508 is defined according to fluid dynamics parameters (e.g. to modify velocity). According to some embodiments, the shape of walls 1502 to 1508 is defined for fitting containers 1500 in a modular arrangement. In some embodiments, the shape of walls 1502 to 1508 is defined according to architectural requirements.

According to some embodiments, a catalog of containers is defined listing containers parameters such as: shape, charging rates, discharging rates, flow length. In some embodiments, containers are ordered according to such parameters.

Container Support Structure

Access to energy-storage containers during and after installation, may be required in a thermal system such as described elsewhere herein.

Figure 16:
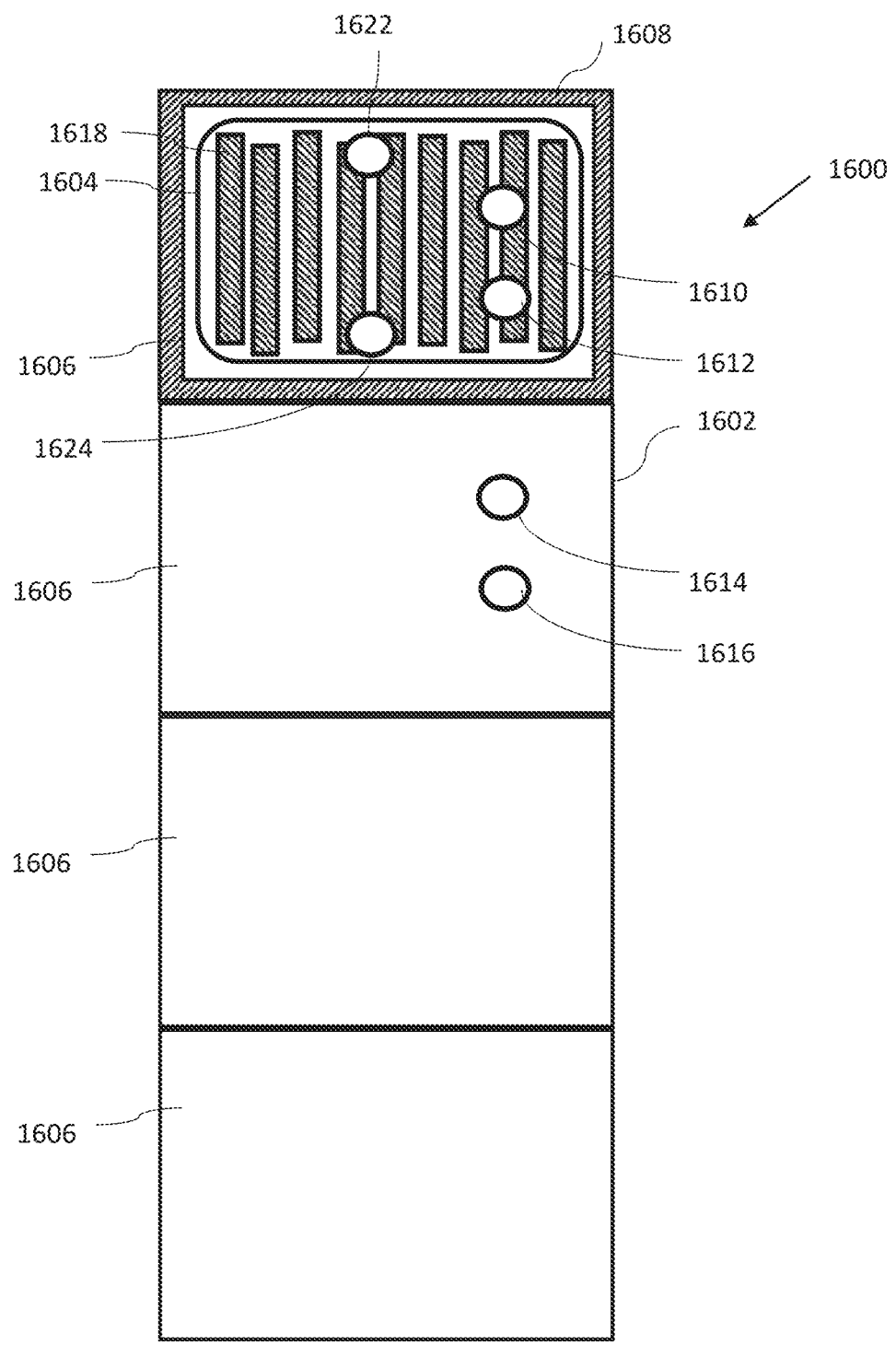
FIG. 16 is a simplified illustration of a side view of a modular arrangement of containers, according to some embodiments of the invention.

Turning to FIG. 16, which is a simplified side view of a modular arrangement of containers, according to some embodiments of the invention.

FIG. 16 shows an example of a modular arrangement 1600, built of a containers support structure 1602 configured to hold containers 1604 in a vertical arrangement. Support structure 1602 has a plurality of compartments 1606 for accommodating a plurality of containers 1604. In FIG. 16, top compartments 1606 and container 1604 are illustrated in a cut view to show the interior of compartment 1606 and container 1604 disposed therein.

In some embodiments support structure 1602 is configured to stiffen arrangement 1600. In some embodiments, support structure 1602 reduces external pressure on containers 1604. According to some embodiments, compartments 1606 have two or more longitudinal walls 1608 and one or more containers 1604 are accommodated within compartments 1606. In some embodiments, containers 1604 extend between two or more opposite walls 1608.

According to some embodiments, container 1604 can be removed out of compartment 1606, without removing other containers disposed in other compartments. In some embodiments, removing of containers 1604 is after discharging heat-exchanging fluid out of container 1604. In some embodiments containers 1604 have an inlet 1610 and an outlet 1612 for filling and discharging heat-exchanging fluid. In some embodiments, access to inlet 1610 an outlet 1612 is via ports 1614 and 1616 defined at compartment 1606.

According to some embodiments, one or more of containers 1604 are encapsulated containers having a plurality of capsules 1618 filled with phase-changing fluid for freezing capsules 1618 to produce iced heat-exchanging surfaces. In some embodiments, container 1604 comprises one or more capsules filling pipes 1622/1624 for filling and/or discharging phase changing fluid into/out of capsules 1618. In some embodiments, discharging of phase changing fluid reduces the weight of container 1604. In some embodiments, discharging reduces the size (shrinks) of container 1604. In some embodiments discharging is performed prior to unloading container 1604 from compartment 1606 in structure 1602.

In some embodiments, container 1604 are removed sideway out of installed support structure 1602. For example, when support structure 1602 is adjusting a wall, or when support structure 1602 forms a wall.

According to some embodiments, having supporting compartment 1606 enables using containers 1604 having reduced mechanical strength. In some embodiments, the walls of containers 1604 are not rigid. In some embodiments, the walls of containers 1604 are flexible.

According to some embodiments (not shown), the support structure is installed horizontally. In some embodiments, a container is removed in an upper direction out of installed support structure. For example, when support structure is on a floor, or when support structure forms a floor. In some embodiments, a container is removed down out of installed support structure. For example, when support structure is adjusting a ceiling, or when support structure forms a ceiling.

According to some embodiments, compartments 1606 of the support structure are straight. In some embodiments containers 1604 are shaped and sized to fit straight compartments 1606.

According to some embodiments, the compartments 1606 are curved. In some embodiments, the compartments 1606 are curved to form a "snake like" shape. In some embodiments containers 1604 are shaped to fit curved compartments 1606.

According to some embodiments, support structure 1602 is configured for isolating containers 1604.

Exemplary Design flow

According to some embodiments, part of the design of the thermal system includes designing a layout of the energy-storage containers. The design can include steps related, for example to mechanical design, fluid dynamics, and thermal design. The design depends on input about installation location, such as: geometry, static parameters, dynamic parameters, and safety factors. The thermal and fluid flow design can depends on required output, input conditions, input from other devices upstream and downstream containers, etc.

Figure 17:
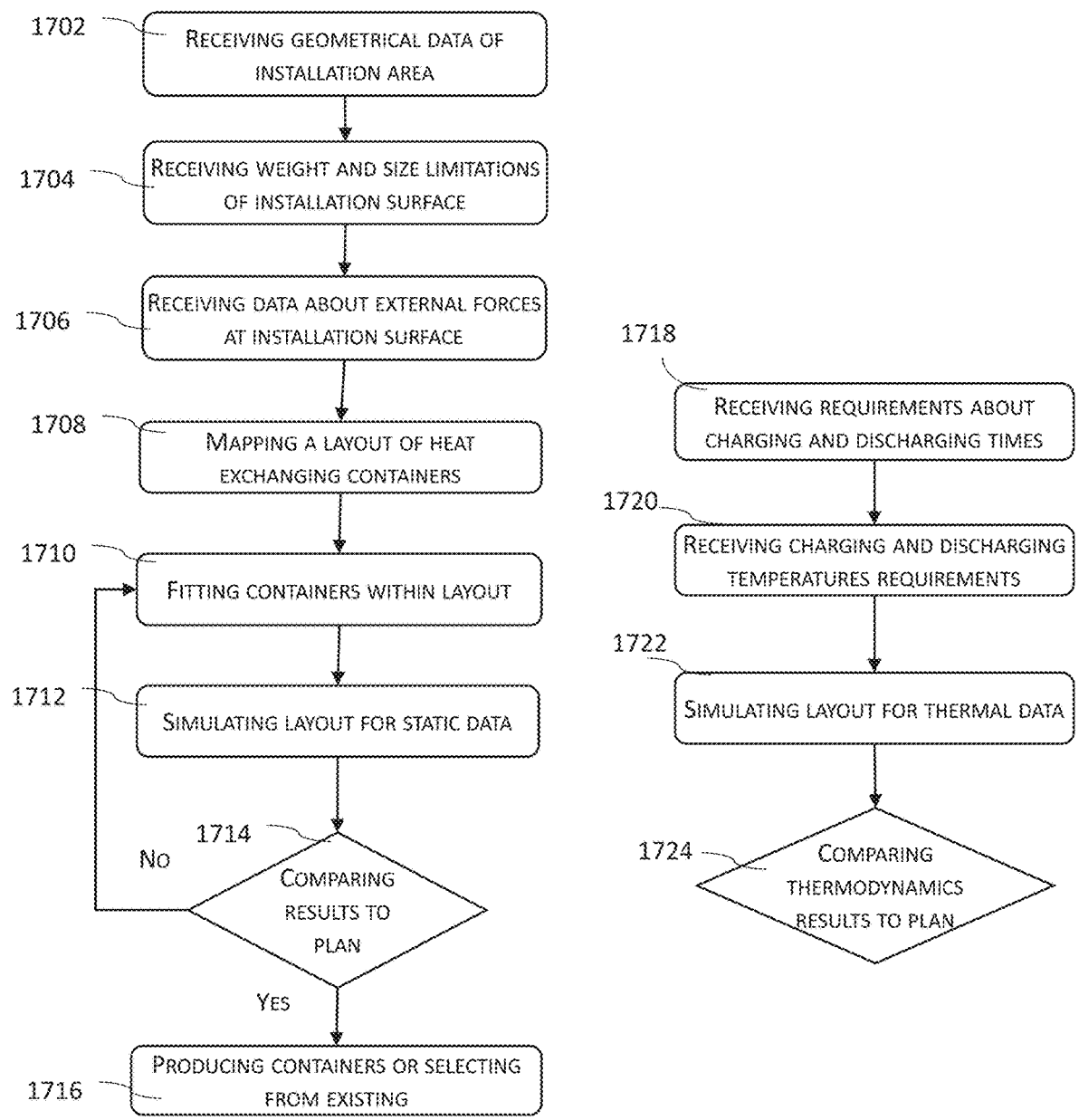
FIG. 17 is a simplified illustration of a design workflow, according to some embodiments of the invention.
Figure 18A:
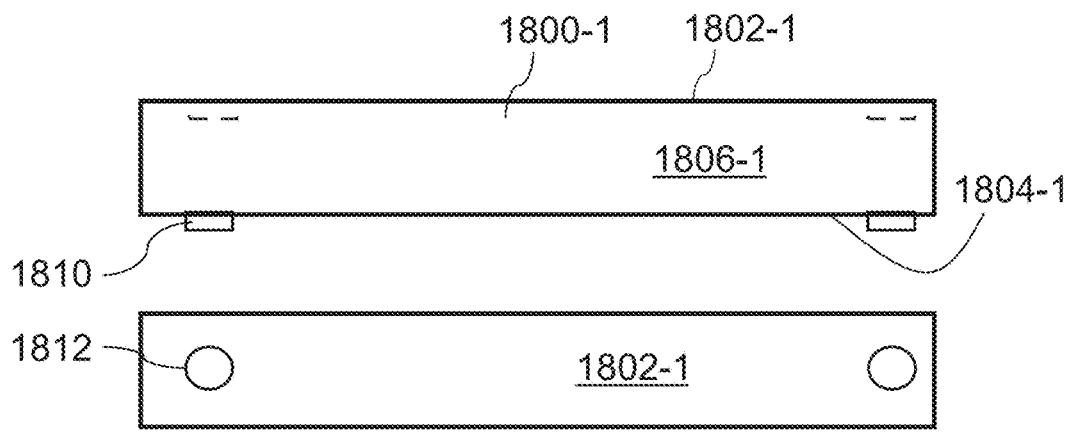
FIGS. 18A to 18D are simplified illustrations of side views and top views of energy-storage containers, according to some embodiments of the invention.
Figure 18B:
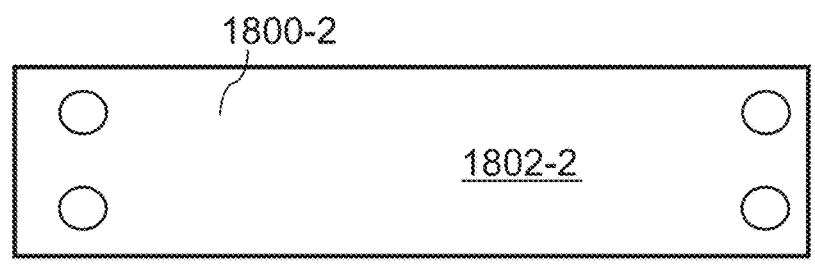
Figure 18C:
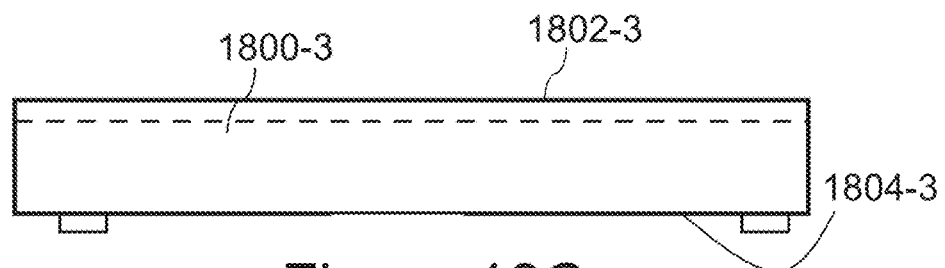
Figure 18D:
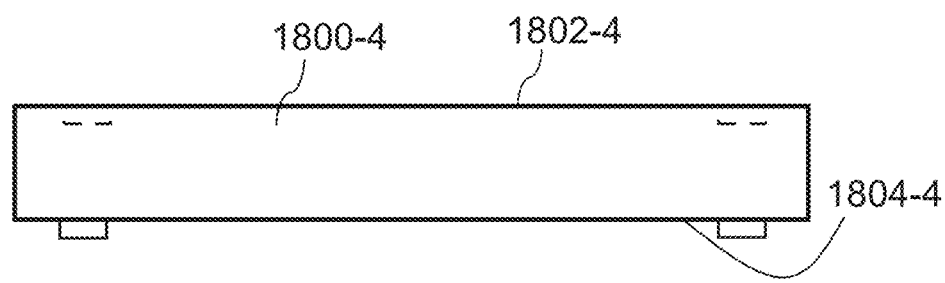
Figure 18D:

Turning to FIG. 17, which is a design workflow, according to some embodiments of the invention. According to some embodiments, the design workflow includes the following steps. Some of the steps are optional, and some of the steps can be followed in different order.

Receiving 1702 geometrical data of installation area.

Receiving 1704 weight and size limitations of installation surface.

Receiving 1706 data about external forces (such as wind, rain, snow, etc.) at installation surface.

Mapping 1708 one or more layouts of energy-storage containers.

In some embodiments, mapping 1708 includes positioning containers on areas having higher weight support.

Steps 1702-1708 can be considered as mechanical design preparation steps.

Fitting 1710 containers within one or more layouts.

In some embodiments, fitting 1710 includes defining containers parameters, such as:

geometry, width, height, length, and quantity. In some embodiments, fitting includes defining weight of container. In some embodiments, fitting 1710 includes connecting containers with other devices of the thermal system.

According to some embodiments, fitting 1710 includes selecting containers of a library of pre-defined containers. In some embodiments, fitting 1710 includes designing containers, which are not on a pre-defined library.

Simulating 1712 layout for static data.

In some embodiments, simulating 1712 includes a 2D or 3D modeling. In some embodiments, simulating 1712 includes static simulation.

Comparing 1714 results to plan.

If results are acceptable, checking will be following by Producing 1716 containers or selecting from existing.

If results are not acceptable, checking 1714 will be following by repeating steps 1710 (or 1708) to 1714.

According to some embodiments, thermodynamic design can be done in parallel or incorporated to the mechanical design steps (such as 1702-1714). In some embodiments, the thermodynamic design includes:

Receiving 1718 requirements about charging and discharging times.

Receiving 1720 charging and discharging temperatures requirements. In some embodiments, requirements include thermal capacity.

Simulating 1722 size and layout for thermal data.

Comparing 1724 thermodynamics results to plan.

According to some embodiments, design flow includes designing a control system, which is dependent on parameters of the containers. In some embodiments, control system has parameters related to size of containers. In some embodiments, control system has parameters related to flow geometry in containers.

In some embodiments, system parameters such as: charging rate, discharging rate, and cooling capacity, are affected by the containers layout. In some embodiments, the number of containers affect the system parameters.

Fitting Contacting Surface of Containers

Turning to FIGS. 18A to 18D, which are simplified illustrations of side views and top views of energy-storage containers, according to some embodiments of the invention.

According to some embodiments the outer surfaces top 1802, bottom 1804, and side walls 1806/1808 of container 1800 can be shaped for fitting containers 1800 in a modular structure. In some embodiments, shaping of the outer surfaces is for orienting containers.

As shown in FIGS. 18A to 18D one or more outer surfaces 1802-1808 include one or more protruding portions 1810. In some embodiments, protruding portions 1810 are disposed at a bottom surface 1804. In some embodiments, protruding portions 1810 disposed at a bottom surface 1804 holds a lowermost container on an installation surface. In some embodiments, protruding portions 1810 are disposed at an upper surface 1802. In some embodiments, protruding portions 1810 are disposed at a side surface 1806/8. In some embodiments, one or more outer surfaces 1802-1808 include one or more extruding portions 1812. In some embodiments, protruding portions 1810 and extrude portions 1812 define coupling zones for laying containers 1800 abutting each other by matching protruding portions 1810 with extrude portions 1812.

Exemplary Installation flow

An installation of a thermal system, according to some embodiments of the invention includes the installation of energy-storage containers. The installation of energy-storage containers can include steps related, for example to mechanical coupling, coupling related to fluid connection, and electrical connections.

Figure 19:
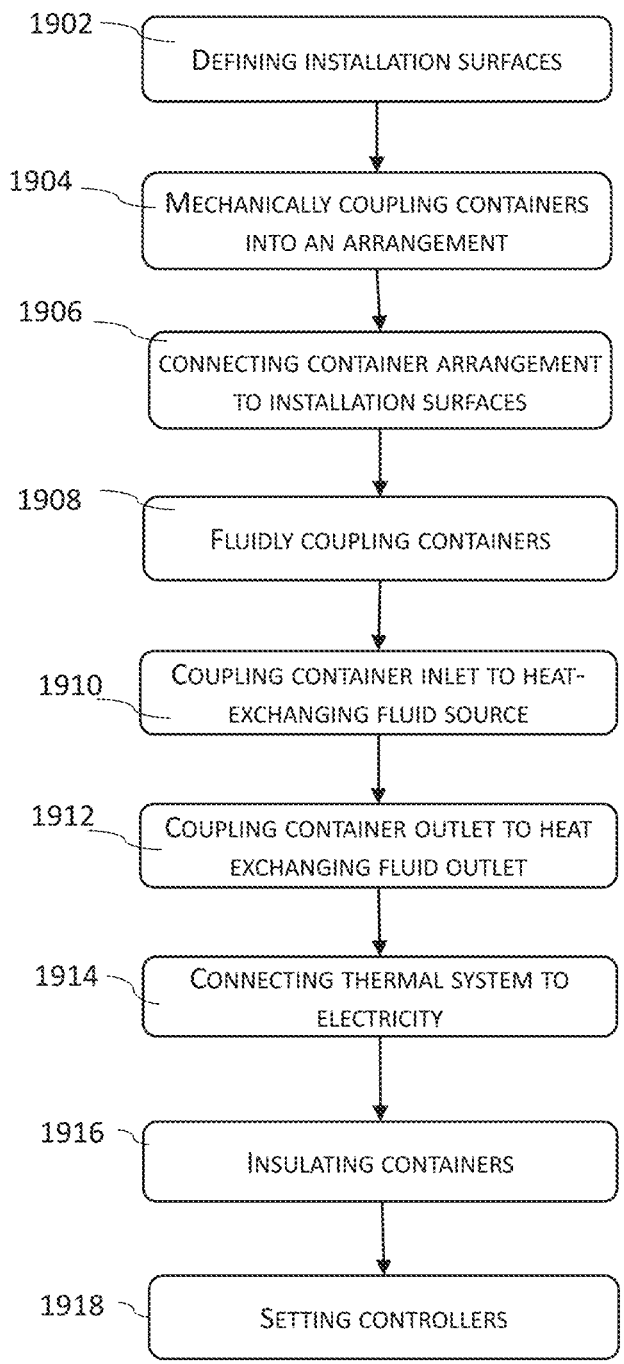
FIG. 19 is a simplified illustration of an installation workflow, according to some embodiments of the invention.
Figure 20A:
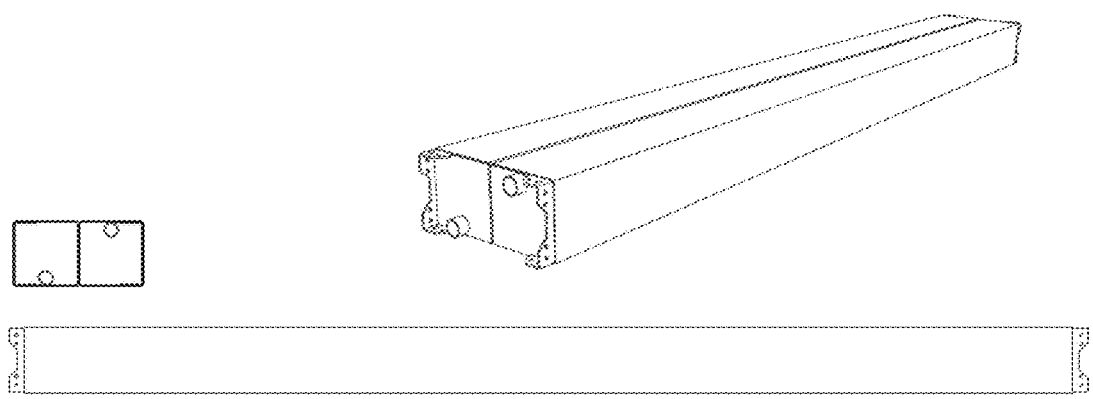
Figure 20B:
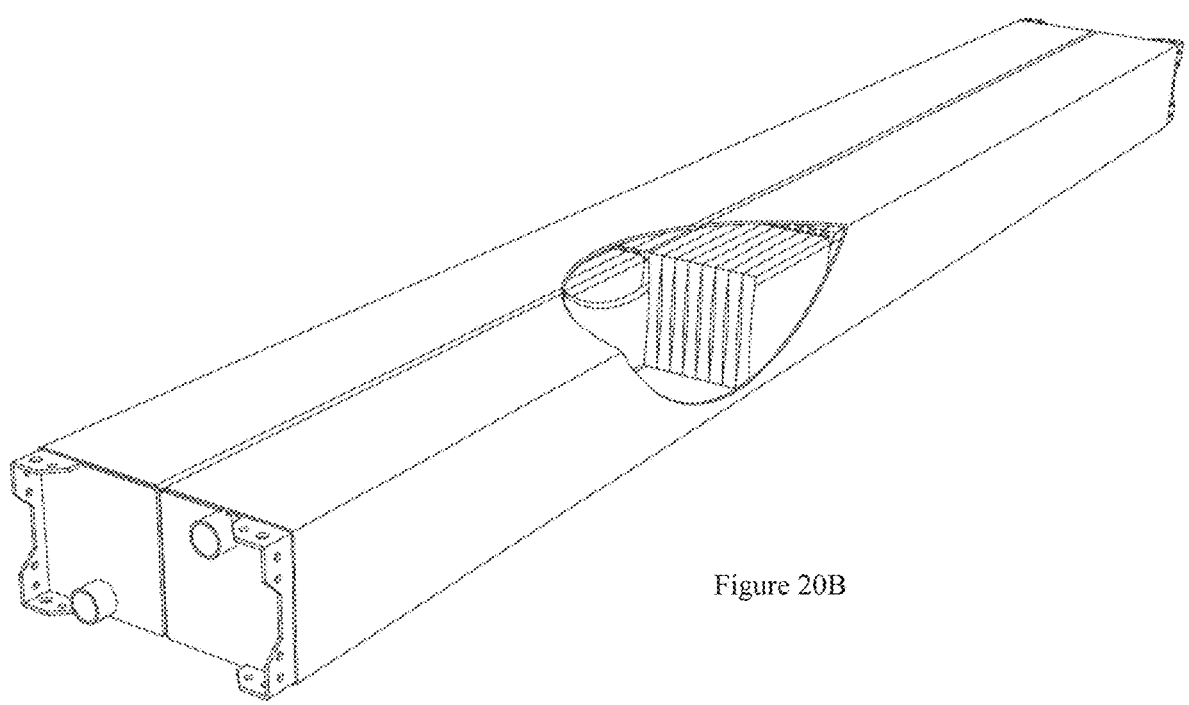
Figure 20C:
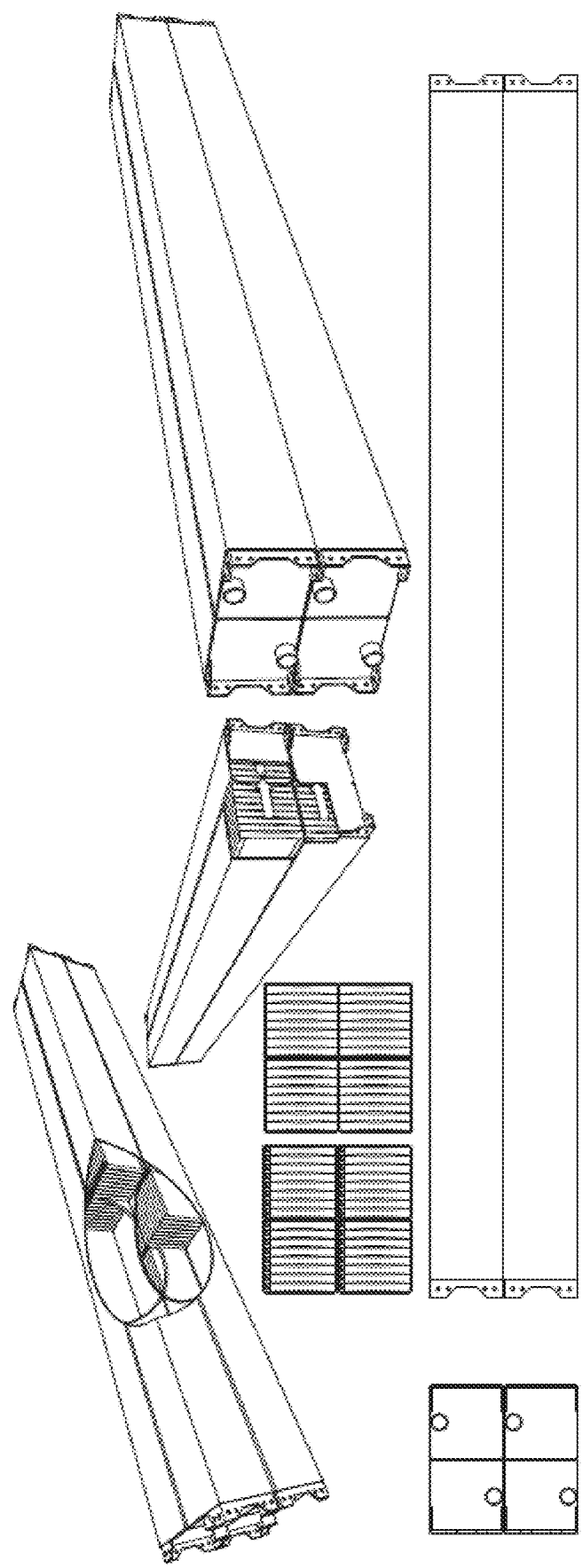
Figure 20D:
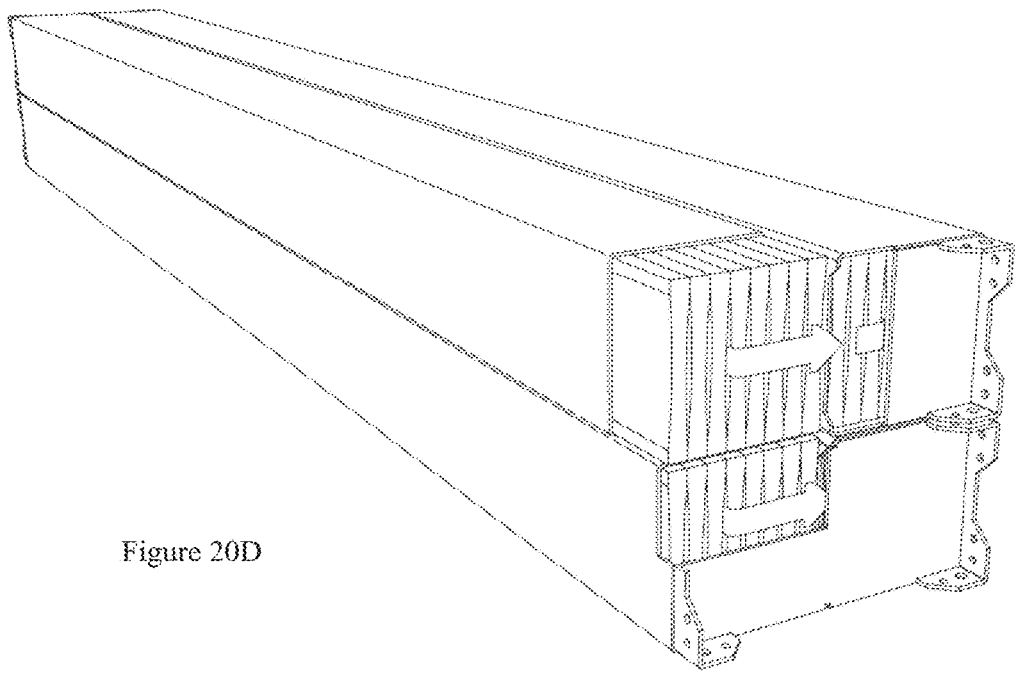
Figure 20E:
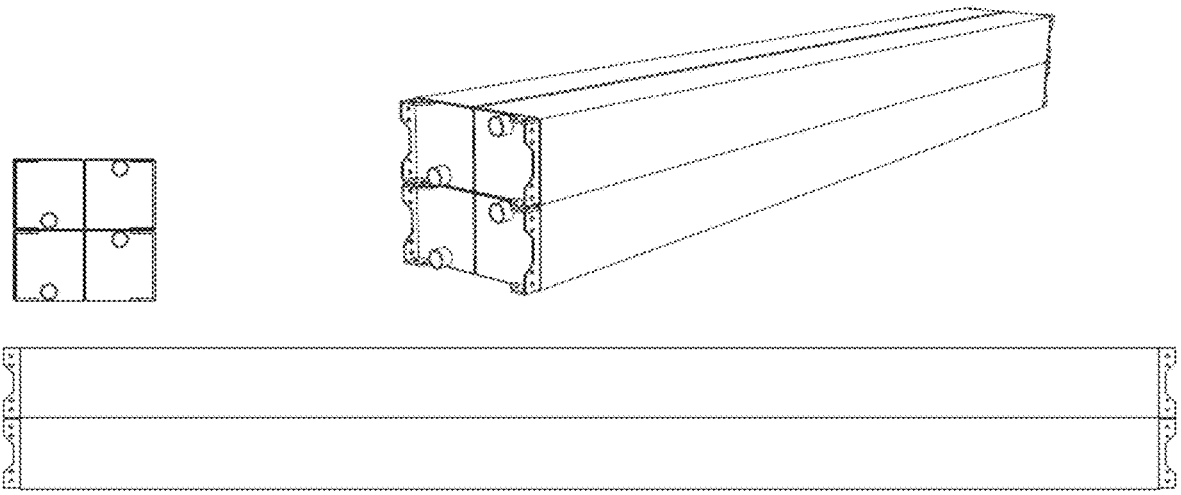
Figure 20F:
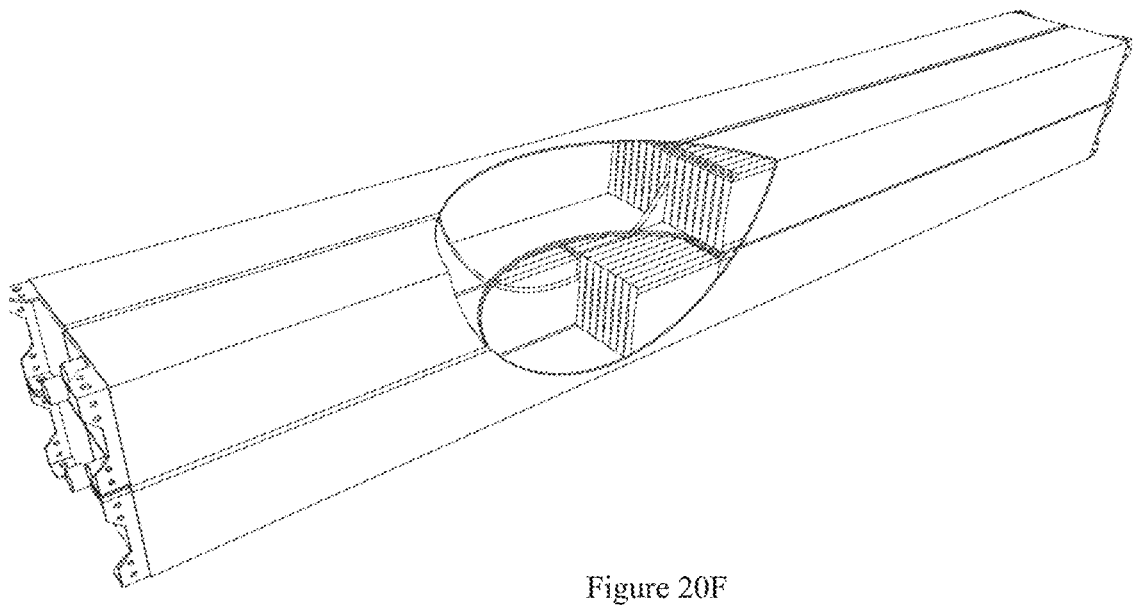
Figure 20G:
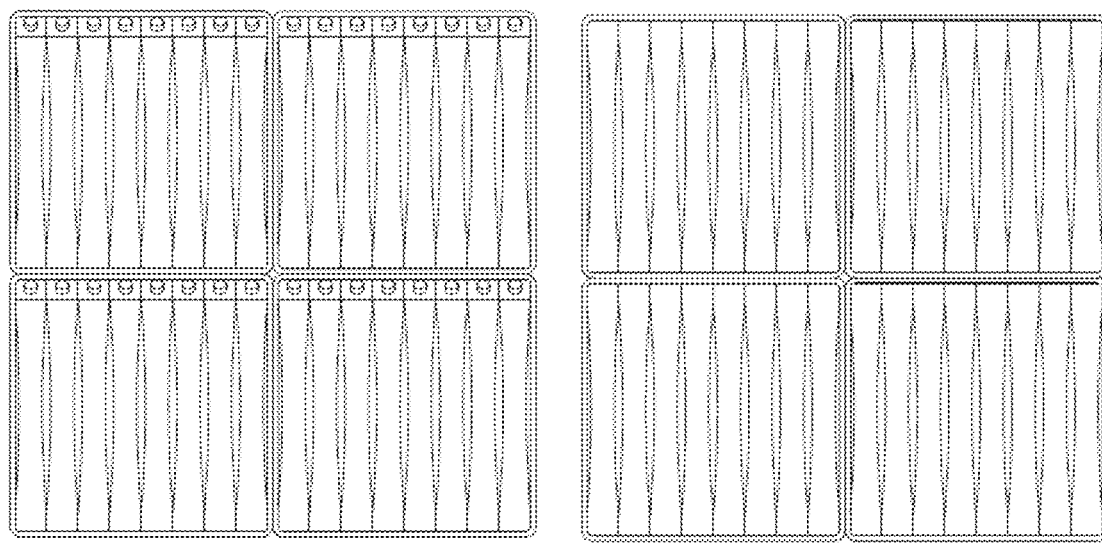

Turning to FIG. 19, which is an installation workflow, according to some embodiments of the invention. According to some embodiments, the installation workflow includes the following steps. In some embodiments, some of the steps are optional, and some of the steps are performed in different order.

Defining 1902 installation surfaces.

Mechanically coupling 1904 containers into an arrangement.

In some embodiments, coupling 1904 is by welding containers. In some embodiments, coupling is by connectors.

Connecting 1906 container arrangement to installation surfaces.

Fluidly coupling 1908 containers.

Coupling container inlet 1910 to heat-exchanging fluid source.

Coupling container outlet 1912 to heat exchanging fluid outlet.

Connecting thermal system 1914 to electricity.

Insulating 1916 containers. According to some embodiments, insulating 1916 includes insulation of individual containers. In some embodiments, insulating 1916 is of a group of containers. In some embodiments, insulating 1916 includes adding environment protection to containers.

Setting 1918 controllers. In some embodiments, setup/tell controllers what container of what types were connected and maybe also their distance and/or other properties. In some embodiments, system can also self-calibrate, for example can try cooling and see how fast it cools/discharges.

According to some embodiments, the order of steps 1904 to 1918 is different than shown in FIG. 19. For example: coupling 1904 can be after connecting 1906, coupling inlet 1910 can be after coupling outlet 1912.

According to some embodiments, there is an optional step of filling capsules with phase-changing material. In some embodiments, filling capsules is prior to coupling 1904. In some embodiments, filling is of multiples capsules fluidly connected to a phase-changing material fluid source, and is after coupling 1904.

Example Parameters of Containers

According to some embodiments, a weight ratio R1 between the weight of container 1004 during operation (when filled with heat-exchanging fluid) and the area of bottom surface 1008-2 is defined according to the weight limits of construction surface 1010 holding containers 1004. In some embodiments, weight ratio R1 is between 100 to 800 $Kg/m^2$. In some embodiments, weight ratio R1 is between 75 to 500 $Kg/m^2$. In some embodiments, weight ratio R1 is between 50 to 200 $Kg/m^2$.

According to some embodiments, length ratio R2 is defined between length L1 and width L2 of container 1004. In some embodiments, width L2 of container 1004 is defined as the distance between interface walls 1008. In some embodiments, width L2 is in the range of 20-70 cm. In some embodiments, width L2 is in the range of 30-50 cm. In some embodiments, length ratio R2 is between 2 to 20. In some embodiments, length ratio R2 is between 5 to 12 In some embodiments, length ratio R2 is between 4 to 8.

According to some embodiments, a weight ratio R3 between the weight of modular arrangement 1002 during operation (when filled with heat-exchanging fluid) and the area of bottom surface of arrangement 1002 is defined according to the weight limits of construction surface 1010 holding arrangement 1002. In some embodiments, installation is on a roof, and ratio R3 is defined by a shallow modular spread of containers 1004 on the roof. In some embodiments, weight ratio R3 is between 100 to 700 $Kg/m^2$. In some embodiments, weight ratio R3 is between 200 to 500 $Kg/m^2$. In some embodiments, weight ratio R3 is between 200 to 350 $Kg/m^2$.

Figure 7A:
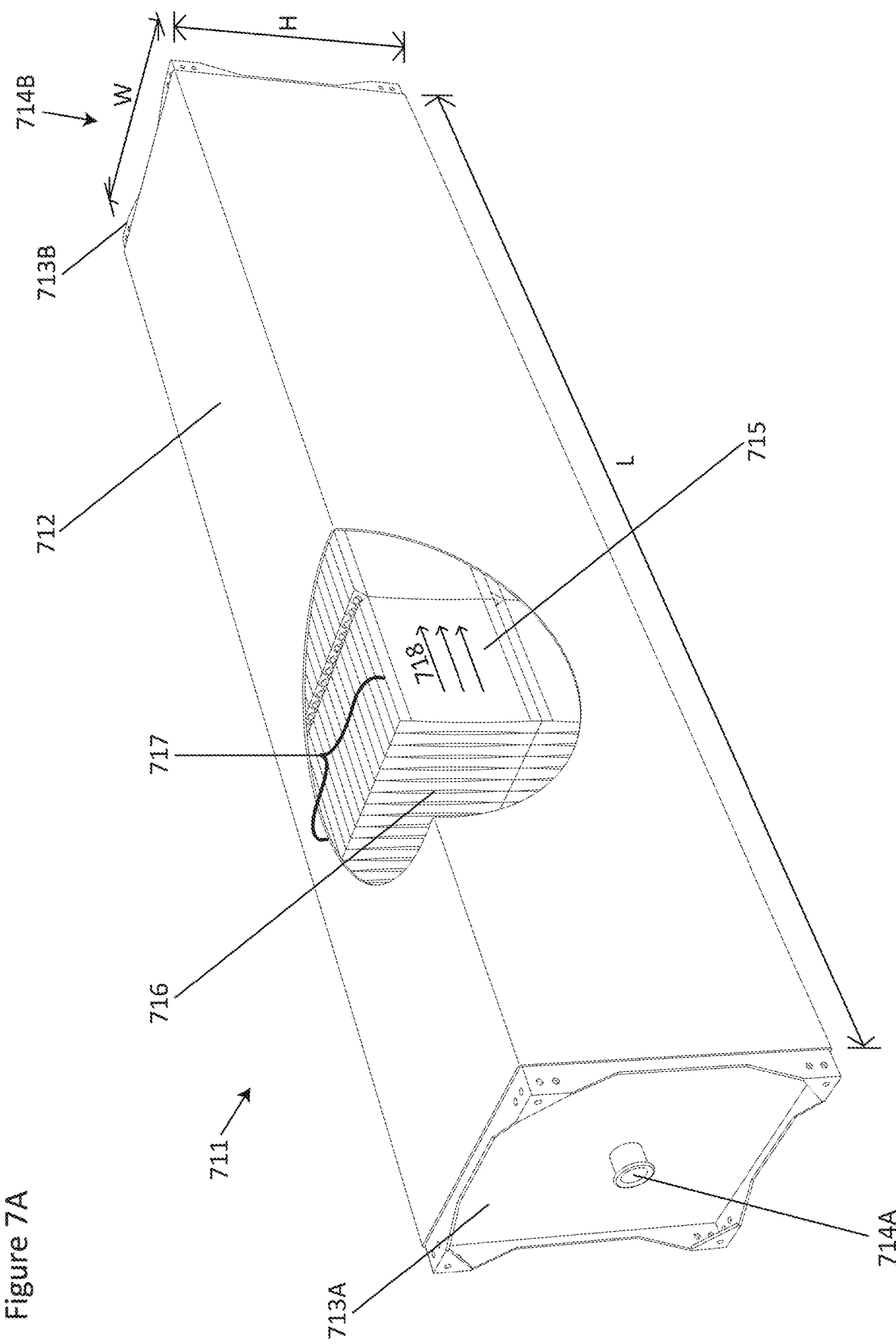

According to some embodiments, containers 1004 are ice bricks (such as 112) as described elsewhere herein. As shown in FIGS. 2H and 7A-7C, according to some embodiments, enclosure walls 220/712 of the container (ice brick 112/711) define the internal volume of container 112/711, in which the heat-exchanging surfaces 114/715 are accommodated and the heat-exchanging fluid flows during operation. In some embodiments, as shown in FIG. 7C, enclosure walls 220/712 define the perimeter of the cross section 712A of container 112 in which the heat-exchanging surfaces 114/715 are accommodated and the heat-exchanging fluid flows 718A during operation.

In some embodiments of the invention, the thickness of the wall of the container is between 2 mm and 80 mm, for example, between 2 and 10 mm, between 10 and 30 mm, between 30 and 50 mm, and/or between 50 mm and 80 mm or thicker or intermediate sizes. In some embodiments of the invention, the thickness depends on the material used for the container, such as steel or polymer or composite material (e.g., fiber reinforced polymer).

In some embodiments of the invention, the container is reinforced using elongated ribs (e.g., between 1 and 50 ribs, for example, between 3 and 20 ribs, between 20-50 ribs or an intermediate or greater number of ribs) for example, ribs which have a height of between 1 and 100 mm, for example, between 5 and 30 mm, between 30 and 70 mm between 70 and 100 mm and/or intermediate or greater height. One or more of said ribs optionally extend into the container and/or one or more extend away from the container.

In some embodiments of the invention, instead of ribs, one or more cross-sectional element is provided, for example a plane bisecting the container. Optionally or additionally, the surface of the container is corrugated to increase a stiffness thereof. It is noted that the capsule layout and/or sizes may be selected to not interfere with such ribs when the capsules are inserted into the container.

According to some embodiments, the phase-changing fluid is encompassed within capsules disposed within containers 1004 and having heat-exchanging surfaces 114/715. In some embodiments, heat-exchanging surfaces 114/715 are defined by capsules 717, and the shape of the heat-exchanging surfaces 114/715 is defined to follow the shape of one or more of enclosure walls 220/712. According to some embodiments, at least some containers 1004 have iced surfaces produced by one or more ice on coil elements disposed within containers 1004.

FIGS. 20A to 20H are simplified schematic illustrations of a thermal-storage containers, according to some embodiments of the invention; and FIG. 21 is an example of a data-sheet of a thermal-storage container, according to some embodiments of the invention.

Reference is now made to FIGS. 1A-1E which are schematic diagrams of a thermal energy storage system according to at least some embodiments of the present invention. As shown, thermal energy storage (TES) system 100 uses the HVAC chiller 102 of an air-conditioning (HVAC) system in an installation. Non-limiting examples of an installation include an office building, residential building, shopping mall, airport terminal, factory, server room or similar. When operating without the system 100 of the present invention, HVAC chiller 102 cools a third fluid 124 which is then circulated throughout the installation for cooling load 130. Third fluid 124 is optionally, water.

As described above the aim of the present invention is to "store cooling" using the TES 100. Alternatively the same system 100 may be used to store heat. The TES 100 comprises a fluid distribution system 104 which comprises those components necessary for distributing the first fluid 120, second fluid 122 and third fluid 124 throughout system 100. Therefore distribution system 104 comprises one or more pumps 106, piping 108, flow control mechanisms 107 such as valves, and monitoring components 109 for monitoring, for example, temperatures and flow rates inside system 100. Monitoring 109 optionally feeds data to a controller 105 for controlling the freezing and/or cooling process via control of chillers 102 and 150, HE 170, load 130, array 110, and the components of fluid distribution system 104 as described further below. In normal use HVAC chiller 102 cools third fluid 124 which is directed by fluid distribution system 104 from HVAC chiller 102 via pipes 108C to pipes 108L for flow through load 130.

TES 100 further comprises a thermal storage array 110. Array 110 comprises multiple ice bricks 112. Each ice brick 112 comprises multiple ice capsules 114 surrounded by first fluid 120. Embodiments of ice bricks 112 and ice capsules 114 are described further below with reference to FIGS. 2A-2U and 3. Ice capsules 114 are closed or sealed capsules containing second fluid 122. Second fluid 122 is optionally, water such that exposure of capsules 114 to a low temperature first fluid 120 surrounding capsules 114 results in capsules 114 cooling and in turn second fluid 122 cooling and changing phase into ice.

First fluid 120 optionally has a lower freezing point than second fluid 122. Non-limiting examples of a first fluid 120 include ethylene glycol, ethylene glycol mixed with water, salt water, or similar fluids. TES 100 further comprises a TES chiller 150 for cooling first fluid 120 to a temperature lower than the freezing point of second fluid 122. TES chiller 150 is one of air-cooled or water-cooled.

Second fluid 122 is optionally water mixed with an ice nucleation agent. The ice nucleation agent is optionally quartz. The type of quartz used may be any one of but is not limited to: Herkimer Diamond, Rock crystal, Amethyst, Ametrine, Rose quartz, Chalcedony, Cryptocrystalline quartz, Carnelian, chalcedony, Aventurine, Agate, Onyx, Jasper, Milky quartz, Smoky quartz, Tiger's eye, Citrine, Prasiolite, Rutilated quartz, or Dumortierite quartz. Quartz is cheap and easily available and resistant to repeated freezing cycles of the second fluid. Furthermore it raises the required starting temperature of freezing the ice by several degrees. Hence, a nucleation agent improves the efficiency and responsiveness of the thermal energy storage system 100.

Optionally second fluid 122 comprises strips of a metal floating in second fluid 122 inside capsules 114 and causing even distribution of ice formation inside capsules 114. Optionally, the metal is aluminum. Optionally, the strips are up to 0.5 mm thick. Optionally, the strips are up to 30 cm long, optionally the strips are up to 1 cm wide. This optional aspect is explained in more detail with reference to FIGS. 8A-B.

Each ice brick 112 optionally has a long and narrow form factor as shown in FIGS. 2E to 2H to enable efficient heat transfer between capsules 114 and first fluid 120. An ice brick 112 with a long form factor has optionally a length L that is at least three or four times greater than its maximum width W and/or height H. Bricks 112 can optionally be connected end to end creating long linear modules comprising multiple bricks 112. The modular structure and number of bricks 112 used enables control of the rate of energy being discharged to provide for the exact thermal energy storage needs per installation and also provides for flexible installation options as array 110 can be shaped as required. This optional aspect is explained in more detail with reference to FIGS. 8A and 8B.

Capsules 114 are optionally spaced slightly apart within bricks 112 to increase the overall ratio between surface area and volume of the second fluid 122 that is to be frozen. Optionally, brick 112 contains between 65% and 85% of second fluid 122. Optionally, brick 112 contains 75% of second fluid 122. Capsules 114 optionally comprise polymers such as polyvinyl chloride or other suitable durable and low cost materials. Capsules 114 optionally comprise protrusions or ridges on their outer surface to provide spacing between capsules 114 for flow of first fluid 120 and for increasing turbulence of first fluid 120.

In use of system 100 shown in FIG. 1A, TES chiller 150 cools first fluid 120, optionally to a temperature below the freezing point of second fluid 122. First fluid 120 is pumped from TES chiller 150 via pipes 108G and directed by fluid distribution system 104 via pipes 108T through array 110 to freeze second fluid 122 (also referred to herein as a "charging process"). First fluid 120, which has increased in temperature then exits array 110 via pipes 108T and is directed by fluid distribution system 104 back to the pipes 108G to chiller 150 to be cooled again. During the charging process the provision of first fluid 120 may be continuous or non-continuous. The charging process is optionally stopped when a desired temperature of first fluid 120 is reached within one or more bricks 112, or when a predefined time period has lapsed, or when a predefined amount of energy is stored in array 110. A (fully) charged array 110 usually comprises a plurality of capsules 114 with a second fluid 122 in a frozen state.

Once array 110 has been charged, a cooling process (also referred to herein as a discharge process), is used to cool load 130 using array 110. First fluid 120 inside array 110 is directed via piping 108T to distribution system 104 and through pipes 108S into heat exchanger 170 where first fluid 120 cools third fluid 124. Distribution system 104 then directs cooled third fluid 124 through pipes 108H into pipes 108C to flow through HVAC chiller 102 and then load 130 (via pipes 108L).

Alternatively third fluid 124 is directed through pipes 108H in parallel to HVAC chiller 102 directly to load 130 via fluid distribution system 104 to piping 108L. Since third fluid 124 has been cooled by first fluid 120 in HE 170, HVAC chiller 102 optionally does not need to be activated, thus producing energy savings. As first fluid 120 circulates between HE 170 and array 110, capsules 114 containing frozen second fluid 122 cool first fluid 120 which then directly or indirectly cools third fluid 124 and load 130. Optionally, the temperature of first fluid 120 entering heat exchanger 170 is between 5 degrees Celsius at the inlet and 10 degrees Celsius at the outlet. As capsules 114 cool first fluid 120, frozen second fluid 122 gradually undergoes a phase change and melts until a point where array 110 is no longer sufficiently cooling first fluid 120 and array 110 is said to be discharged. A (fully) discharged array 110 usually comprises capsules 114 with a second fluid 122 in a liquid state.

The charging process optionally takes place during off-peak hours (hours in which the load on the electrical grid is low) while the discharge process optionally occurs according to the demands of load 130—even during peak hours. The discharge process is optionally stopped when a cutoff temperature of first fluid 120 is reached, or when a predefined time period has elapsed, or when a predefined amount of energy is output from array 110, or under control of load 130 or when the demand for cooling at load 130 has lowered to a desired level. The direction of flow of first fluid 120 within array 110 during the charging process may be the same, or may differ from the direction of flow of first fluid 120 during the discharge process.

Alternatively, system 100 is used for heating. For heating TES chiller 150 optionally operates as a heat pump. TES Chiller 150 heats first fluid 120, optionally in off peak hours. First fluid 120 is pumped from TES chiller 150 via pipes 108G and directed by fluid distribution system 104 via piping 108T and through array 110 to warm second fluid 122 (also referred to herein as a charging process). First fluid 120, which has decreased in temperature then exits array 110 and is directed by fluid distribution system 104 through pipes 108T and piping 108G to TES chiller 150 to be warmed again. During the warming process the provision of first fluid 120 may be continuous or non-continuous. The warming process is optionally stopped when a desired temperature of first fluid 120 is reached within one or more of bricks 112, or when a predefined time period has lapsed, or when a predefined amount of energy is stored in array 110, and the like. No phase change takes place in the array.

Once array 110 has been charged, a warming process (also referred to herein as a discharge process), is used to warm load 130 using array 110. First fluid 120 inside array 110 is directed via distribution system 104 through pipes 108T and 108S into heat exchanger 170 where first fluid 120 warms third fluid 124. Distribution system 104 then directs warmed third fluid 124 from pipes 108H through pipes 108C to flow through HVAC chiller 102 and then load 130 (via pipes 108L). Alternatively third fluid 124 is directed through pipes 108H in parallel to HVAC chiller 102 directly to load 130 via fluid distribution system 104 to piping 108L. Since third fluid 124 has been warmed by first fluid 120 in HE 170, HVAC chiller 102 (functioning as a heat pump) optionally does not need to be activated as third fluid 124 has been warmed thus producing energy savings. As first fluid 120 circulates between heat exchanger 170 and array 110, capsules 114 containing warmed second fluid 122 warm first fluid 120 which then directly or indirectly warms third fluid 124 and load 130.

The charging process optionally takes place during off-peak hours (hours in which the load on the electrical grid is low) while the discharge process optionally occurs according to the demands of load 130—even during peak hours.

Monitoring 109 of fluid distribution system 104 optionally comprises one or more temperature monitors for monitoring at least one of: The temperature of first fluid 120 before entering array 110; The temperature of first fluid 120 in any location within array 110; The temperature of first fluid 120 after exiting array 110; The temperature of second fluid 122 within one or more capsules 114; The temperature of one or more ice bricks 112; The temperature of first fluid 120 before entering HE 170; and the temperature of first fluid 120 when leaving HE 170. Additionally or alternatively, monitoring 109 comprises one or more flow monitors (not shown) for monitoring at least one of: The flow of the first fluid 120 before, inside and after array 110; and the flow of first fluid 120 before, inside and after HE 170.

While FIGS. 1A-1E show single instances of chillers 102 and 150, HE 170, load 130, array 110, and the components of fluid distribution system 104 it should be understood that TES 100 may comprise any suitable number of these components.

Figure 1B:
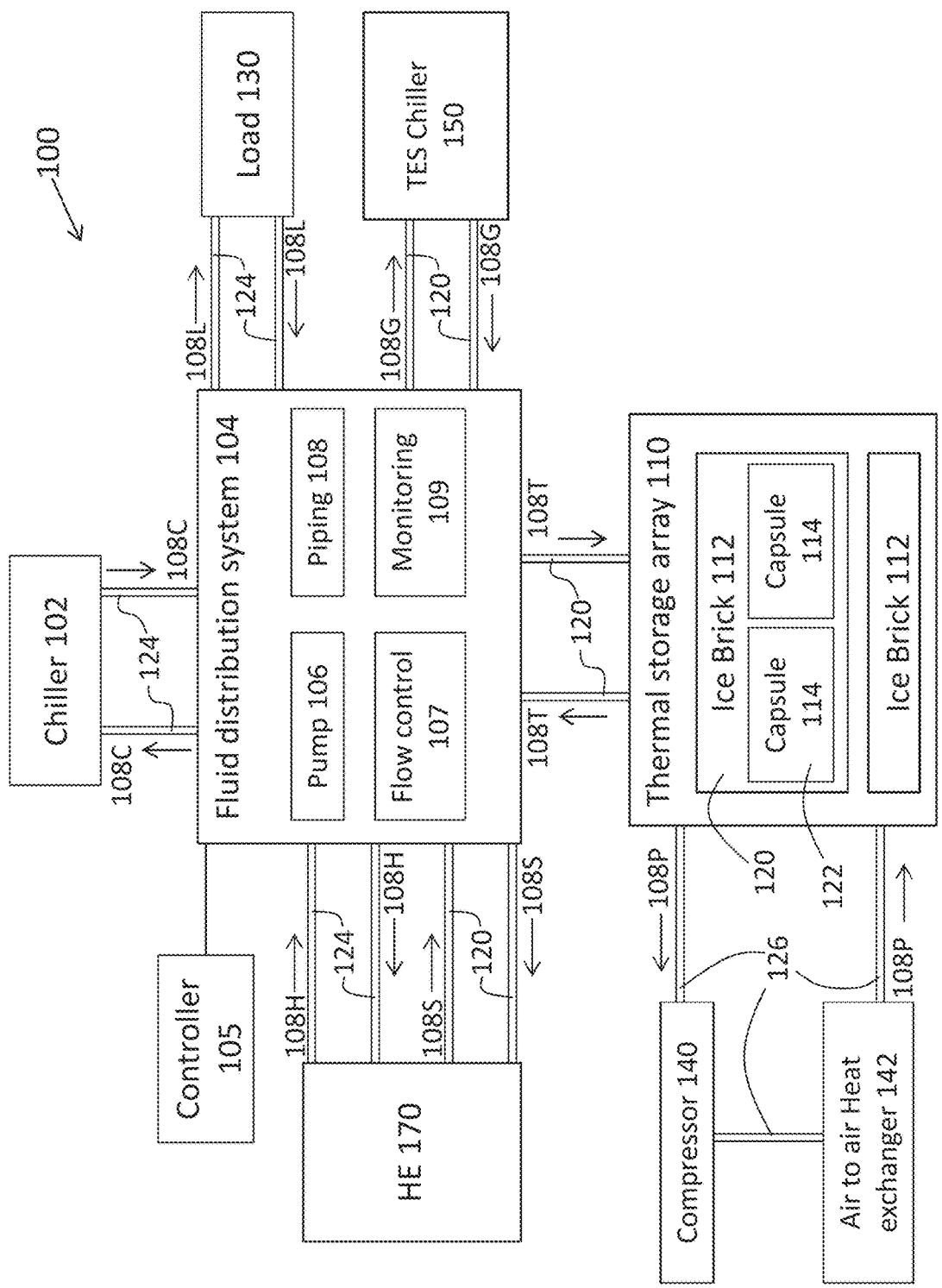

The system 100 of FIG. 1B functions in the same manner as that of FIG. 1A, but the illustrated embodiment comprises an air compressor 140. Compressor 140 draws air 126 from the top of the each of bricks 112. This air 126 is optionally compressed to between 10 and 20 bar resulting in the air 126 heating up as a result of compression. This compressed air 126 is then pumped into the bottom of each of bricks 112 through an air to air heat exchanger 142 and/or an expansion valve (not shown)—dropping to a temperature of between −20 to −30 degrees Celsius. This air 126 is bubbled through each of bricks 112 to further cool the contents before exiting through the top of the bricks 112 at between −5 to +5 degrees Celsius. This cold air 126 is then fed once again into the compressor 140 creating a cooling closed loop 108P. Cooling loop 108P is shown for simplicity as connected directly to thermal storage array 110 but cooling loop 108P is optionally part of fluid distribution system 104 and is controlled as are other piping systems as described herein. In this embodiment second fluid 122 is optionally combined with salt or other suitable material to lower the freezing point of second fluid 122.

Figure 1C:
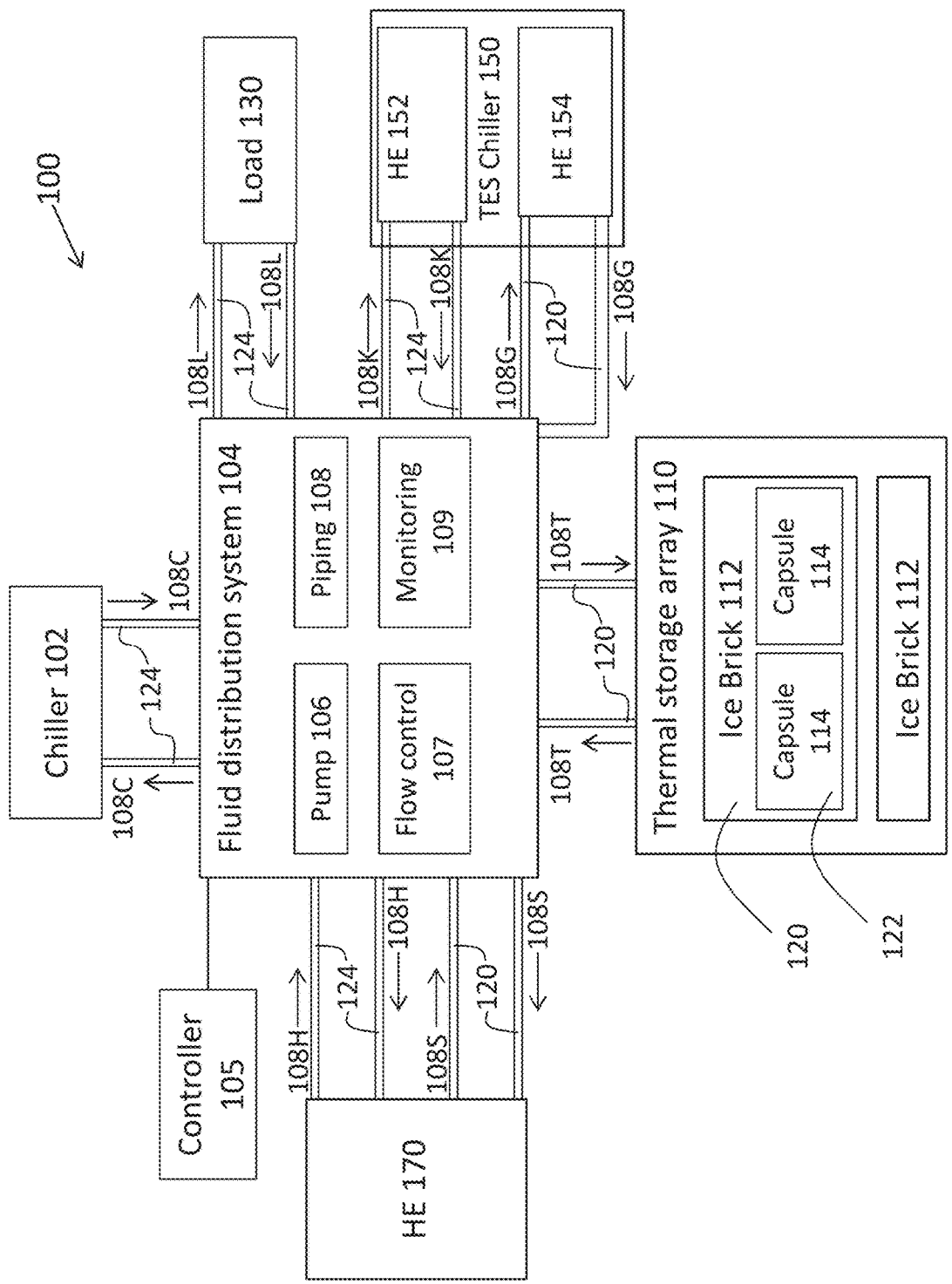

The system of FIG. 1C functions in the same manner as that of FIG. 1A, but where the condensation cycle of TES chiller 150 is water cooled comprises a heat exchanger 152 fed from third fluid 124. In this embodiment load piping 108K is adapted to connect to HE 152 in TES chiller 150. Load piping 108K carries third fluid 124 which has been chilled by HVAC chiller 102—typically to a temperature between but not limited to 7 to 12° C.

TES chiller 150 then cools first fluid 120 via HE 154 to a temperature below the freezing point of second fluid 122 such that first fluid 120 may be pumped through array 110 to freeze second fluid 122 inside capsules 114. The discharging process then takes place in HE 170 as for other embodiments. This arrangement increases the energy efficiency of TES chiller 150 which can utilize the abundant supply of cooled third fluid 124 available when load 130 is partially or entirely not being used for example but not limited to nighttime usage in an office complex. HVAC chiller 102 optionally, cools third fluid 124 at night when the outside temperature is lower and electricity costs are lower for more effective and cheaper energy usage. Since water cooled TES chiller 150 is more efficient it can also be smaller than in other embodiments where an air-cooled chiller is used.

Figure 1D:
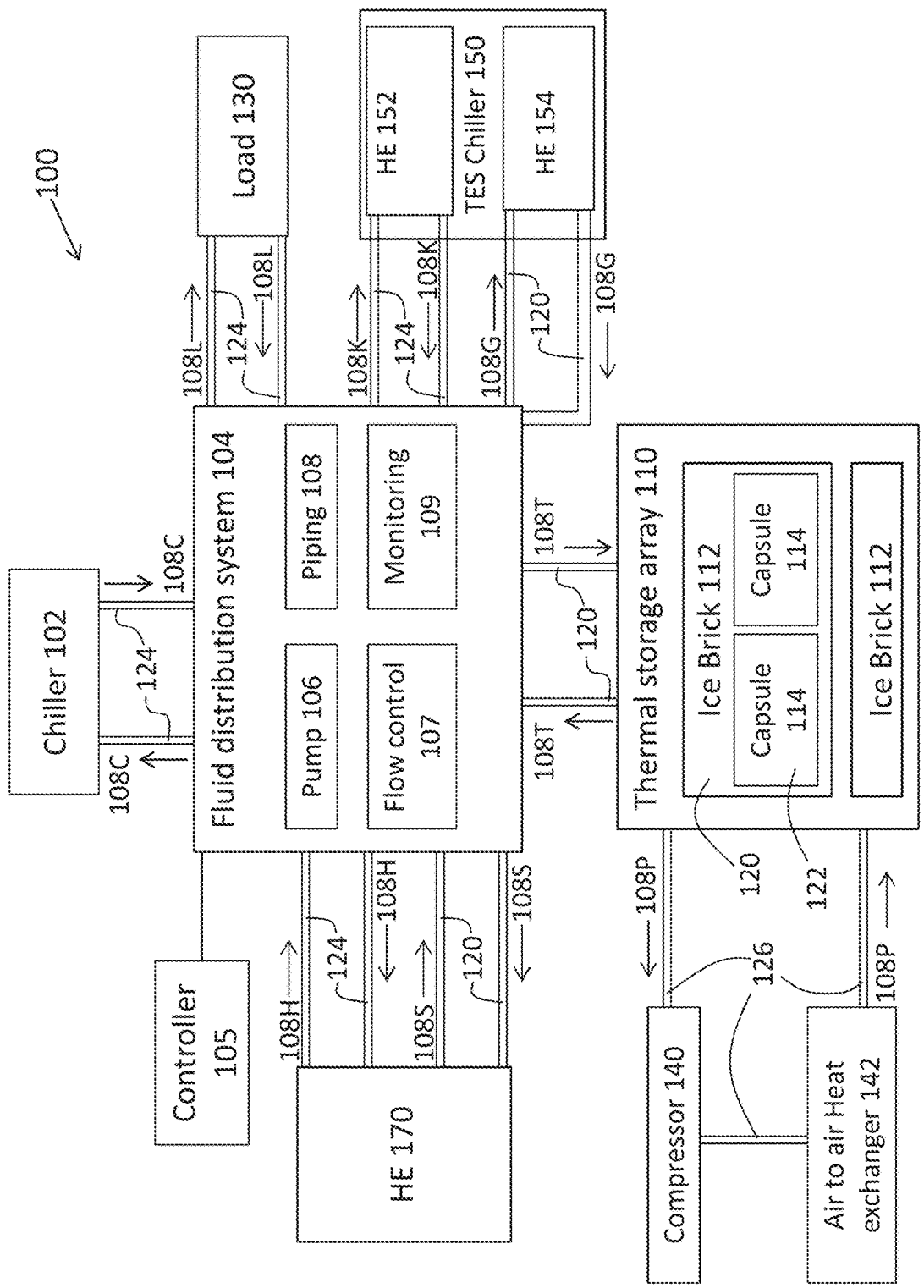

The system of FIG. 1D combines the functionality of FIGS. 1B and 1C to provide for a TES chiller 150 connected to third fluid via HE 152 that is supplemented by compressive cooling from air compressor 140.

Figure 1E:
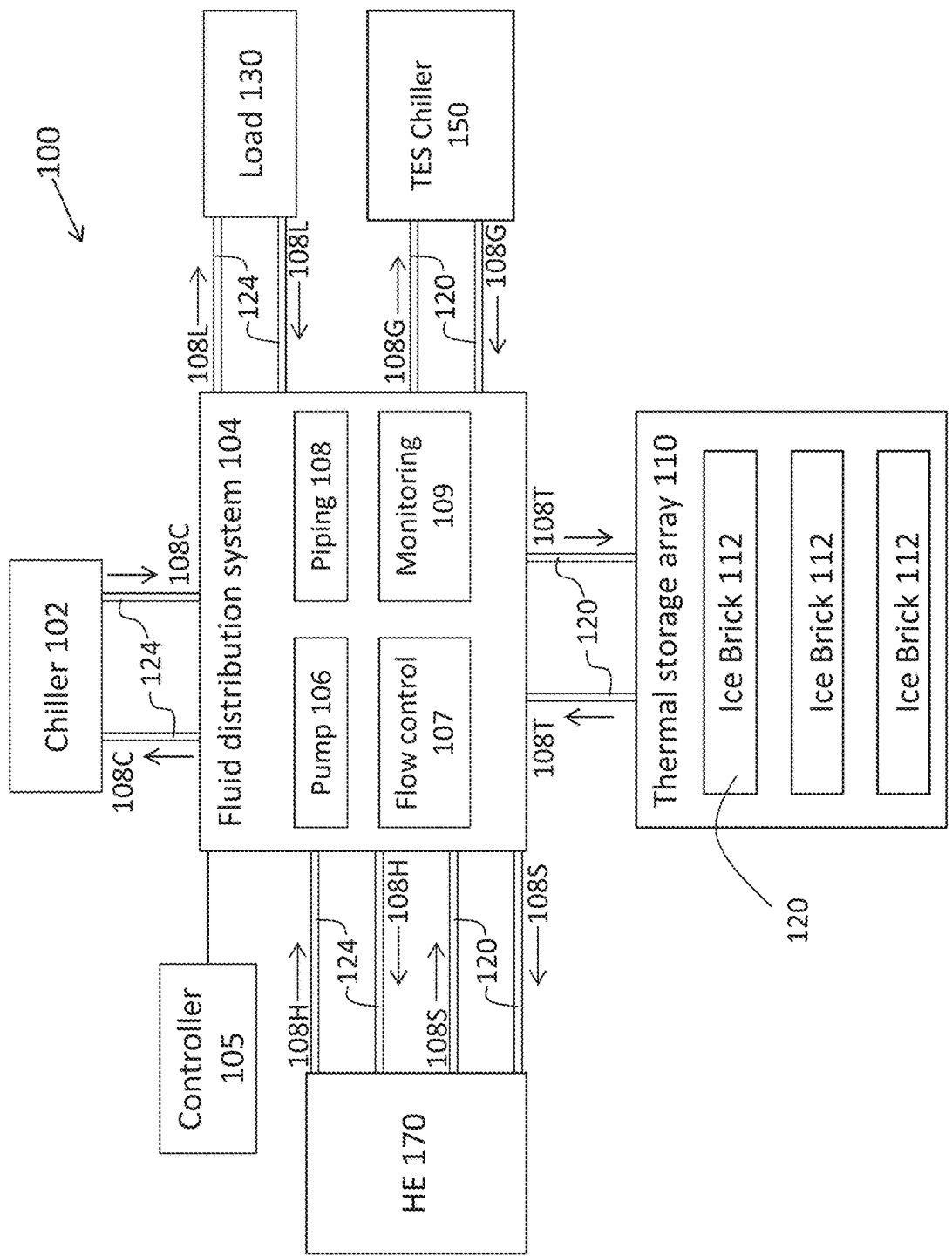

The system of FIG. 1E functions in the same manner as that of FIG. 1A, but in the illustrated embodiment some or all of ice bricks 112 do not comprise capsules 114. In the embodiment of FIG. 1E TES 100 is used to store first fluid 120 in ice bricks 112. Thus first fluid 120 is cooled by chiller 150 and this cooled first fluid 120 is then pumped into ice bricks 112 for storage and use for cooling third fluid (via HE 170) at other times. As above, non-limiting examples of a first fluid 120 include ethylene glycol, ethylene glycol mixed with water, salt mixed with water, or other combinations of these or other fluid to form "slushes" or similar fluids.

Figure 2A:
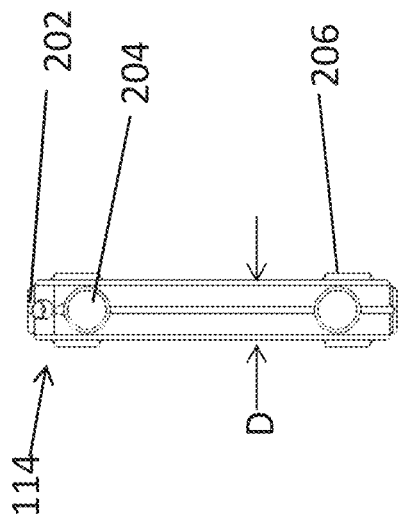
FIGS. 2A-2Y are illustrations of ice bricks, ice capsules and thermal storage arrays according to at least some embodiments of the present invention.
Figure 2B:
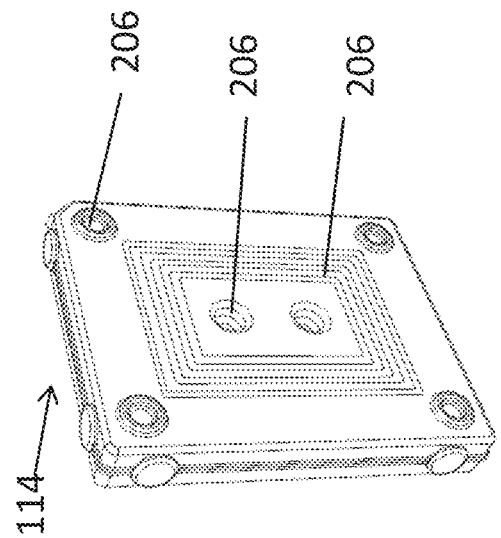
Figure 2C:
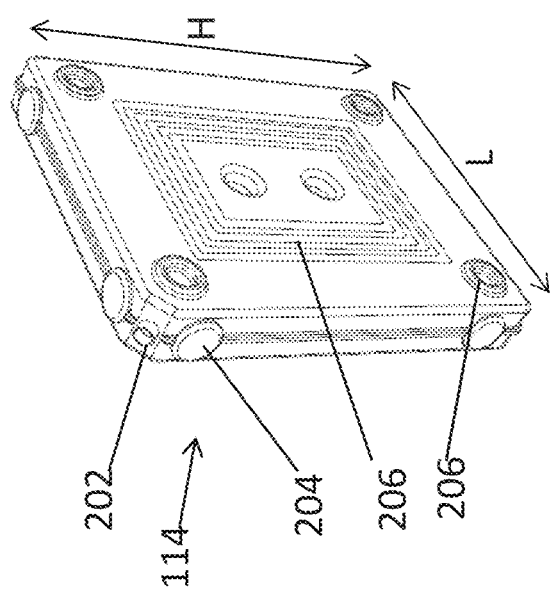
Figure 2D:
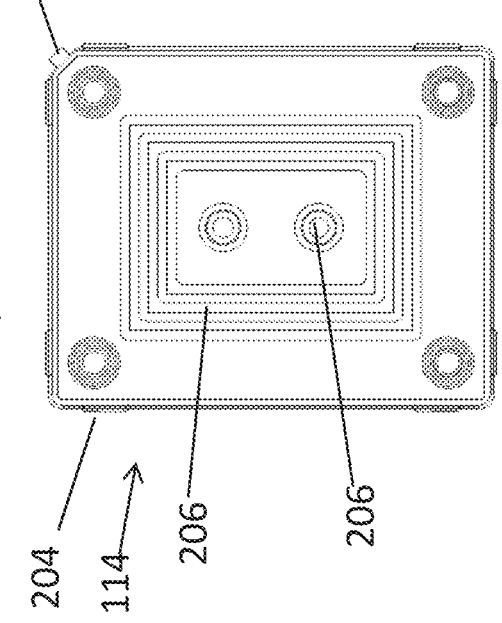
Figure 2H:
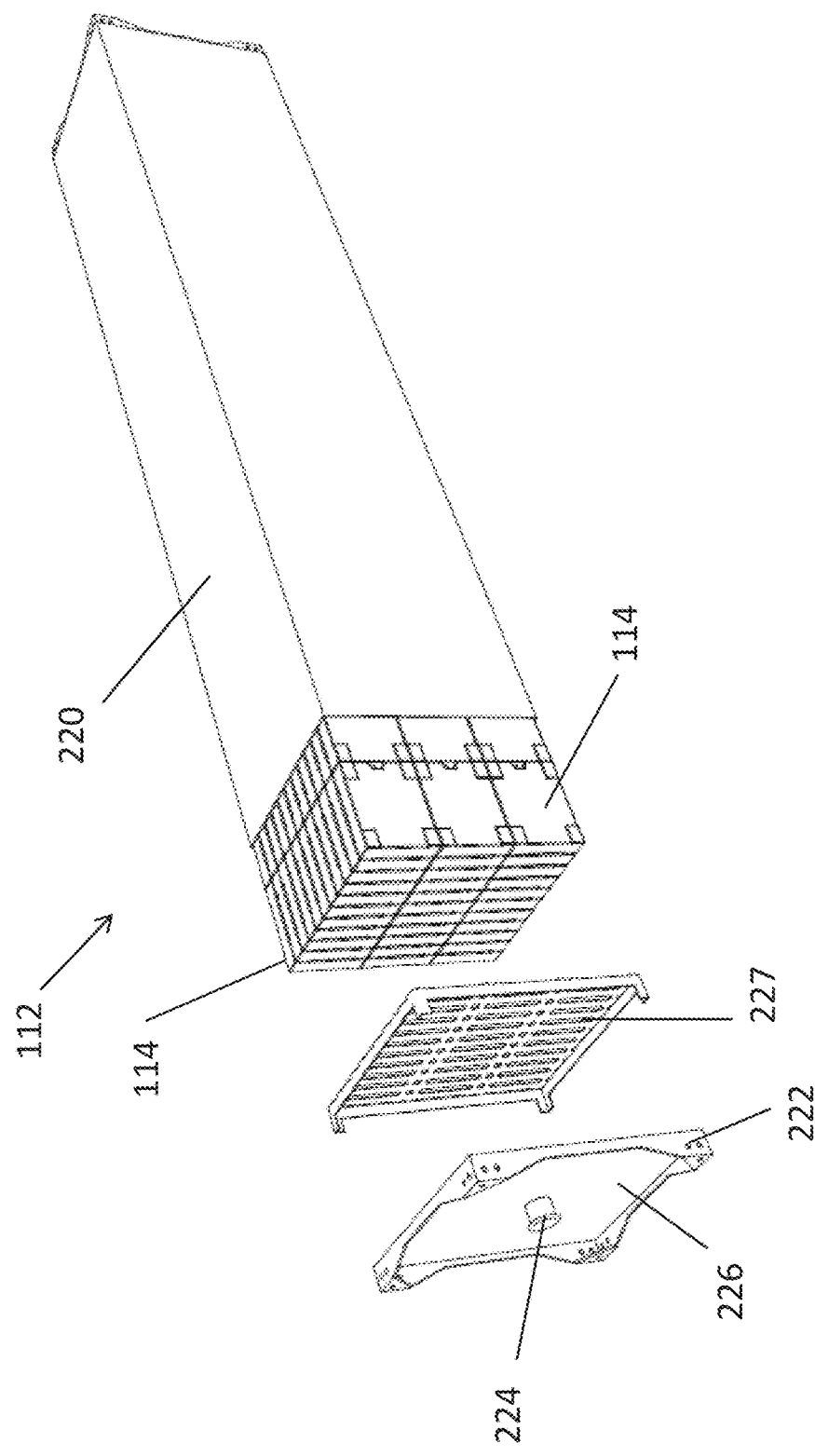
Figure 2K:
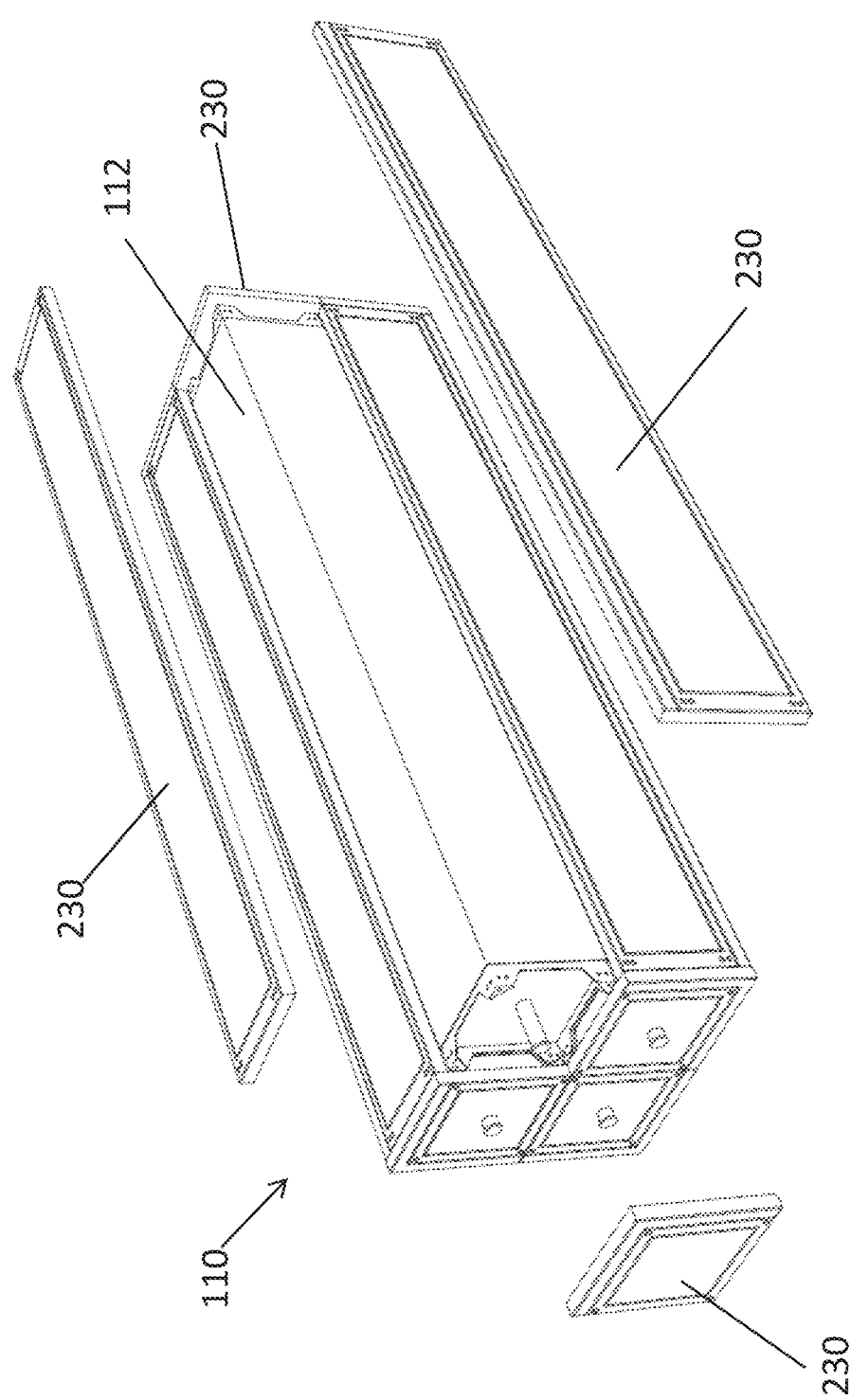
Figure 2L:
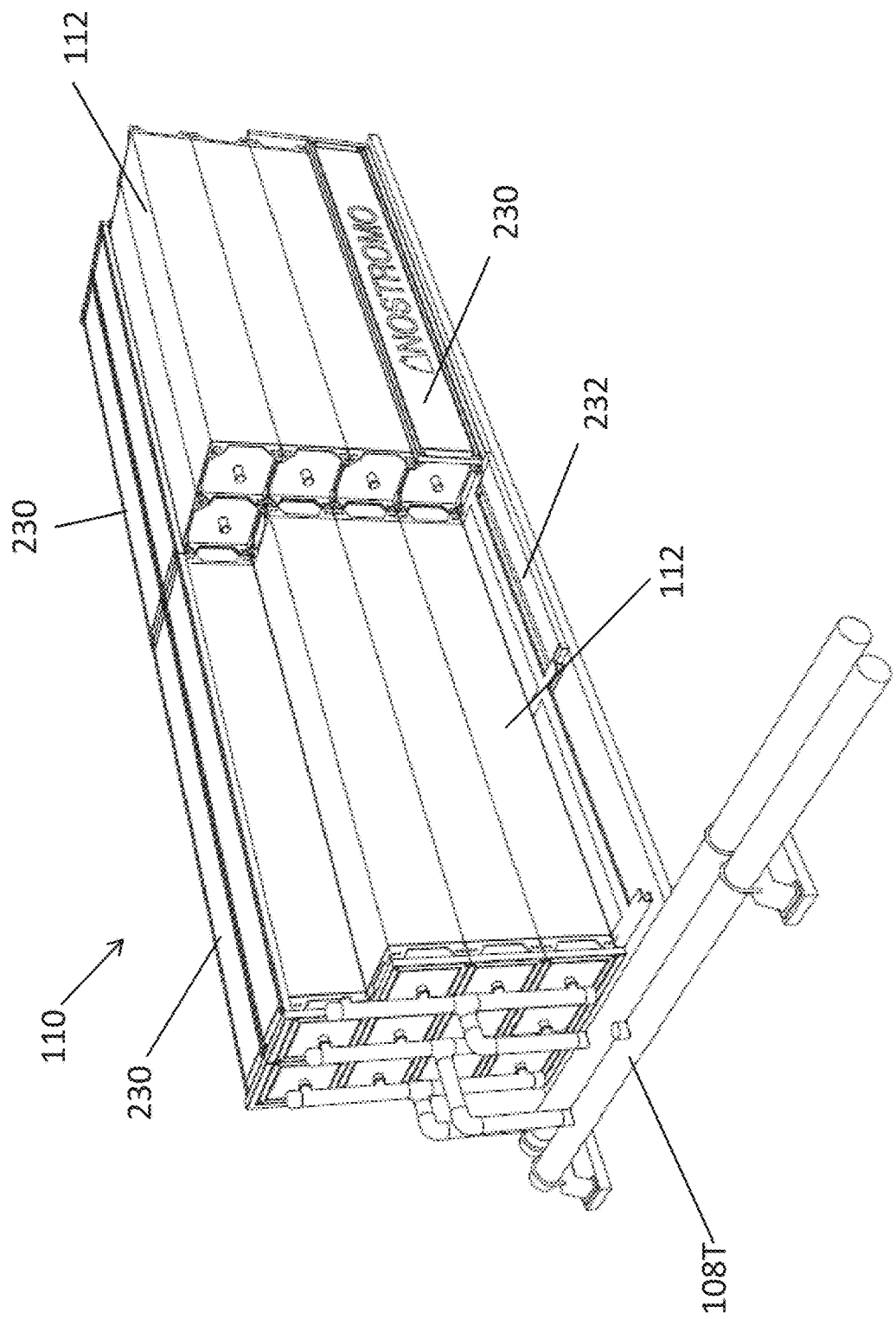
Figure 2M:
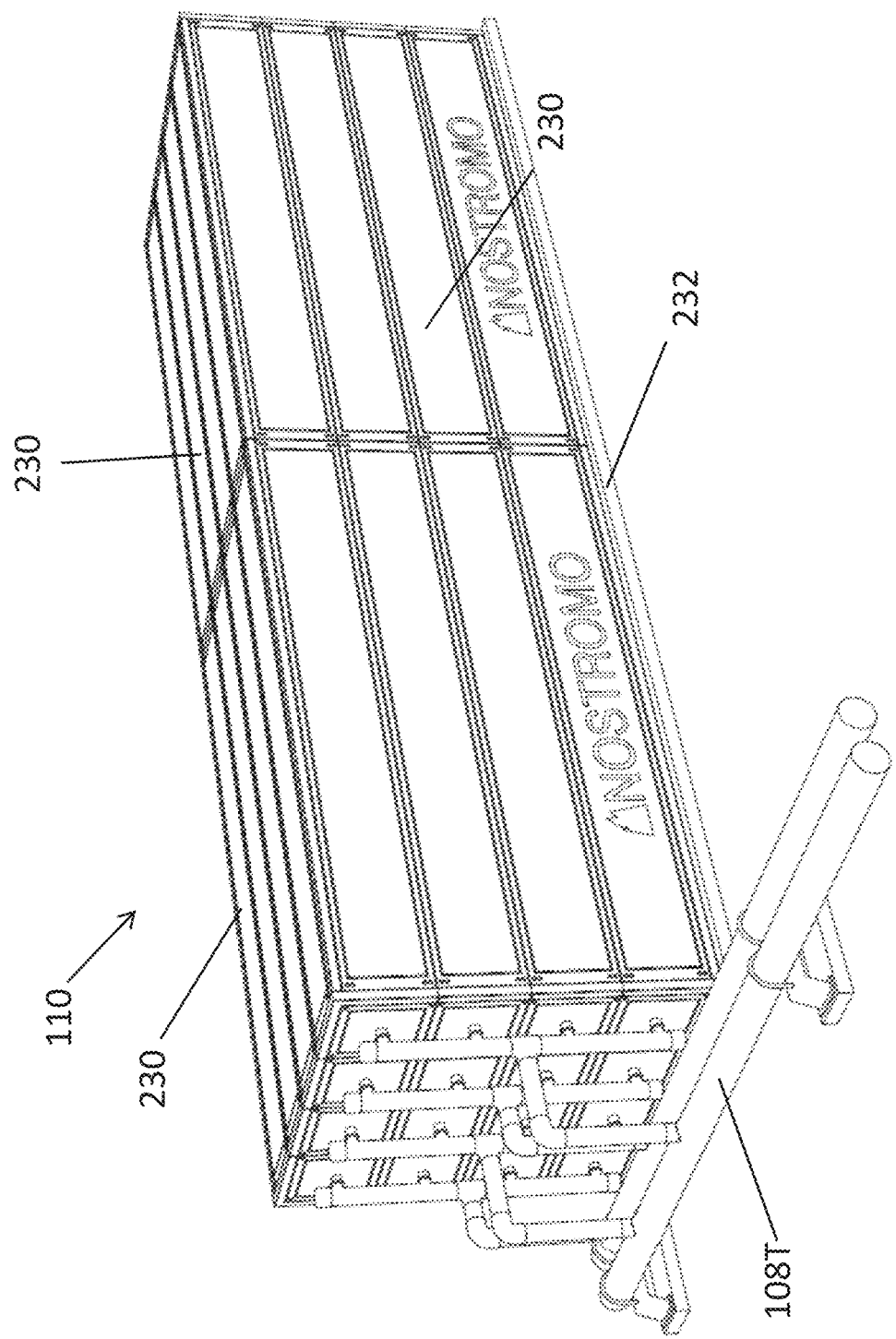
Figure 2N:
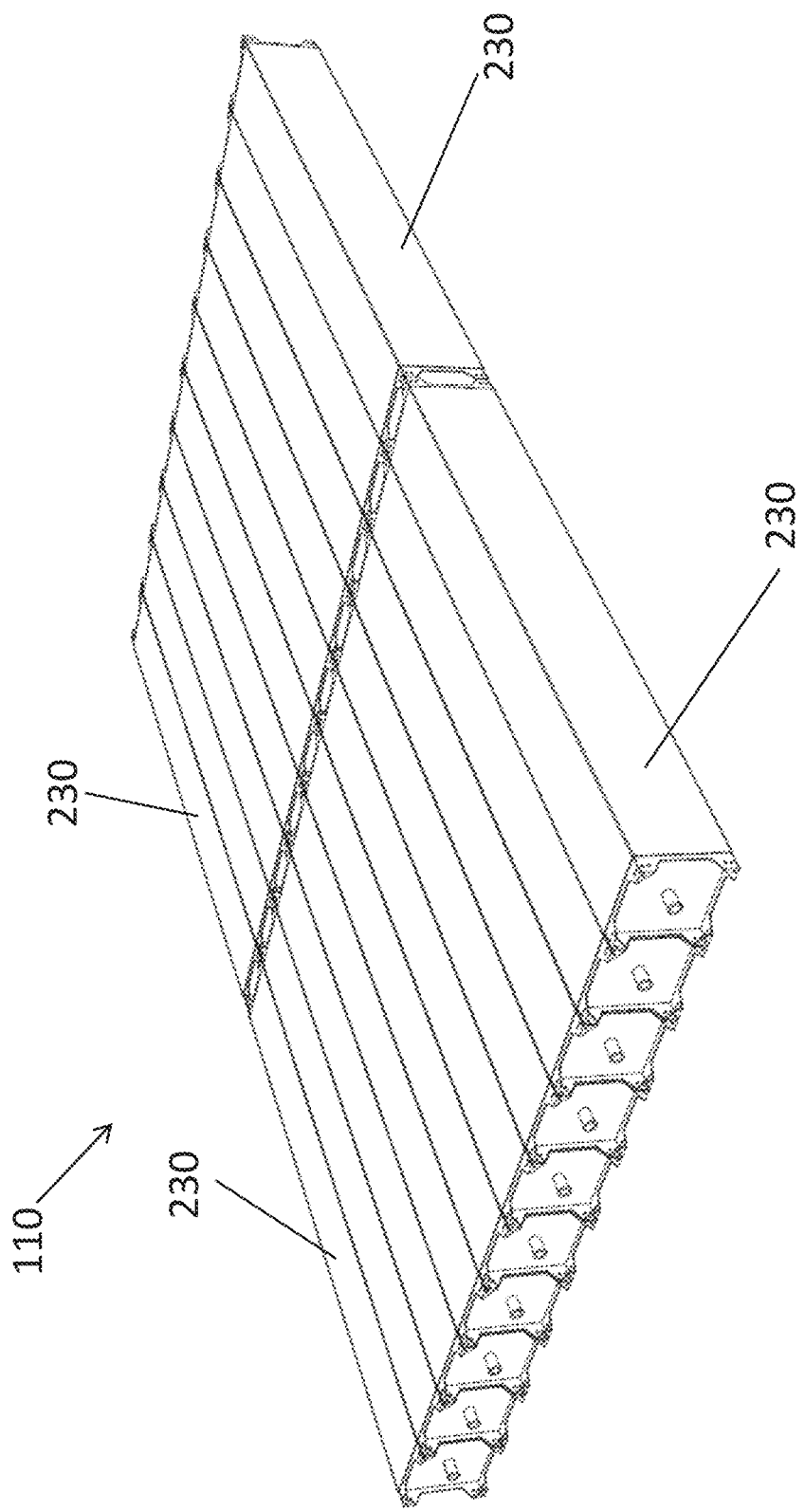
Figure 2P:
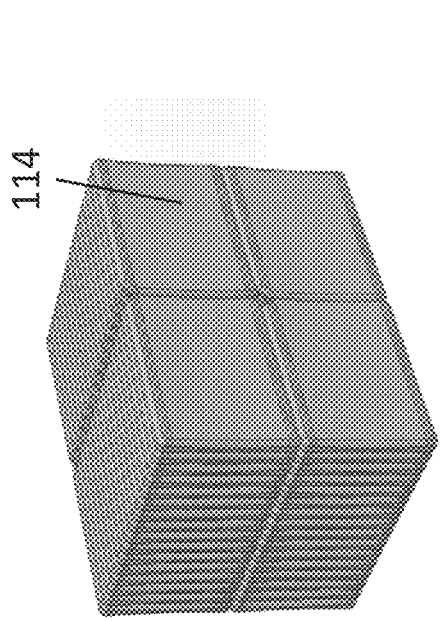
Figure 2R:
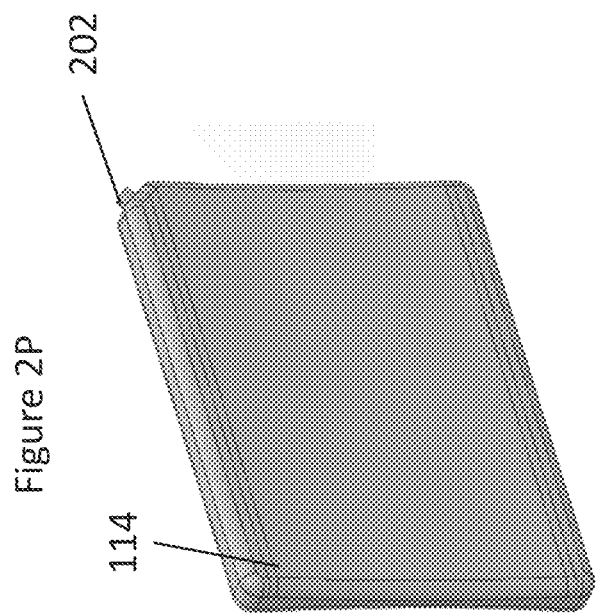
Figure 2O:
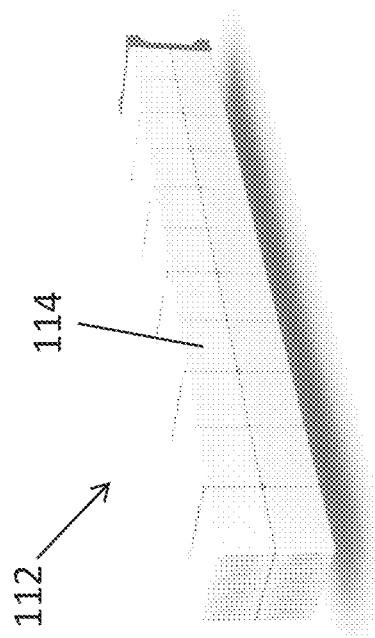
Figure 2Q:
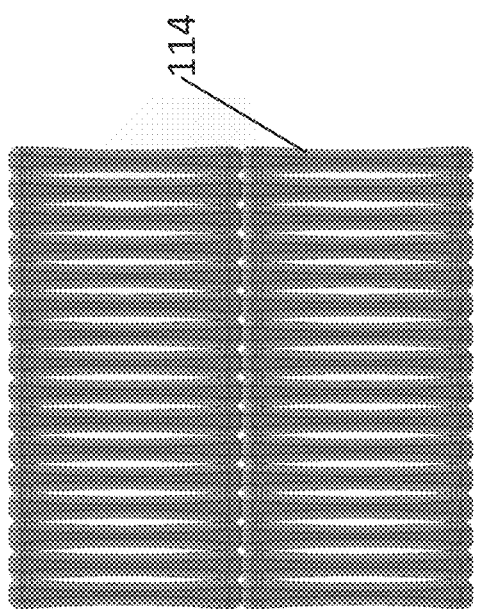
Figure 2S:
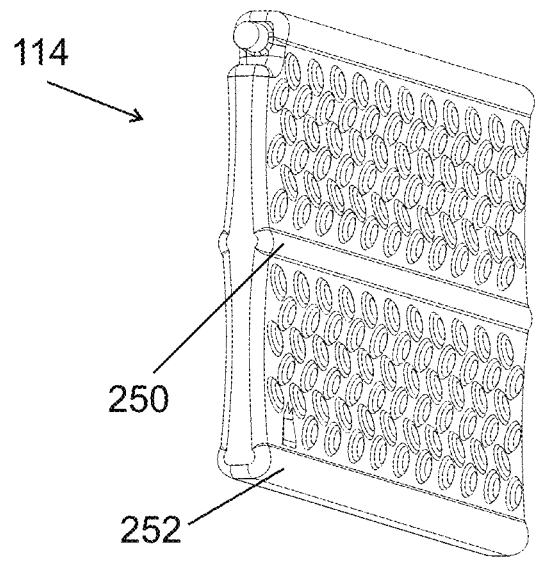
Figure 2T:
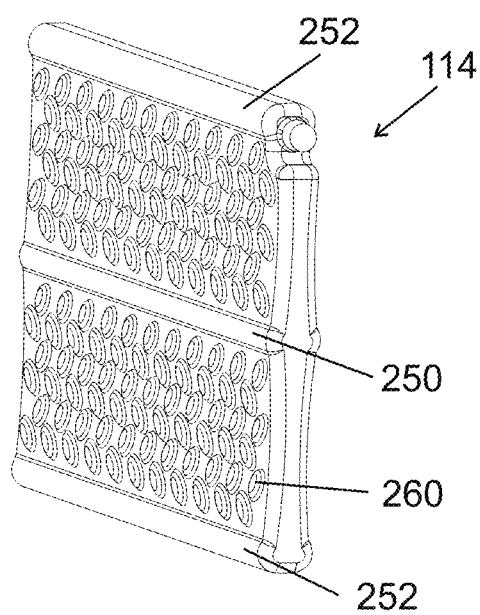
Figure 2U:
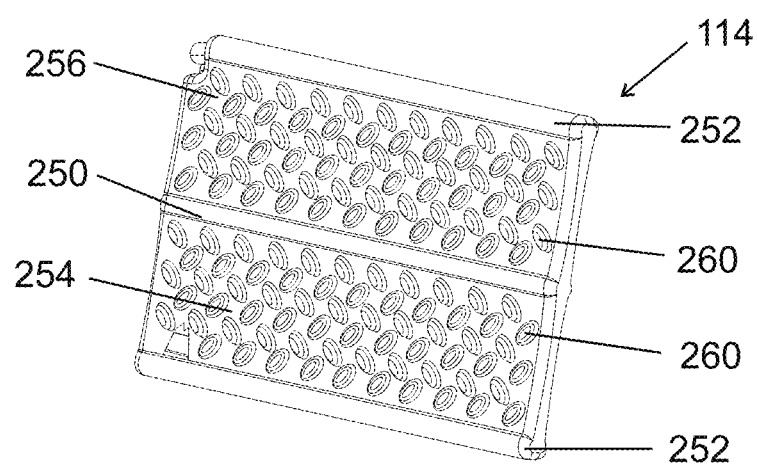

Reference is now made to FIGS. 2A-2U which are illustrations of ice bricks, ice capsules and thermal storage arrays according to at least some embodiments of the present invention. FIGS. 2A-2D show preferred embodiments of capsules 114. Capsule 114 comprises a filling nozzle 202 placed on an upper corner of capsule 114 to enable filling of capsule 114 to a maximum with second fluid 122 while still enabling efficient packing of capsules 114. Capsules 114 optionally comprise narrow-side spacers 204 and broad-side spacers 206. When provided, spacers 204 and 206 create a gap between capsules 114 when these are packed together inside brick 112. This gap is required to allow flow of first fluid 120 between capsules 114 for freezing of second fluid 122 inside capsules 114. Capsules 114 comprise a high ratio of depth D vs. length L and height H to create a greater surface area around a thinner piece of ice for a more efficient heat transfer of second fluid 122).

FIGS. 2E-2H show preferred embodiments of ice bricks 112 comprising capsule 114. Ice brick 112 comprises a rectangular enclosure 220 for enclosing multiple capsules 114. Capsules 114 are packed together to maximize the amount of second fluid 122 that is contained inside brick 112. Brick is equipped on each end with alignment or support panels 227 for aligning capsules 114 and sealing brick end panels 226 such that brick 112 is watertight when sealed. Brick 112 is connected to array 110 via inlet/outlet pipes 224. Mounting brackets 222 are provided for mounting brick 112 in a fixed position in the array 110 as further described below. Aside from inlet/outlet pipes 224 and interconnecting piping 228 used to connect bricks, brick 112 is completely sealed to fully contain first fluid 120 that flows through brick 112.

Optionally, brick 112 has a size of 50×50×400 cm. Optionally, brick 112 has a volume of 1000 L comprising 75% (750 L) of second fluid 122. Optionally, brick 112 has an energy storage capacity of 19.8 trhl69 kWh. Alternatively, brick 112 has a size of 25×25×400 cm. The size of brick 112 is selected to provide a balance between sufficient energy storage and construction modularity of the array.

FIGS. 2I-2N show preferred embodiments of bricks 112 in flexible configurations of thermal storage arrays 110. Brick 112 is used as a building block for configuration of an array 110 that is of any desired layout and also capacity. As shown in FIGS. 2I and 2J, bricks 112 are stacked on top of one another, laid end to end and also laid next to one another. Inlet/outlet pipes 224 and interconnecting piping 228 are then used to provide fluid connection between the bricks 112 in the array for first fluid 120. Bricks 112 are fluidly connected in parallel or alternatively in series or alternatively a combination of parallel and series connections.

As shown in FIGS. 2K-2N, once the array 110 has been built with a desired capacity (number of bricks 112), and form (arrangement of bricks 112), insulation panels 230 are attached to the outer surface of the array 110 to fully insulate the array and preserve the thermal storage within the bricks 112. This configuration saves on the total insulation needed as only the outer surface of the complete array 110 needs to be insulated, and not every surface of every brick 112. Array 110 is optionally assembled on top of base frame 232 which is optionally insulated on its underside.

Once array 110 has been arranged into the desired form such as the rectangular box of FIG. 2M or the planar platform of FIG. 2N or any combination of these to create any structural arrangement required for the specific installation, this form can be integrated into the structure served by the thermal storage system 100. As a non-limiting example, the platform of FIG. 2N could function as a floor or could be erected vertically to function as a wall or could function as both floor and wall or could function as a raised platform inside, next to, or on the building/structure serviced by the TES system 100.

FIGS. 2O-2R show additional preferred embodiments of ice bricks 112 comprising capsules 114, wherein capsules 114 are narrower in a middle section thus creating gaps between capsules 114 for flow of first fluid 120.

FIGS. 2S-2U show additional preferred embodiments of capsules 114, wherein capsules 114 comprise a widened middle with a supporting ridge 250 so that upper part 256 and lower part 254 do not collapse when ice forms inside capsule 114. Ridge 250 and ridges 252 create a gap between capsules 114 when these are packed together inside brick 112. This gap is required to allow flow of first fluid 120 between capsules 114 for freezing of second fluid 122 inside capsules 114. Capsules 114 also comprise protrusions 260. Protrusions 260 increase the Reynolds number for first fluid 120 outside capsules 114 thus resulting in a more turbulent flow of first fluid 120 and therefore better distribution of ice formation inside capsule 114.

FIG. 2V shows a side view of a capsule 114 with protrusions 260, a ridge 252 and a filing nozzle 202. The filling nozzle is placed such that it does not increase beyond the general outer shape of the rectangular shaped capsule 114. FIG. 2W shows the capsule of FIG. 2V in another side view, perpendicular to the view of FIG. 2V. FIG. 2X shows the capsule of FIGS. 2V and 2W in a front view, wherein the broad-side of the capsule 114 and the general flow direction 290 of the first fluid 120 is shown. The capsule 114 has protrusions 260 that are arranged such that the flow path of the first fluid 260, which passes by the capsule 114, is provided in a meander pattern 291 (or a serpentine pattern). A meander pattern 291 in the sense of the invention is characterized in that the direction of the flow is repeatedly changed. Optionally, the meander pattern 291 is characterized in that the direction of the flow is regularly changed. Even more preferred is that the meander pattern is approximately symmetrical around a center line at least in a part of the meander pattern. The reference numeral 292 refer to flat areas of the capsules 114 between the protrusions 260. FIG. 2Y shows a perspective view of the capsule 114, which is shown in FIGS. 2V, 2W and 2X.

Reference is now made to FIG. 3 which shows an ice capsule according to at least some embodiments of the present invention. As shown in FIG. 3, capsule 114Cy is optionally provided in a cyclohexane shape. In use, multiple cyclohexane shaped capsules 114Cy are placed inside brick 112 to freely settle inside brick 112. Thus capsules 114Cy are not fixed inside brick 112. The irregular shape of cyclohexane shaped capsules 114Cy enables a high packing factor within brick 112 while allowing gaps for flow of first fluid 120 around capsules 114Cy for freezing the second fluid 122 inside them. Moreover, also a plurality of cyclohexane-shaped capsules 114Cy provides defined flow paths inside the brick 112C, since such defined cyclohexane-shaped capsules 114C will create a defined geometric pattern of these capsules 114c when placing a plurality of them inside an enclosed volume.

Figure 4:
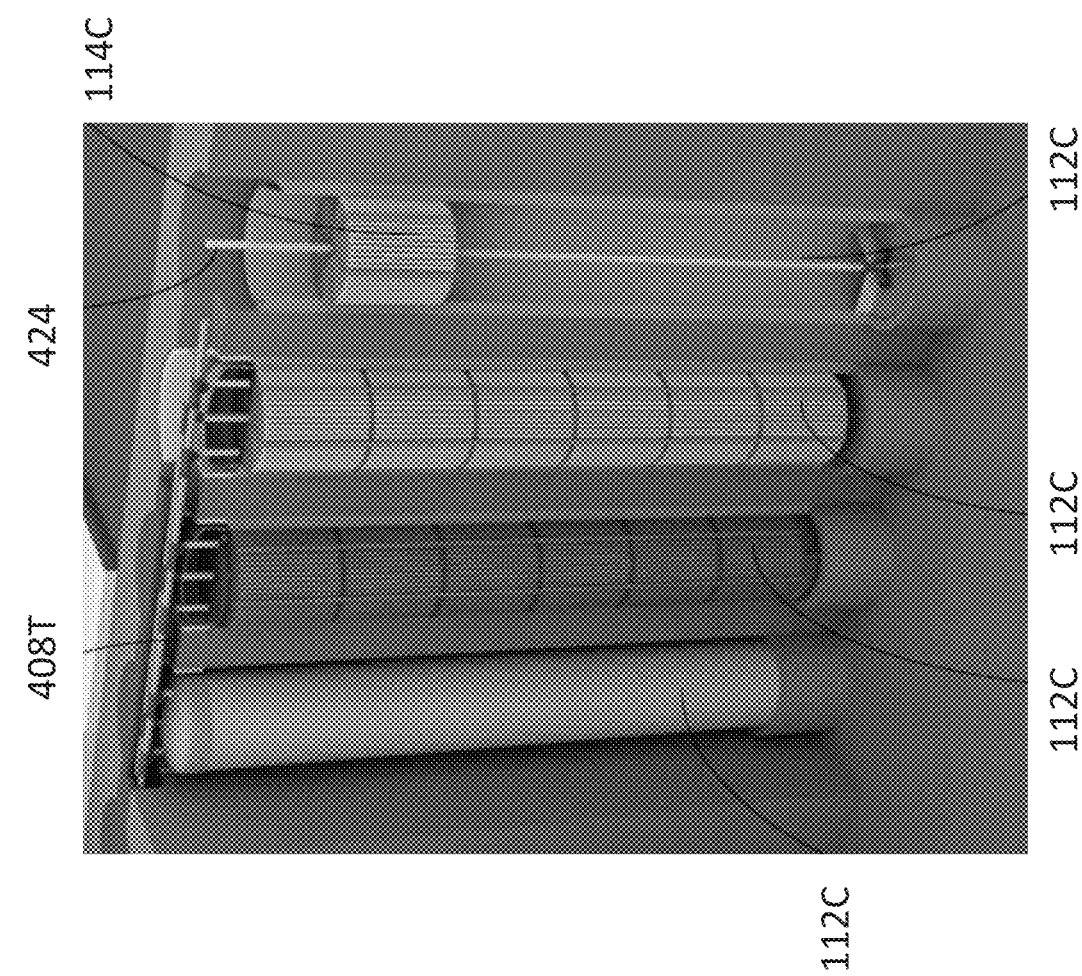
FIG. 4 shows a cylindrical ice brick according to at least some embodiments of the present invention.

Reference is now made to FIG. 4 which shows a cylindrical Ice brick according to at least some embodiments of the present invention. In the optional embodiment as shown in FIG. 4, ice brick 112C is cylindrical and comprises capsules 114C arranged in one or more arrays. Optionally there are multiple arrays placed at different heights within brick 112C. Optionally, the cylindrical brick 112C is adapted to be positioned underground. Brick 112C is manufactured from a pipe comprising a spiral metal reinforcement (not shown) than runs along the outside of brick 112C to enable placement of brick 112C underground. The volume of ice brick 112C is optionally between 100-10,000 cubic meters.

Figure 5A:
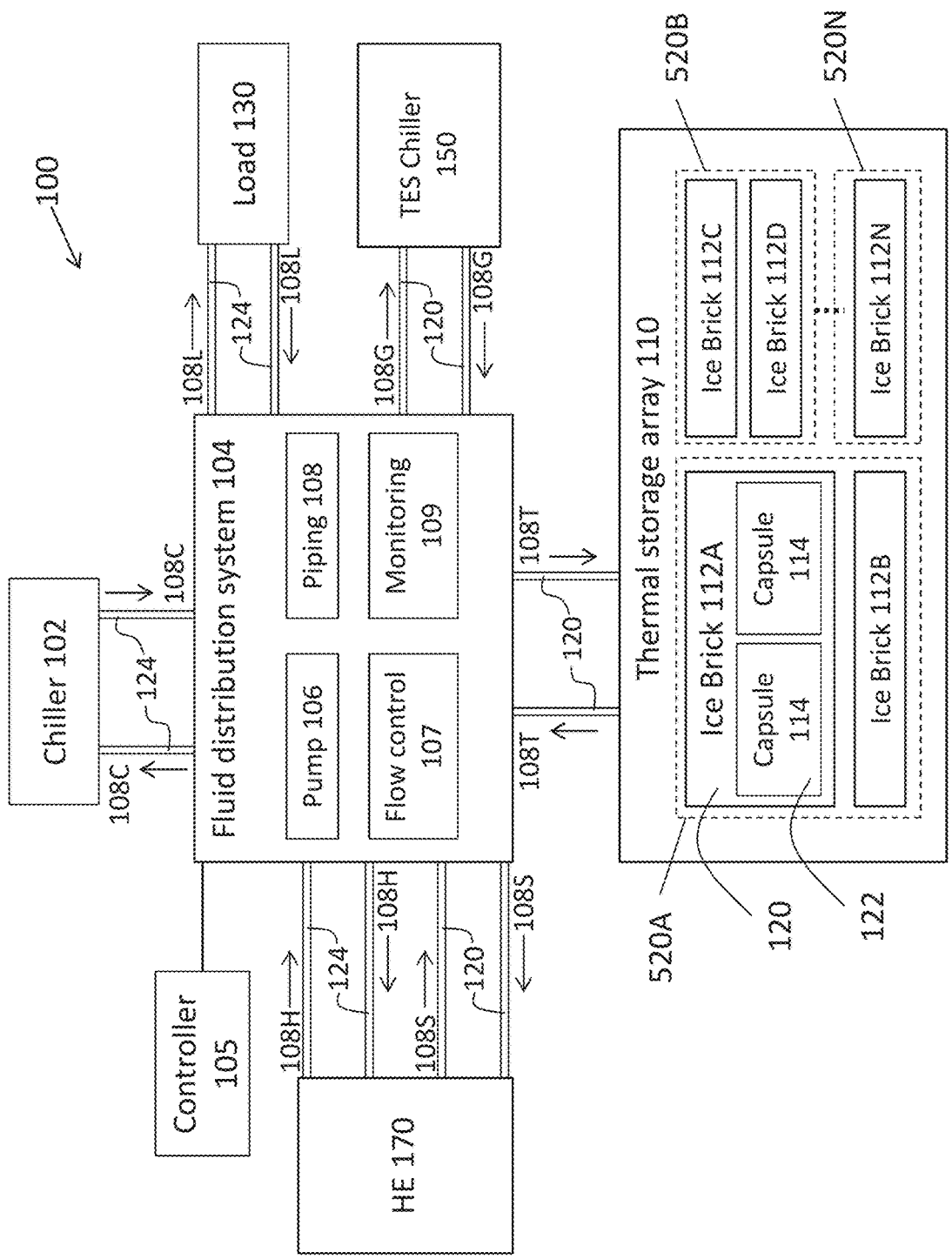
FIG. 5A shows a TES system capable of activating separate subsets of ice bricks by a controller.
Figure 5B:
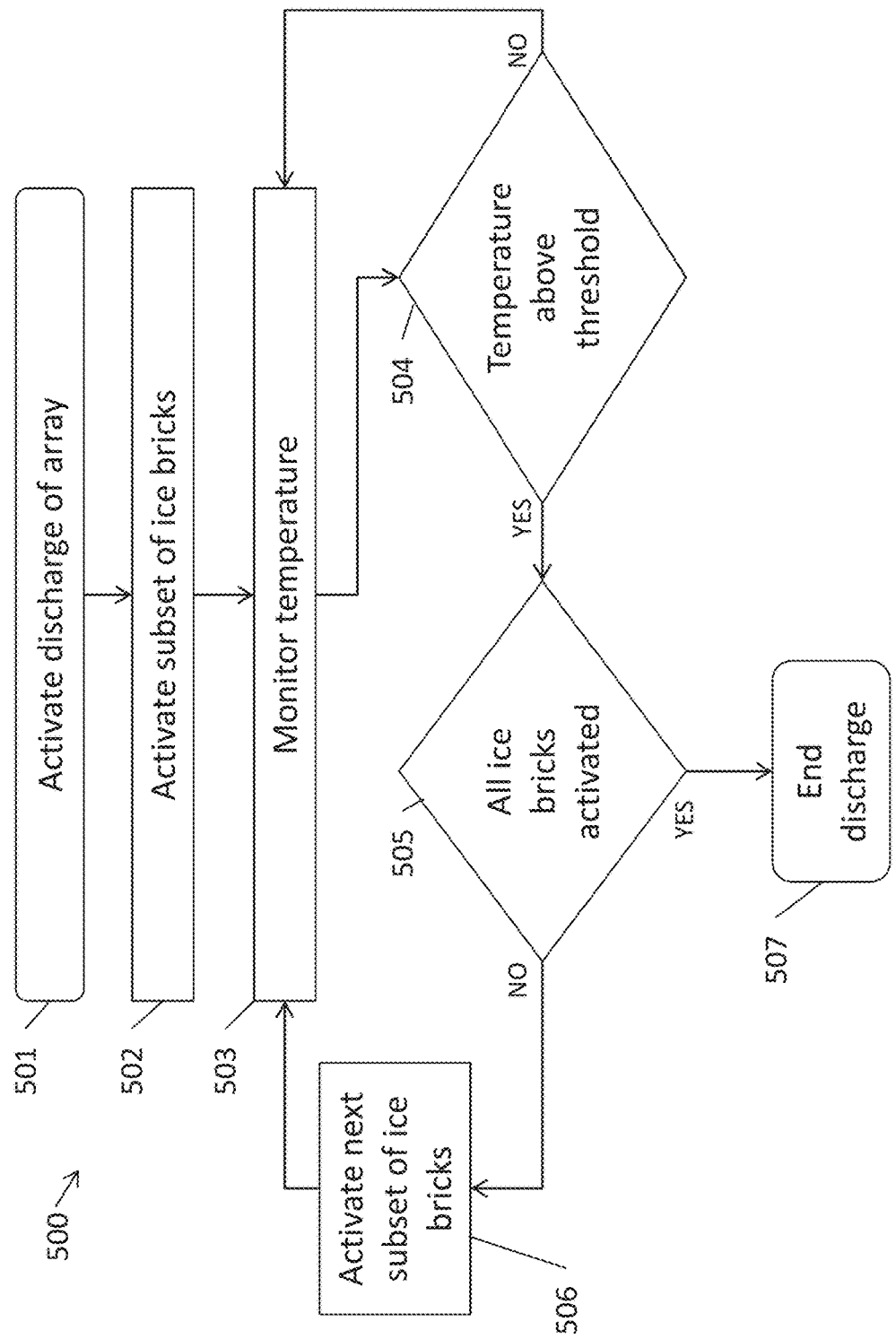
FIG. 5B shows a flow diagram for operation of a TES system.

Reference is now made to FIG. 5A which shows a TES system capable of activating separate subsets of ice bricks by a controller, FIG. 5B which shows a flow diagram for operation of a TES system, and FIG. 5C which shows experimental data from operation of a TES system according to at least some embodiments of the present invention. As shown in FIG. 5A, TES system 100 is structured and operates as per TES system 100 of FIG. 1A. Optionally any of the embodiments of FIGS. 1A-1E may be used as described with reference to FIG. 5B. In the embodiment of FIG. 5A, system 100 comprises N ice bricks 112 where N is an integer greater than 2. It should be appreciated that, as described above, array 110 optionally comprises as many ice bricks 112 as are needed to provide sufficient thermal energy storage. Ice bricks 112 are interconnected using inlet/outlet pipes 224 and interconnecting piping 228 and further are interconnected using components of fluid distribution system 104. Flow control 107 of fluid distribution system 104 enables segmentation of array 110 into subsets 520 of ice bricks 112 that can be activated individually as described below.

As above first fluid 120 flows through ice bricks 112 for charging and discharging. In the discharging process 500 of FIG. 5B, in step 501, the discharging process is initiated. The steps of process 500 are optionally controlled by controller 105 that controls the components of system 100 as described above. Activation of the discharging process may involve several steps such as but not limited to activating pumps 106, opening or closing valves in flow control 107, and monitoring temperatures and flow rates of fluids 120, 122, and 124 using monitoring 109.

In step 502 as part of the activation process, controller 105 activates a first subset 520A of ice bricks 112 and first fluid 120 is pumped only through this first subset 520A and not through any other ice bricks 112. As shown in FIG. 5A first subset 520A includes ice bricks 112A and 112B, however any number of ice bricks 112, and even a single ice brick 112, may be included in a subset and the example of two ice bricks 112 in a subset 520 should not be considered limiting. Optionally more than one subset 520 is activated in step 502. As first fluid 120 passes through first subset 520A, first fluid 120 is cooled while second fluid 122 is warmed. In step 503, the temperature of first fluid 120 is monitored such as by monitoring 109 as it exits array 110. Optionally temperatures of other fluids in system 100 are also measured in step 503.

In decision step 504, monitoring 109 indicates whether the monitored temperature has risen above a defined threshold. If the monitored temperature does not exceed the threshold then no action is taken by controller 105 and step 503 of monitoring is continued. When monitoring 109 indicates that the temperature has risen above the defined threshold (which is optionally defined in controller 105) the implication is that second fluid 122 passing through subset 520A is no longer being sufficiently cooled by subset 520A since second fluid 122 of subset 520A has risen in temperature. In a non-limiting example, where the temperature of first fluid 120 has risen above 5 degrees Celsius at the outlet of array 110, subset 520A is no longer sufficiently cooling first fluid 120.

In decision step 505 controller 105 checks whether all subsets of ice bricks 112 have been activated. When it is determined that not all subsets of ice bricks 112 have been activated, controller 105 activates a next subset 520B of ice bricks 112 in step 506. As above while FIG. 5A shows subset 520B including only ice bricks 112C and 112D, this should not be considered limiting and subset 520B could comprise any number of ice bricks 112. Subset 520B is optionally activated in addition to subset 520. Alternatively subset 520 is deactivated when subset 520B is activated. Optionally more than one subset is activated in step 506. The activation of subset 520B results in a decreased temperature as monitored by monitoring 109 in step 503.

Steps 503, 504 and 505 are repeated as shown in FIG. 5B until it is determined in step 505 that all available subsets, up to subset 520N, of ice bricks 112 have been utilized and in step 507 the discharge process 500 is stopped.

FIG. 5C shows experimental data from operation of a TES system. As shown in the graph of FIG. 5C, the temperature of first fluid 120 is monitored at the outlet of array 110 and plotted as line 532 as a function of time elapsed since activation of a discharging process. In the experimental system, three ice bricks 112 were activated at time=0 and as shown, the temperature increased from −5 degrees Celsius to around 5 degrees Celsius at the time indicated at point 530. At time 530, another ice brick was activated in addition to the initial three ice bricks and this immediately lowered the outlet temperature as in graph 532 to around 0 degrees Celsius. The temperature then gradually rose once more to around 5 degrees Celsius as the fourth ice brick also discharged. As can be seen from the experimental graph 532, the gradual activation of ice bricks 112 or subsets of ice bricks 520 results in more balanced discharging of TES system 100, longer discharging time resulting in longer periods of TES cooling of a load 130, and better utilization of each ice brick 112 which is more fully discharged.

Reference is now made to FIGS. 6A-6G which show spacers for use in an ice brick according to at least some embodiments of the present invention. Spacers 600 and 620 are inserted between capsules 114 inside ice bricks 112. An ice brick 112 optionally comprises multiple spacers 600 or alternatively spacers 620.

Alternatively an ice brick 112 comprise a combination of spacers 600 and 620.

Figure 6A:
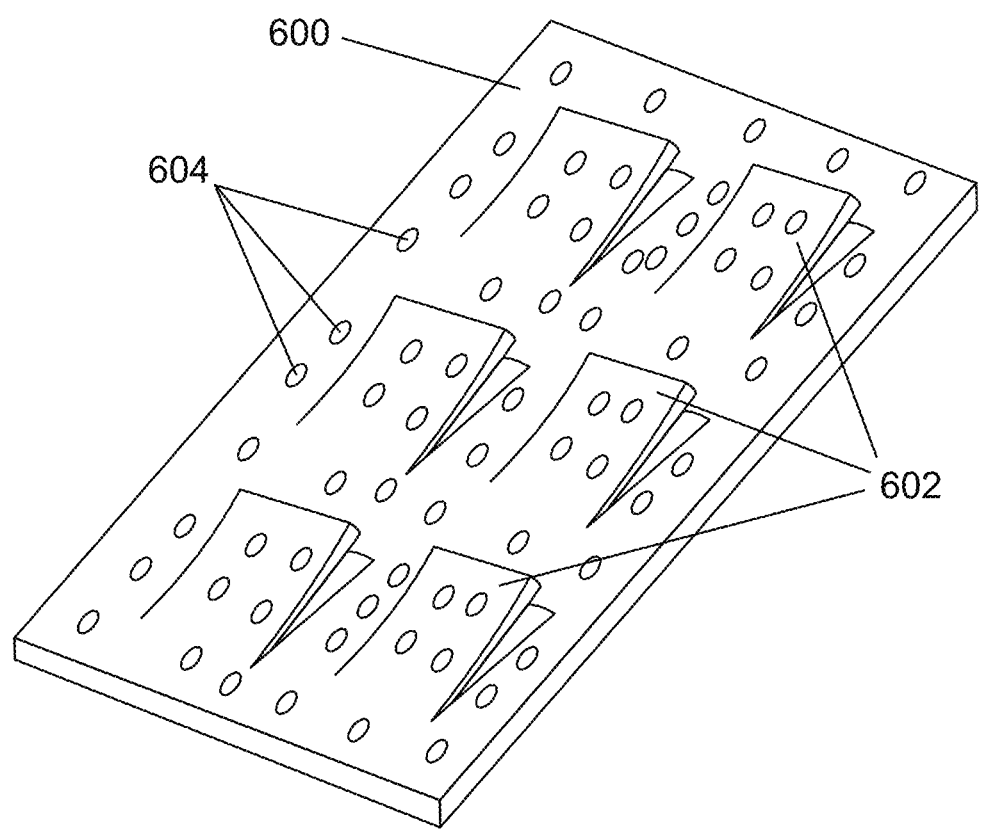
Figure 6C:
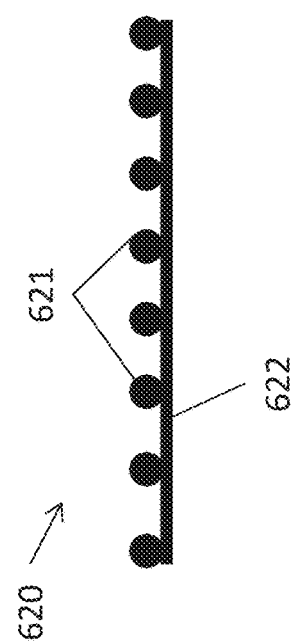
Figure 6B:
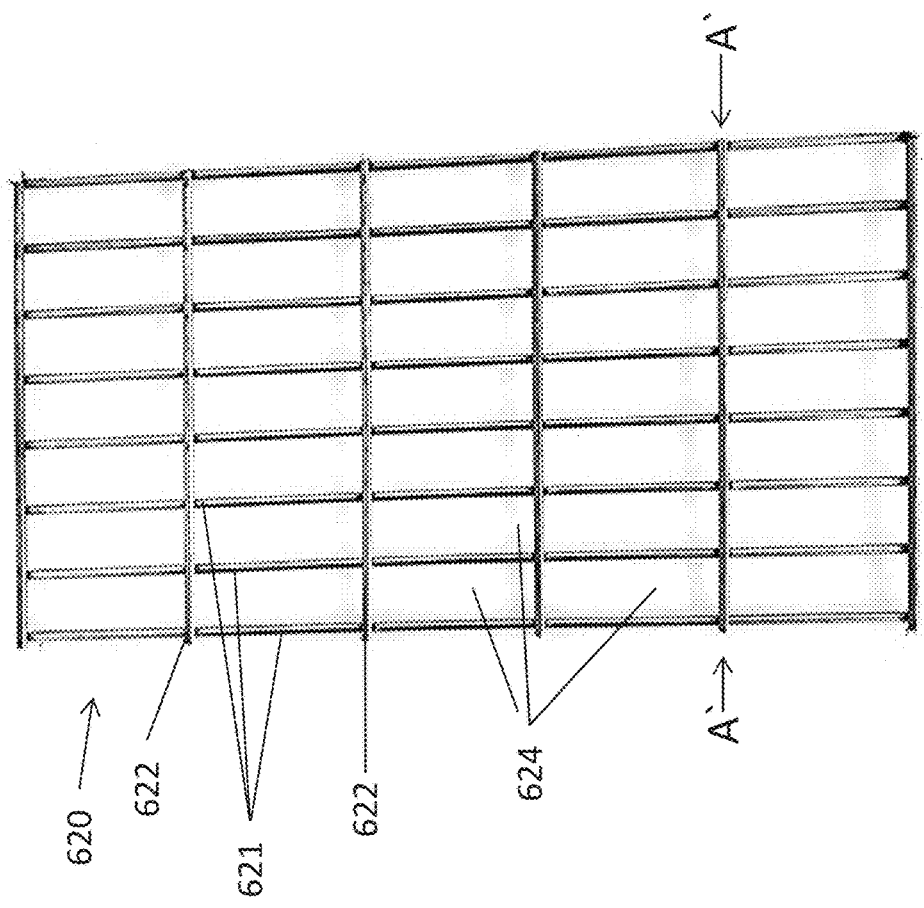
Figure 6E:
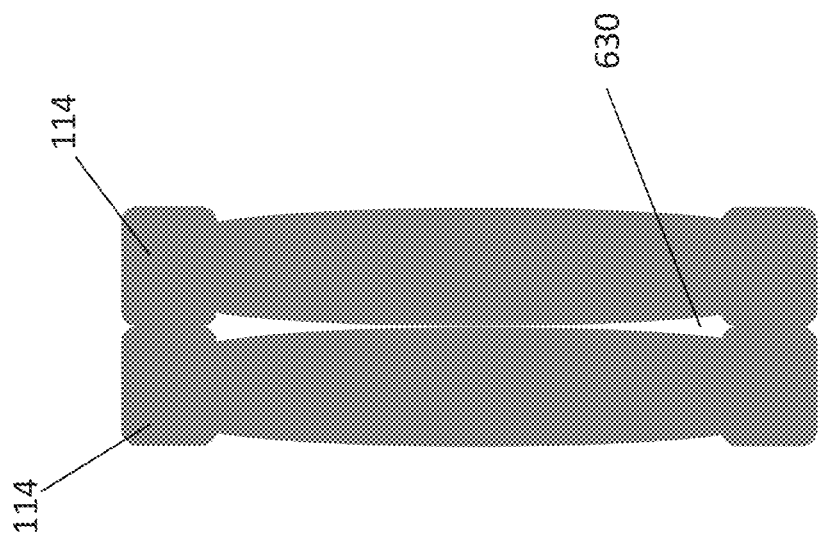
Figure 6D:
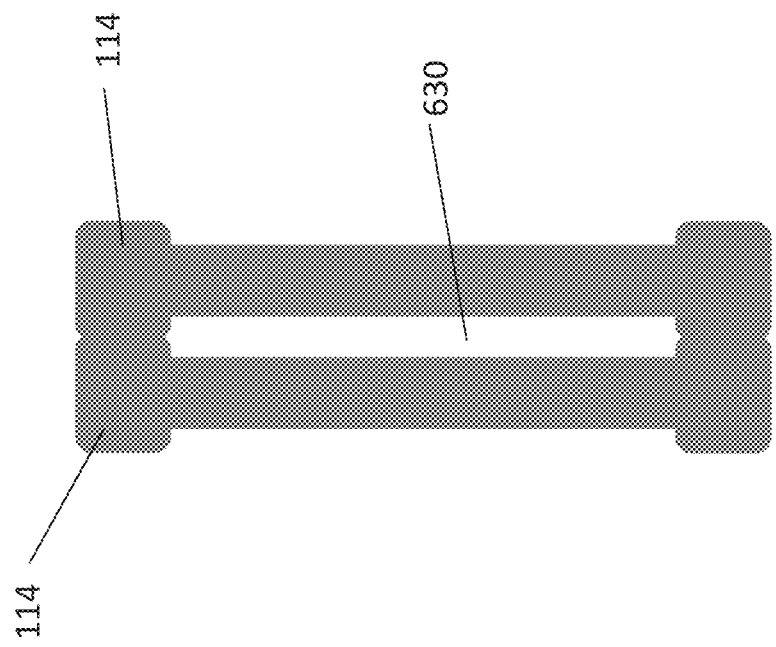

FIGS. 6D and 6E show two capsules 114 without any spacer 600 or 620 in a discharged (FIG. 6D) and charged (FIG. 6E) state. FIGS. 6F and 6G show two capsules 114 with spacer 620 in a discharged (FIG. 6F) and charged (FIG. 6G) state. Two capsules 114 are shown for purposes of simplicity and it should be apparent that any number of capsules and spacers may be provided as required inside brick 112. The purpose of spacers 600 and 620 is to maintain a minimum flow area 630 around capsules 114. Flow area 630 is required since capsules 114 expand (FIG. 6E) when capsules 114 are fully charged (second fluid 122 such as water has changed into ice). This expansion by capsules 114 can block the flow of first fluid 120 by constricting flow area 630 (FIG. 6E) preventing first fluid 120 from passing through ice brick and 112 and thereby preventing efficiently cooling of first fluid 120. Further, when second fluid 122 (such as water) is in a discharged state (FIG. 6D) capsules 114 shrink and the flow area 630 between capsules 114 grows causing a significant decrease in first fluid flow velocity which effects heat transfer for both charging and discharging.

In the embodiment of FIG. 6A spacer 600 ensures a sufficient flow area 630 by fitting between capsules 114 such that capsules 114 cannot expand to fill the flow area. Holes 604 in spacer 600 allow for flow of first fluid 120. When capsules 114 discharge, flexible flaps 602 open away from spacer 600 in order to occupy flow area 630 and thereby increase first fluid flow velocity.

In the embodiment of FIGS. 6B, 6C, 6F and 6G, spacer 620 ensures a sufficient flow area 630 by fitting between capsules 114 such that capsules 114 cannot expand while freezing to fill flow area 630. FIG. 6C shows cross section A'-A' of spacer 620. Gaps 624 between the vertical bars 621 and horizontal bars 622 in spacer 620 allow for flow of first fluid 120. As shown in FIG. 6F spacer 620 fits between capsules 114 and vertical bars 621 and horizontal bars 622 increase the flow velocity of first fluid through flow area 630. As shown in FIG. 6G, when capsules 114 are charged and expand, spacer 620 prevent capsule 114 from blocking flow area 630 thus ensuring continued flow of first fluid 120 around capsules 114.

Reference is now made to FIGS. 7A to 7D, which show an ice brick 112, i.e., a thermal energy storage unit 711.

The thermal energy storage unit 711 of FIG. 7A comprises a tube 712, which has the shape of an elongated, hollow body. The tube 712 is optionally made of metal, e.g., carbon steel or stainless steel. A front end element 713A and a back end element 713B are arranged to close the tube at both ends such that a rectangular-shaped enclosure is provided. Both elements 713A and 713B are also optionally made of metal, e.g., stainless steel or carbon steel and provide means for mounting the thermal energy storage unit 711 e.g. to supporting means (not shown). The front end element 713A and the back end element 713B have an inlet 714A and an outlet 714B, respectively. The inlet 714A and the outlet 714B can be connected to further thermal energy storage units 112, the piping 10 and/or to the fluid distribution system 104. Inside the tube 712, a plurality of capsules 715 is arranged. The capsules 115 have the shape of plates or bricks. Furthermore, the capsules 715 have a concave or recessed shape of their main surfaces (i.e. of their broad-sides). The arrangement of the capsules 715 inside the tube is optionally configured by a plurality of horizontally arranged stacks 717 of capsules 715 (i.e., the stacks are stacked in a width direction of the tube 712). For example, 16 or 8 capsules 715 can form one stack 717 of capsules 715. A plurality of stacks 717 is arranged one after another along the length of the tube 712. The capsules contain a phase-change material as second fluid 122 such as water, and preferable a nucleation agent, such as quartz. Between the capsules 715, as well as between the capsules and the tube 712, a space 716 is provided, in which the first fluid 120, e.g., a water/glycol mixture, can flow inside the tube 712 from inlet 714A to outlet 714B.

This arrangement allows an efficient exchange of heat between the first fluid 120 and the second fluid 122 via the wall of the capsule 715. The actual heat exchange rate between the capsule 715 and the first fluid 120 is dependent on several factors including the speed of the flow, the effective area of the contact surface between the flow of the first fluid 120 and the capsule 715, and the type of the flow (e.g., turbulent or laminar). The embodiment of FIG. 7A improves all of these factors. This is explained in more detail below:

The elongated shape of the tube in combination with the stacked arrangement of the capsules 715 defines residual free spaces 716, which result in a plurality of predefined flow paths 718 of the first fluid next to the capsules. The overall flow of the first fluid 120 at the inlet 714A is divided into the plurality of predefined flow paths 718, wherein each of the flow paths 718 passes by a plurality of capsules along the length of the tube 712. Moreover, the capsules 715 are configured such that the flow paths 718 are defined in a frozen (expanded) state of the capsules 715 as well as in a non-frozen (non-expanded) state of the capsules 715. In other words, a plurality of predefined or fixed flow channels for the first fluid 120 is provided between the capsules 715 while considering the changing volume of the capsules due to the volume change of the second fluid, especially while changing phase. Consequently and in contrast to conventional tank-based thermal energy storage units, a predefined system of a plurality of flow paths 718 for the first fluid 120 for exchanging heat is provided. The flow of the heat transfer fluid in conventional tank based thermal energy storage units has a high degree of randomness, wherein for example it is hard for the first fluid to reach edges of the tank.

Moreover, the plate shape of the capsules 715 geometrically increases the surface of the capsules 715 (i.e., its surface-to-volume ratio), wherein the largest surfaces (i.e. the broad-sides) of the capsules 715 advantageously define its main surfaces for exchanging heat.

Correspondingly, each flow path 715 of FIG. 7A has a narrow shape that is aligned parallel to said main surfaces of the capsules 715. The narrow shape of defined flow paths 718 utilizes the main surfaces of the capsules 715 such that the heat transfer rate is increased. In other words, the above explained arrangement of the thermal energy storage unit 711 significantly increases the effective area of the contact surface for exchanging heat while keeping the pressure drop at an acceptable level (e.g., below 1 bar).

The elongated shape of the tube 712 provides defined flow paths of the first fluid 120 that are significantly longer than with conventional systems. Hence, the exchange of heat of the first fluid 120 with the plurality of stacks 717 is optimized, since a gradual activation of the stacks 717 while frosting or defrosting the capsules 715 takes place.

Additionally, the average length of the flow paths is increased to be longer than the length L of the tube 712. This additionally increases the heat transfer rate.

FIG. 7B shows a cross-section of an empty tube 712. FIG. 7C shows a cross-section of a tube 712 including a stack 717 of capsules 715 with water in a liquid (non-frozen) state. Hence, the thermal energy storage unit 711 of FIG. 7C is fully discharged. FIG. 7D shows a cross-section of a tube 712 including a stack 717 of capsules 715 with water in a frozen/solid state. Hence, the thermal energy storage unit 711 of FIG. 7D is fully charged. The tube 712 of FIG. 7B has ideally an overall cross-section (i.e. cross-sectional area) of the tube 712A for the first fluid 120, if considered without any capsule 715. If a stack 717 of capsules 715 is placed inside the tube 712, narrow-shaped flow paths are provided between capsules 715; in FIG. 7C one of these narrow flow paths 718 is indicated by a plurality of circles, which indicate the flow direction of the first fluid 120. The flow paths 718 are provided in a cross-sectional area between each of two capsules 120 (one of these free-flow cross-sectional areas for the flow paths is indicated with the reference numeral 718A in FIG. 7C) for the first fluid 120 and, at the left and right side of FIG. 7C, between the wall of the tube 120 and the outmost left and right capsule 715, respectively. One of these cross-sectional areas that define the flow paths 718 is indicated with the reference numeral 718A in FIG. 7C. FIG. 7D shows almost the same configuration as FIG. 7C with the key difference that the residual cross-sectional areas for the flow of the first fluid 120 between the capsules 715 are smaller, since the capsules 715 are expanded by the frozen second fluid 122 inside them. One of these free-flow cross-sectional areas that define the flow paths 718 for the first fluid 120 is indicated in FIG. 7D by the reference numeral 718B. The plurality of stacks 717 is arranged such that continuous flow paths 718 are provided along the length of the tube in general from the front end to the back end to the tube. The average length of these flow paths 718 is longer than the length of the tube 712 itself. Optionally, the stacks 717 of the capsules 715 have the same number of capsules 715. Optionally, the stacks 717 are consecutively arranged next to each other such that the flow paths 718 are provided by the plurality of stacks 717 itself.

Since water expands its volume while charging/freezing, the capsules 715 of FIG. 7C require more space than the capsules of FIG. 7B. This effect is also called "breathing-effect" of the capsules 715. Due to this breathing effect, the residual space for the first fluid 120 changes according to the state of the second fluid 122 inside the capsules 715. The breathing-effect of the capsules 715 has to be considered while defining the flow paths 718. First, the stacks 717 have to be adapted such that the flow paths 718 are not blocked in the charged and in the discharged state. Second, the stacks 717 have to be adapted such that the flow paths 718 provide an acceptable pressure drop in the case of frozen capsules 715 as well as in the case of non-frozen capsules 715. Third, the overall thermodynamic configuration of the thermal energy storage unit 711 has to be optimized. This includes especially the flow dynamics of the first fluid 120 in the flow path 718 that should be configured such that an efficient heat transfer between the capsules 715 and the first fluid 120 can take place.

The first item mentioned above is for ensuring that a flow of the first fluid 120 can be provided at all times.

The second item mentioned above is explained more in detail as follows. The longer the flow path and smaller the flow path's cross-sectional area, the greater is the increase of the pressure drop. An increased pressure drop has the disadvantage of a higher pumping power consumption (i.e., higher system losses and less total efficiency of the system) and the disadvantage of increasing mechanical requirements for the whole system. Consequently, the pressure drop from inlet 714A to outlet 714B has to be below 1 bar (atmosphere). Optionally, thermal energy storage unit is configured such that the pressure drop is less than 0.5 bar in its fully-charged as well as in its fully-discharged state.

With respect to the third item mentioned above, a ratio of a combined length of a plurality of tubes (or one very long tube) to a flow-cut-area is in a range of about 40 to 200, optionally of about 60 and 150. These ratios of a flow-cut-area to a combined length of a plurality of tubes (i.e., the total length of several tubes 712 connected together in series) provide an efficient heat transfer rate with an acceptable pressure drop.

This allows on one hand more time for the capsules placed closest to the inlet (which suffer from reduced heat transfer rate due to ice melting inside the capsules) to continue their heat transfer into the first fluid 120 at a lower heat transfer rate and a lower exchange temperature, while the capsules 715 located more downstream of the flow of the first fluid 120 continue their heat transfer at a higher heat transfer rate.

The term "flow-cut-area" is a number which is calculated as follows:

$$AFFCAp = (TCSA - (CCSA\text{-}LS + CCSA\text{-}FS)/2 \times CPS)/CPS$$

wherein the above stated variables are defined as follows:
AFFCAp=Average free flow-cut-area per capsule
TCSA=overall available cross-sectional area 712A of the tube (see FIG. 7B);
CCSA-LS=capsule cross-sectional area 715 in the liquid state of the second fluid (i.e. in a discharged state, see FIG. 7C);
CCSA-FS=capsule cross-sectional area 715 in the frozen state of the second fluid (i.e. in a charged state, see FIG. 7D);
CPS=number of capsules 715 installed in parallel.

With the above stated formula, an average free flow cross-sectional area (i.e., (AFFCAp) per capsule 715 is used to calculate the available total flow area in a tube's cross-section. The result is then used to calculate the average cross-sectional flow area per capsule, i.e., the flow-cut-area.

The calculated flow-cut-area can be used to calculate a ratio gamma that is a good indicator for the efficiency of the heat transfer between capsule and first fluid as follows:

$$\text{Ratio gamma} = \text{combined length of the plurality of tubes/flow-cut-area } [\text{cm/cm}^2]$$

A gamma ratio of the combined length of the plurality of tubes to the said flow-cut-area of approximately 150 is an optimal value. A system which has been configured according to the above explained requirement demonstrated a yield value (a percentage of second fluid melted during a 4 hours period discharge rate) higher than 80% with an acceptable exit temperature of the first fluid below 5 degrees Celsius and an acceptable pressure drop (~0.5 bar). Increasing the ratio to 200 (with a shape of the capsule according to the above explained embodiments) will increase the pressure drop beyond the desired limit. Decreasing the ratio below 40 will decrease the yield percentage while discharging to 50%. A ratio in the range of 60 to 90 will also result in a reasonable efficiency of the unit 711. Moreover, the embodiment provides, in contrast to conventional "encapsulated ice" systems, a flat and stable discharge curve (behavior).

It is to be noted that the above stated rages and optimal values for the ratio gamma are the result of theoretical and practical experiments with the above embodiments.

Figure 8A:
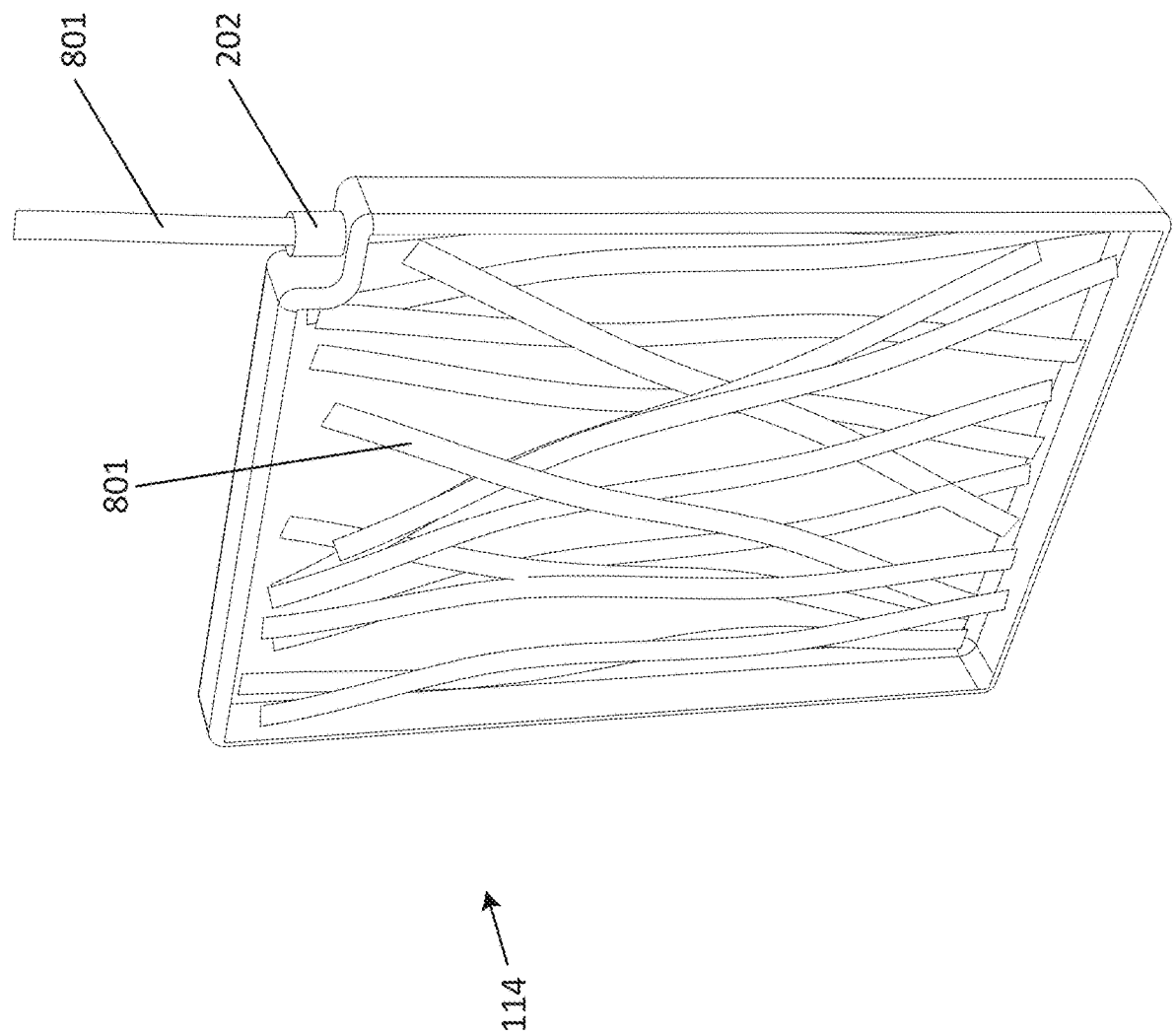
FIGS. 8A and 8B show capsules containing metal strip.

FIG. 8A shows a capsule 114 with a filling nozzle 202 that has a predefined diameter. Flat metal strips 801 are provided such that they are arranged inside the capsule 114. The width of the strips is adapted to the diameter of the filling nozzle 202 such that the strips can be inserted into the capsule 114. It is to be noted that the strip 801 that is placed in the filling nozzle 202 in FIG. 8A is only shown for demonstration purposes. The capsule 114 as finally used for the heat storage unit is only provided with strips 801 that are completely located in the interior of the capsule 114. The length of the strips 801 is preferable dimensioned such that they fit well inside the length of the capsule 114. In this way, the strips 801 will stay in place in the interior of the capsule 114 and will effect a large part of the internal volume of the capsule 114. Optionally, a plurality of metal strips is used in order to increase the overall heat transfer efficiency of the capsule 114. These strips 801 act as heat transfer elements, which improve the transfer of heat inside the capsule 114 and improve the total heat transfer efficiency of the individual capsule.

Figure 8B:
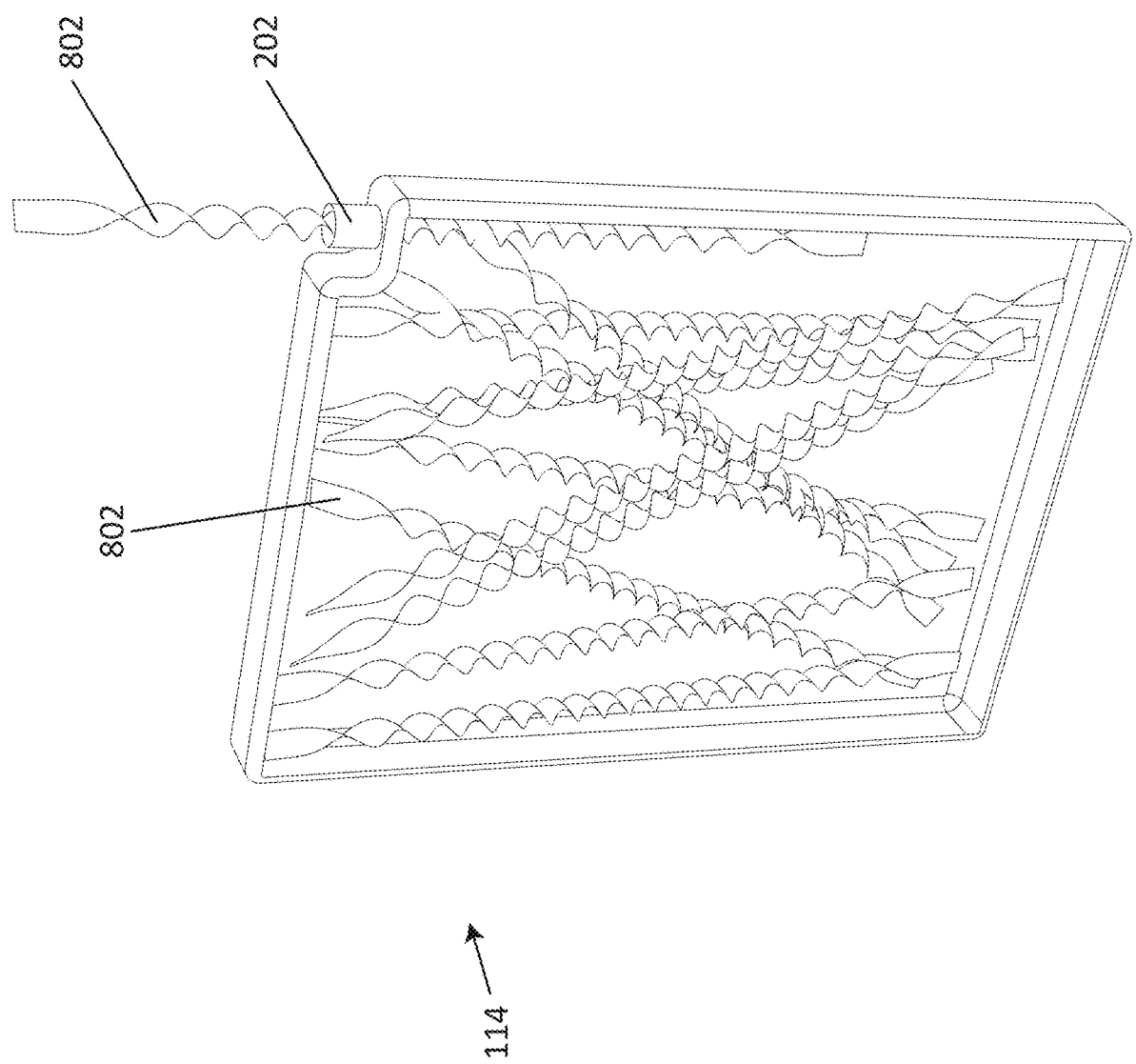

FIG. 8B shows a capsule 114 with a filling nozzle 202 that has a predefined diameter. Helical flat metal strips 802 are provided such that they are arranged inside the capsule 114. The width of strips is adapted to the diameter of the filling nozzle 202 such that the strips can be inserted into the capsule 114. It is to be noted that the strip 802 that is placed in the filling nozzle 202 in FIG. 8A is only shown for demonstration purposes. Helical flat metal strips 802 provide an even better distribution of heat in the interior of the capsule 114.

Figure 9A:
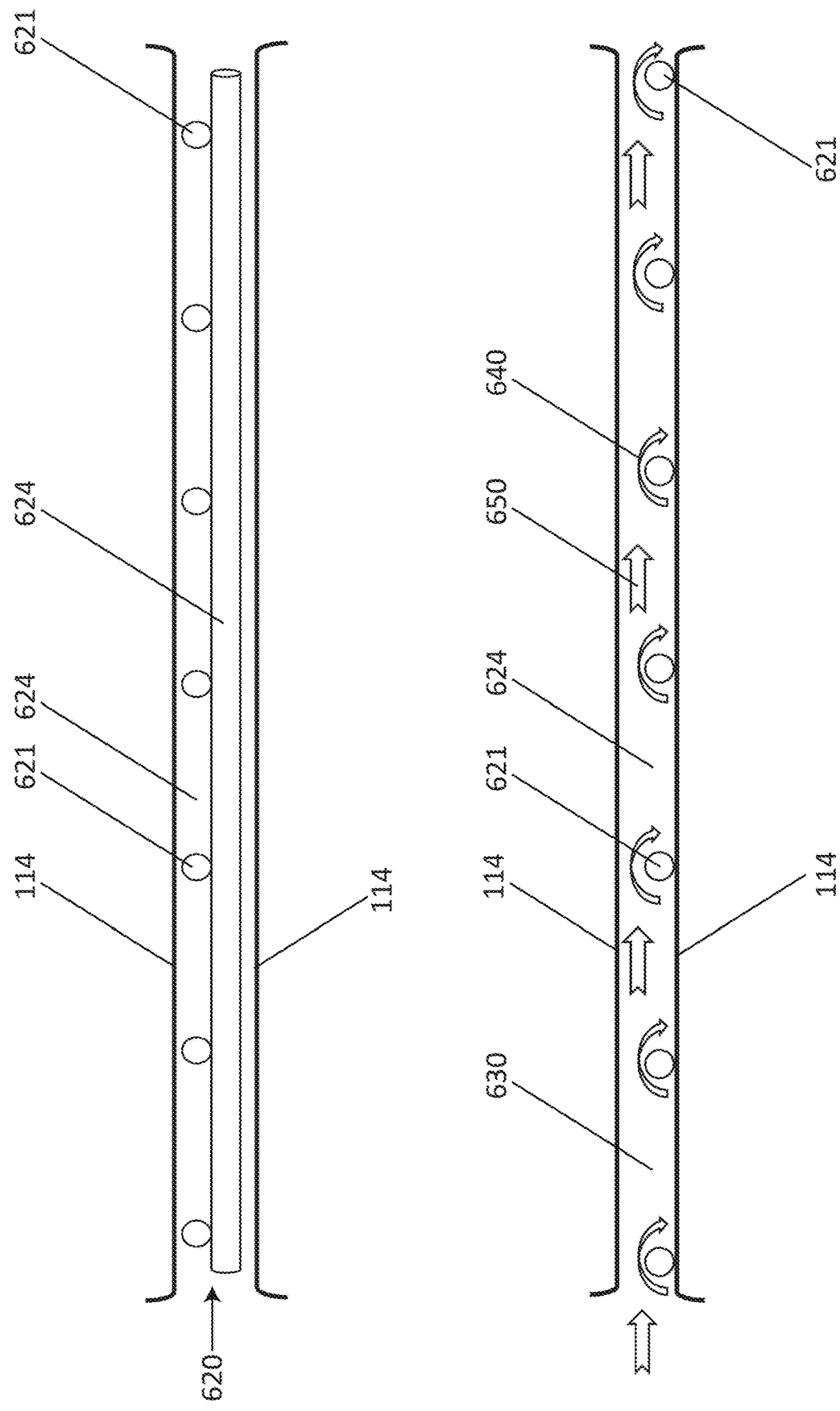
FIGS. 9A and 9B show spacers between capsules.

FIG. 9A shows a rigid spacer 620 having vertical bars 621, horizontal bars 622 and gaps 624 between the bars. The rigid spacer 600 is provided between two neighboring capsules 114. Reference is made to FIGS. 6B and 6C and the corresponding explanation. This rigid spacer could, for example, be used in combination with the embodiment described in context with FIGS. 7A-D.

When the capsule's wall deflects towards the neighboring capsule wall while charging (i.e., while freezing of the second fluid 122), the horizontal bars 622 maintain a free flow path near them, which will allow parallel flows 650 of the first fluid 120, which will cause melting of the ice across the whole capsule width. The perpendicular vertical bars will create turbulent flow which will improve the heat transfer coefficient between the wall of the capsule and the flow of the first fluid 120, as depicted by the curved arrows 640.

Figure 9B:
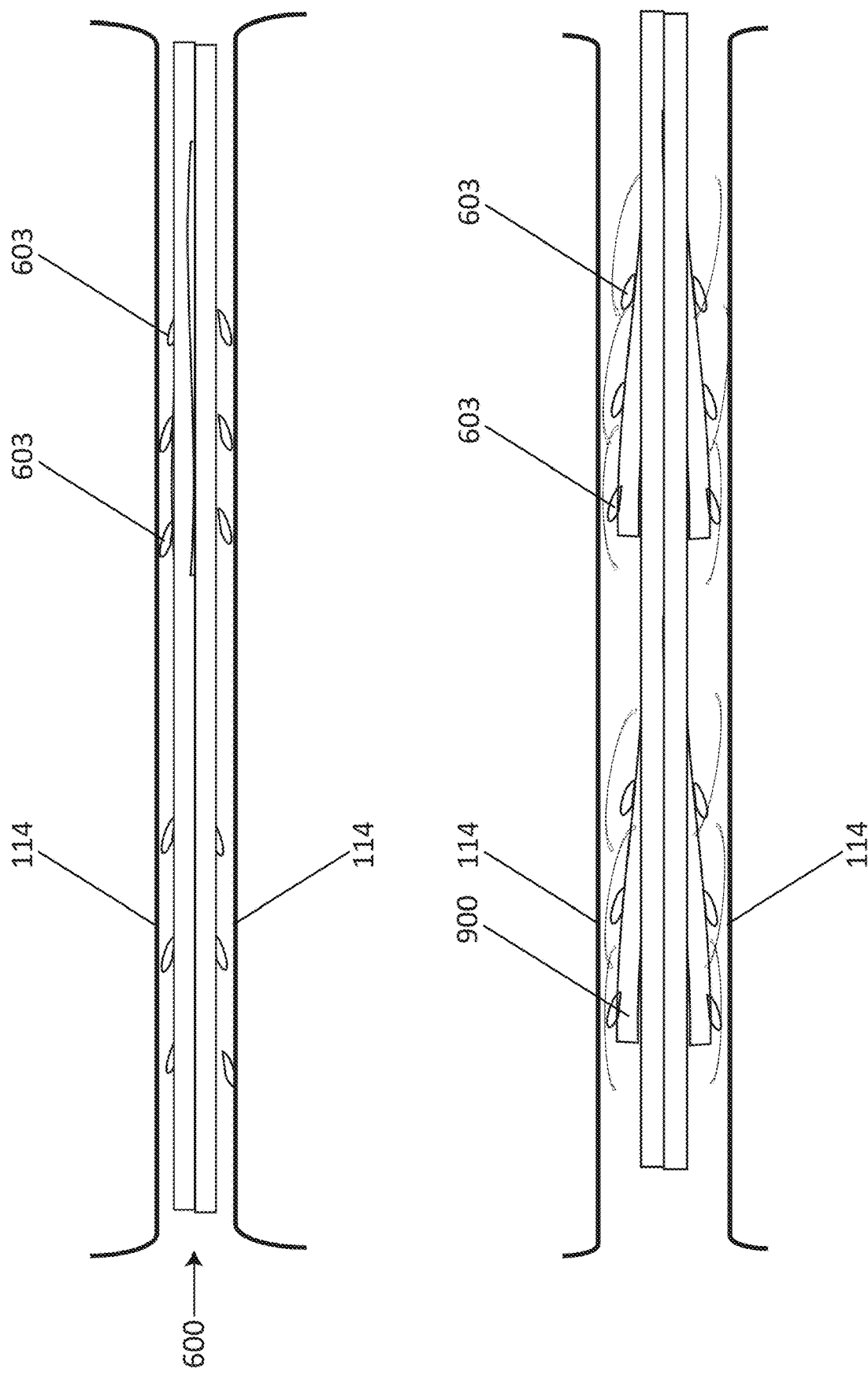

FIG. 9B shows a flexible spacer 600 having flaps 602. The flexible spacer 600 is provided between two neighboring capsules 114. Reference is made to FIG. 6A and the corresponding explanations. Furthermore, protrusions 603 are provided in order to create a more turbulent flow. This flexible spacer 600 could, for example, be used in combination with the embodiment described in context with FIGS. 7A-D.

The placement of flexible spacers 600 equipped with flaps 602, which are preloaded to press against the neighboring capsule's 114 flat walls, will force the first fluid to flow through the narrow gap between the capsules' 114 walls. This increases the heat transfer rate of the first fluid 120 with the capsule 114. Additionally the turbulence of the flow is increased. This is depicted by the lines 900 in FIG. 9B. The minimum clearance in the charged stage (i.e., the minimal size of the gap) should be approximately 1 mm on each side.

Furthermore, the flexible spacer 600 can be configured such that the gap will grow (due to ice melting) to approximately 3 to 5 mm on each side. This which will advantageously cause a reduction of the velocity of the fluid flow of the first fluid 120 to one fourth (¼) of its maximum velocity in the tube.

The flaps (wings) which are pre-set to expand away from the straight sheet and to move toward the capsule wall and to maintain narrow flow gap for the first fluid 120 near the capsule 114 and will prevent the degradation of performance as described above.

It is expected that during the life of a patent maturing from this application many relevant thermal-storage containers will be developed and the scope of the term thermal-storage containers is intended to include all such new technologies a priori.

General

As used herein the term "about" refers to −60% and +200%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

LIST OF REFERENCE SIGNS energy storage (TES) system 100
chiller 102/150
fluid distribution system 104
controller 105
pumps 106
flow control mechanisms 107
piping 108 to 108T
monitoring components 109
array 110
ice bricks 112, 112B, 112C, 112D
ice capsules 114, 114C, 114Cy
first fluid 120
second fluid 122
third fluid 124
air 126
cooling load 130
air compressor 140
Heat exchanger (HE) 142, 152, 170
filling nozzle 202
narrow-side spacers 204
broad-side spacers 206
rectangular enclosure 220
Mounting brackets 222
inlet/outlet pipes 224
end panels 226
support panels 227
interconnecting piping 228
base frame 232
ridge 250, 252
lower part 254
upper part 256
protrusions 260
general flow direction 290
meander pattern 291
discharging process 500
subsets 520, 520A, 520B 520, 520A, 520B
spacers 600, 620
flaps 602
protrusions 603
vertical bars 621
horizontal bars 622
gaps 624
flow area 630
curved arrows 640
flows 650
tube 712
overall cross-section of the tube 712A
front end element 713A
back end element 713B
inlet 714A
outlet 714B
capsule 715
spaces 716
stacks of capsules 717
flow paths 718
free flow cross-sectional area in the liquid state of the second fluid 718A
free flow cross-sectional area in the frozen state of the second fluid 718B

What is claimed is:

1. A thermal system, comprising:
two or more fluidly and mechanically coupled energy-storage containers, configured to exchange heat within an internal volume of the containers by heat-exchanging fluid flowing over or through phase-changing material inside the container, and each of the containers comprising:
a front wall, a back wall,
longitudinal walls extending between the front wall and the back wall, and
one or more outside connection surfaces defined as at least one of the front wall, back wall, and the longitudinal walls, the connection surfaces comprising a coupling element configured for inserting therein an interlocking element;
wherein the two or more containers are mechanically coupled to each other by abutting one or more of the connection surfaces of each container such that the interlocking element may be inserted in the coupling element, to define a containers arrangement.

2. A thermal system according to claim 1, wherein during operation, the longitudinal walls are rigid and support the weight of the containers.

3. A thermal system according to claim 1, wherein the weight of the mechanically coupled containers is distributed along the containers arrangement and supports its own weight when connected at two opposite ends of the containers arrangement supports.

4. A thermal system according to claim 1, wherein the containers arrangement is installed on a construction surface, and comprises one or more contact surfaces, defined by the contact area of one or more of the energy-storage containers with the construction surface; and
wherein, the maximal pressure applied by the contact surface on the construction surface, during operation is lower than 350 Kg per square meter.

5. A thermal system according to claim 1 wherein the two or more containers are mechanically coupled to each other without requiring welding.

6. A thermal system according to claim 1 comprising an insulation panel attached to one or more containers and surrounding outside surfaces of the containers but not surrounding non-external surfaces of the containers in the arrangement.

7. A thermal system according to claim 1 wherein the phase-changing material is contained within flat-shaped capsules disposed inside each thermal-storage container, the capsules having protrusions arranged to repeatedly cause changes of a direction of flow of the heat-exchanging fluid.

8. A thermal system according to claim 7 wherein the protrusions are configured to increase turbulence of the flow of the heat-exchanging fluid.

9. A thermal system according to claim 1 wherein each container comprises a fluid inlet and a fluid outlet to enable flow of the heat-exchanging fluid through each container and to fluidly couple each container to another container and wherein an average length of an actual flow path of the heat-exchanging fluid from fluid inlet to fluid outlet is larger than a length of a container.

10. A thermal system according to claim 1 wherein the at least two containers are each shaped as a tube with a rectangular cross section, and wherein a ratio of a length of each container to a width of each container is in the range of 4 to 50 or a ratio of the width of each container to a height of each container is in a range of 0.5 to 4.

11. A thermal system according to claim 1 configured to be connected to a chiller to cool the heat-exchanging fluid.

12. A thermal system according to claim 1 wherein the arrangement comprises coupling two or more containers coupled to each other at an angle to a horizontal surface.

13. A thermal system according to claim 1 configured to fit a structural portion of a building.

14. A thermal system according to claim 1 wherein the containers are stacked on top of one another, laid end to end or laid next to one another.

15. A thermal system according to claim 1 wherein each of the containers is configured to support a weight of another container.

* * * * *